United States Patent
Philpot et al.

(10) Patent No.: US 12,465,655 B2
(45) Date of Patent: Nov. 11, 2025

(54) UBE3A GENES AND EXPRESSION CASSETTES AND THEIR USE

(71) Applicant: The University of North Carolina at Chapel Hill, Chapel Hill, NC (US)

(72) Inventors: Benjamin David Philpot, Durham, NC (US); Steven James Gray, Southlake, TX (US); Charles Shyng, Apex, NC (US); Matthew Judson, Chapel Hill, NC (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 958 days.

(21) Appl. No.: 17/612,833

(22) PCT Filed: May 22, 2020

(86) PCT No.: PCT/US2020/034171
§ 371 (c)(1),
(2) Date: Nov. 19, 2021

(87) PCT Pub. No.: WO2020/237130
PCT Pub. Date: Nov. 26, 2020

(65) Prior Publication Data
US 2022/0241434 A1    Aug. 4, 2022

Related U.S. Application Data

(60) Provisional application No. 62/851,411, filed on May 22, 2019.

(51) Int. Cl.
| A61P 43/00 | (2006.01) |
| A61K 48/00 | (2006.01) |
| A61P 25/00 | (2006.01) |
| C12N 9/00  | (2006.01) |
| C12N 15/86 | (2006.01) |

(52) U.S. Cl.
CPC .......... *A61K 48/0058* (2013.01); *A61P 25/00* (2018.01); *A61P 43/00* (2018.01); *C12N 9/93* (2013.01); *C12N 15/86* (2013.01); *C12N 2800/22* (2013.01)

(58) Field of Classification Search
CPC ................................................. A61K 48/0058
See application file for complete search history.

(56) References Cited

U.S. PATENT DOCUMENTS

| 4,501,729 A | 2/1985 | Boucher et al. |
| 5,399,346 A | 3/1995 | Anderson et al. |
| 5,478,745 A | 12/1995 | Samulski et al. |
| 6,040,183 A | 3/2000 | Ferrari et al. |
| 6,093,570 A | 7/2000 | Ferrari et al. |
| 6,156,303 A | 12/2000 | Russell et al. |
| 7,201,898 B2 | 4/2007 | Monahan et al. |
| 9,636,370 B2 | 5/2017 | Mccown et al. |
| 2016/0243260 A1* | 8/2016 | Blits ................... A61K 48/0075 |
| 2017/0191064 A1 | 7/2017 | Costa et al. |
| 2017/0360960 A1 | 12/2017 | Gray et al. |
| 2018/0104358 A1* | 4/2018 | Nash ..................... A61K 48/005 |

FOREIGN PATENT DOCUMENTS

| JP | 2018518946 A | 7/2018 |
| WO | 9811244 A2 | 3/1998 |
| WO | 9961601 A2 | 12/1999 |
| WO | 0017377 A2 | 3/2000 |
| WO | 0028004 A1 | 5/2000 |
| WO | 0028061 A2 | 5/2000 |
| WO | 0191803 A2 | 12/2001 |
| WO | 0192551 A2 | 12/2001 |
| WO | 2016179584 A1 | 11/2016 |
| WO | 2019006107 A1 | 1/2019 |
| WO | 2020191366 A1 | 9/2020 |
| WO | 2021035181 A1 | 2/2021 |

OTHER PUBLICATIONS

Yamamoto, Yoshiki, Jon M. Huibregtse, and Peter M. Howley. Genomics 41.2 (1997): 263-266. (Year: 1997).*
Buiting, Karin, Charles Williams, and Bernhard Horsthemke. Nature Reviews Neurology 12.10 (2016): 584-593. (Year: 2016).*
Sequence Search Results, 20241112_112934_us-17-612-833-26. align50.rnpbm, result 16 (Year: 2024).*
Sadhwani, Anjali, et al. American Journal of Medical Genetics Part A 176.7 (2018): 1641-1647. (Year: 2018).*
Ward, Natalie J., et al. Blood, The Journal of the American Society of Hematology 117.3 (2011): 798-807. (Year: 2011).*
Acevedo, Julieta M., et al. Scientific reports 8.1 (2018): 4018. (Year: 2018).*
Melé, Marta, et al. Science 348.6235 (2015): 660-665. (Year: 2015).*
Genotype-Tissue Expression database V10, https://gtexportal.org/home/gene/UBE3A (accessed: 2024) (Year: 2024).*
Bantel-Schaal et al. "Human Adeno-Associated Virus Type 5 Is Only Distantly Related to Other Known Primate Helper-Dependent Parvoviruses" Journal of Virology, 73(2):939-947 (1999).
Bindels-De Heus et al. "An overview of health issues and development in a large clinical cohort of children with Angelman syndrome" American Journal of Medical Genetics Part A, 182:53-63 (2020).
Chamberlain et al. "Induced pluripotent stem cell models of the genomic imprinting disorders Angelman and Prader-Willi syndromes" Proceedings of the National Academy of Sciences, 107(41):17668-17673 (2010).

(Continued)

*Primary Examiner* — Maria G Leavitt
*Assistant Examiner* — Brendan Thomas Tinsley
(74) *Attorney, Agent, or Firm* — Myers Bigel, P.A.

(57) ABSTRACT

This invention relates to polynucleotides comprising UBE3A open reading frame (ORF) sequences, vectors comprising the same, and methods of using the same for delivery of the ORF to a cell or a subject and to treat disorders associated with aberrant expression of a UBE3A gene or aberrant activity of a UBE3A gene product in the subject, such as Angelman Syndrome.

16 Claims, 11 Drawing Sheets
Specification includes a Sequence Listing.

(56) References Cited

OTHER PUBLICATIONS

Chao et al. "Several Log Increase in Therapeutic Transgene Delivery by Distinct Adeno-Associated Viral Serotype Vectors" Molecular Therapy, 2(6):619-623 (2000).
Chiorini et al. "Cloning and Characterization of Adeno-Associated Virus Type 5" Journal of Virology, 73(2):1309-1319 (1999).
Chiorini et al. "Cloning of Adeno-Associated Virus Type 4 (AAV4) and Generation of Recombinant AAV4 Particles" Journal of Virology, 71(9):6823-6833 (1997).
Conway et al. "High-titer recombinant adeno-associated virus production utilizing a recombinant herpes simplex virus type I vector expressing AAV-2 Rep and Cap" Gene Therapy, 6:986-993 (1999).
Copping et al. "Neuronal overexpression of Ube3a isoform 2 causes behavioral impairments and neuroanatomical pathology relevant to 15q11.2-q13.3 duplication syndrome" Human Molecular Genetics, 26(20):3995-4010 (2017).
Ferrari et al. "New developments in the generation of Ad-free, high-titer rAAV gene therapy vectors" Nature Medicine, 3:1295-1297 (1997).
Fink et al. "Disrupted neuronal maturation in Angelman syndrome-derived induced pluripotent stem cells" Nature Communications, 8:15038 (2017).
Gao et al. "Clades of Adeno-Associated Viruses Are Widely Disseminated in Human Tissues" Journal of Virology, 78(12):6381-6388 (2004).
Gao et al. "Novel adeno-associated viruses from rhesus monkeys as vectors for human gene therapy" Proceedings of the National Academy of Sciences USA, 99(18):11854-11859 (2002).
GenBank Accession No. AF028704 "Adeno-associated virus 6, complete genome" www.ncbi.nlm.nih.gov (3 pages) (Jan. 12, 1998).
GenBank Accession No. AF028705 "Adeno-associated virus 3B, complete genome" www.ncbi.nlm.nih.gov (3 pages) (Jan. 12, 1998).
GenBank Accession No. AF043303 "Adeno-associated virus 2, complete genome" www.ncbi.nlm.nih.gov (4 pages) (May 20, 2010).
GenBank Accession No. AF063497 "Adeno-associated virus 1, complete genome" www.ncbi.nlm.nih.gov (3 pages) (Apr. 27, 1999).
GenBank Accession No. AF288061 "Hamster parvovirus 5' terminal hairpin gene sequence" www.ncbi.nlm.nih.gov (1 page) (Apr. 13, 2001).
GenBank Accession No. AF513851 "Adeno-associated virus 7 nonstructural protein and capsid protein genes, complete cds" www.ncbi.nlm.nih.gov (3 pages) (Sep. 5, 2002).
GenBank Accession No. AF513852 "Adeno-associated virus 8 nonstructural protein and capsid protein genes, complete cds" www.ncbi.nlm.nih.gov (3 pages) (Sep. 5, 2002).
GenBank Accession No. AH009962 "Hamster parvovirus" www.ncbi.nlm.nih.gov (2 pages) (Aug. 25, 2016).
GenBank Accession No. AX753250 "Sequence 5 from Patent EP1310571" www.ncbi.nlm.nih.gov (2 pages) (Jun. 23, 2003).
GenBank Accession No. AY028223 "B19 virus isolate patient_A.1.1 genomic sequence" www.ncbi.nlm.nih.gov (1 page) (Apr. 16, 2001).
GenBank Accession No. AY028226 "B19 virus isolate patient_A.2.1 genomic sequence" www.ncbi.nlm.nih.gov (1 page) (Apr. 16, 2001).
GenBank Accession No. AY530579 "Adeno-associated virus 9 isolate hu. 14 capsid protein VP1 (cap) gene, complete cds" www.ncbi.nlm.nih.gov (2 pages) (Jun. 24, 2004).
GenBank Accession No. AY631966 "Adeno-associated virus 11 nonstructural protein and capsid protein genes, complete cds" www.ncbi.nlm.nih.gov (3 pages) (Nov. 30, 2004).
GenBank Accession No. EU285562 "Adeno-associated virus 13 nonstructural protein and capsid protein genes, complete cds" www.ncbi.nlm.nih.gov (3 pages) (Sep. 23, 2008).
GenBank Accession No. J01901 "Adeno-associated virus 2, complete genome" www.ncbi.nlm.nih.gov (3 pages) (Apr. 27, 1993).
GenBank Accession No. J02275 "Minute virus of mice, complete genome" www.ncbi.nlm.nih.gov (5 pages) (May 22, 1995).
GenBank Accession No. NC_000883 "Human parvovirus B19, complete genome" www.ncbi.nlm.nih.gov (4 pages) (Aug. 13, 2018).
GenBank Accession No. NC_001358 "Parvovirus H1, complete genome" www.ncbi.nlm.nih.gov (3 pages) (Feb. 10, 2015).
GenBank Accession No. NC_001401 "Adeno-associated virus—2, complete genome" www.ncbi.nlm.nih.gov (6 pages) (Aug. 13, 2018).
GenBank Accession No. NC_001510 "Minute virus of mice, complete genome" www.ncbi.nlm.nih.gov (5 pages) (Aug. 13, 2018).
GenBank Accession No. NC_001540 "Bovine parvovirus, complete genome" www.ncbi.nlm.nih.gov (4 pages) (Aug. 13, 2018).
GenBank Accession No. NC_001701 "Goose parvovirus, complete genome" www.ncbi.nlm.nih.gov (4 pages) (Aug. 13, 2018).
GenBank Accession No. NC_001729 "Adeno-associated virus-3, complete genome" www.ncbi.nlm.nih.gov (3 pages) (Aug. 13, 2018).
GenBank Accession No. NC_001829 "Adeno-associated virus-4, complete genome" www.ncbi.nlm.nih.gov (3 pages) (Aug. 13, 2018).
GenBank Accession No. NC_001862 "Adeno-associated virus 6, complete genome" www.ncbi.nlm.nih.gov (3 pages) (Jan. 12, 2004).
GenBank Accession No. NC_001863 "Adeno-associated virus 3B, complete genome" www.ncbi.nlm.nih.gov (3 pages) (Jan. 12, 2004).
GenBank Accession No. NC_002077 "Adeno-associated virus-1, complete genome" www.ncbi.nlm.nih.gov (3 pages) (Aug. 13, 2018).
GenBank Accession No. NC_006152 "Adeno-associated virus 5, complete genome" www.ncbi.nlm.nih.gov (3 pages) (Aug. 13, 2018).
GenBank Accession No. NC_006261 "Adeno-associated virus-8, complete genome" www.ncbi.nlm.nih.gov (3 pages) (Aug. 13, 2018).
GenBank Accession No. NM_000462.5 "*Homo sapiens* ubiquitin protein ligase E3A (UBE3A), transcript variant 2, MRNA" www.ncbi.nlm.nih.gov (6 pages) (Feb. 6, 2022).
GenBank Accession No. NM_130838.3 "*Homo sapiens* ubiquitin protein ligase E3A (UBE3A), transcript variant 1, MRNA" www.ncbi.nlm.nih.gov (5 pages) (Jul. 16, 2019).
GenBank Accession No. NM_130839.4 "*Homo sapiens* ubiquitin protein ligase E3A (UBE3A), transcript variant 3, mRNA" www.ncbi.nlm.nih.gov (5 pages) (Oct. 27, 2019).
GenBank Accession No. U89790 "Adeno-associated virus 4, complete genome" www.ncbi.nlm.nih.gov (3 pages) (Aug. 21, 1997).
GenBank Accession No. X01457 "Parvovirus h-1, complete genome" www.ncbi.nlm.nih.gov (3 pages) (Apr. 18, 2005).
Goebbels et al. "Genetic targeting of principal neurons in neocortex and hippocampus of NEX-Cre mice" Genesis, 14(12):611-621 (2006).
Gu et al. "Ube3a reinstatement mitigates epileptogenesis in Angelman syndrome model mice" The Journal of Clinical Investigation, 129(1):163-168 (2019).
International Preliminary Report on Patentability corresponding to International Patent Application No. PCT/US2020/034171 (8 pages) (dated Dec. 2, 2021).
Jiang et al. "Mutation of the Angelman Ubiquitin Ligase in Mice Causes Increased Cytoplasmic p53 and Deficits of Contextual Learning and Long-Term Potentiation" Neuron, 21(4):799-811 (1998).
Judson et al. "Allelic Specificity of Ube3a Expression in the Mouse Brain during Postnatal Development" The Journal of Comparative Neurology, 522(8):1874-1896 (2014).
Judson et al. "Decreased Axon Caliber Underlies Loss of Fiber Tract Integrity, Disproportional Reductions in White Matter Volume and Microcephaly in Angelman Syndrome Model Mice" The Journal of Neuroscience, 37(31):7347-7361 (2017).
Krishnan et al. "Autism gene Ube3a and seizures impair sociability by repressing VTA Cbln1" Nature, 543(7646):507-512 (2017).
Margolskee, R. F. "Epstein-Barr Virus Based Expression Vectors" Current Topics in Microbiology and Immunology. 158:67-95 (1992).
Mele et al. "The human transcriptome across tissues and individuals" Science, 348(6235):660-665 (2015).
Miao et al. "The Angelman Syndrome Protein Ube3a Is Required for Polarized Dendrite Morphogenesis in Pyramidal Neurons" The Journal of Neuroscience, 33(1):327-333 (2013).

(56) References Cited

OTHER PUBLICATIONS

Mori et al. "Two novel adeno-associated viruses from cynomolgus monkey: pseudotyping characterization of capsid protein" Virology, 330:375-383 (2004).

Muramatsu et al. "Nucleotide Sequencing and Generation of an Infectious Clone of Adeno-Associated Virus 3" Virology, 221(1):208-217 (1996).

Muzyczka, N. "Use of Adeno-Associated Virus as a General Transduction Vector for Mammalian Cells" Current Topics in Microbiology and Immunology, 158:97-98 (1992).

Palombo et al. "Site-Specific Integration in Mammalian Cells Mediated by a New Hybrid Baculovirus-Adeno-Associated Virus Vector" Journal of Virology, 72(6):5025-5034 (1998).

Rotaru et al. "Angelman Syndrome: From Mouse Models to Therapy" Neuroscience, 445:172-189 (2020).

Ruffing et al. "Mutations in the carboxy terminus of adeno-associated virus 2 capsid proteins affect viral infectivity: Lack of an RGD integrin-binding motif" Journal of General Virology, 75:3385-3392 (1994).

Rutledge et al. "Infectious Clones and Vectors Derived from Adeno-Associated Virus (AAV) Serotypes Other Than AAV Type 2" Journal of Virology, 72(1):309-319 (1998).

Sadhwani et al. "Two Angelman Families with Unusually Advanced Neurodevelopment Carry a Start Codon Variant in the Most Highly Expressed UBE3A Isoform" American Journal of Medical Genetics—Part A, 176(7):1641-1647 (2018).

Schmidt et al. "Molecular Characterization of the Heparin-Dependent Transduction Domain on the Capsid of a Novel Adeno-Associated Virus Isolate, AAV(VR-942)" Journal of Virology, 82(17):8911-8916 (2008).

Shade et al. "Nucleotide Sequence and Genome Organization of Human Parvovirus B19 Isolated from the Serum of a Child during Aplastic Crisis" Journal of Virology, 58(3):921-936 (1986).

Smith et al. "Increased Gene Dosage of Ube3a Results in Autism Traits and Decreased Glutamate Synaptic Transmission in Mice" Science Translational Medicine, 3(103):103ra97 (2011).

Sommer et al. "iPS Cell Generation Using a Single Lentiviral Stem Cell Cassette" Stem Cells, 27:543-549 (2008).

Srivastava et al. "Nucleotide Sequence and Organization of the Adeno-Associated Virus 2 Genome" Journal of Virology, 45(2):555-564 (1983).

Takahashi et al. "Induction of Pluripotent Stem Cells from Adult Human Fibroblasts by Defined Factors" Cell, 131:861-872 (2007).

Trezza et al. "Loss of nuclear UBE3A causes electrophysiological and behavioral deficits in mice and is associated with Angelman syndrome" Nature Neuroscience, 22(8):1235-1247 (2019).

Tyle, Praveen "Iontophoretic Devices for Drug Delivery" Pharmaceutical Research, 3(6):318-326 (1986).

Urabe et al. "Insect Cells as a Factory to Produce Adeno-Associated Virus Type 2 Vectors" Human Gene Therapy, 13:1935-1943 (2002).

Wang et al. "Expanding the Genetic Code" Annual Review of Biophysics and Biomolecular Structure, 35:225-249 (2006).

Xiao et al. "Gene Therapy Vectors Based on Adeno-Associated Virus Type 1" Journal of Virology, 73(5):3994-4003 (1999).

Zhang et al. "Recombinant adenovirus expressing adeno-associated virus cap and rep proteins supports production of hightiter recombinant adeno-associated virus" Gene Therapy, 8:704-712 (2001).

Zolotukhin et al. "Recombinant adeno-associated virus purification using novel methods improves infectious titer and yield" Gene Therapy, 6:973-985 (1999).

GenBank Accession No. AK292514.1 "*Homo sapiens* cDNA FLJ77614 complete cds, highly similar to Homo sapiens ubiquitin protein ligase E3A (human papilloma virus E6-associated protein, Angelman syndrome) (UBE3A), transcript variant 3, mRNA".

GenBank Accession No. BC002582.2 "*Homo sapiens* ubiquitin protein ligase E3A, mRNA (cDNA clone MGC:2086 Image:3160225), complete cds" www.ncbi.nlm.nih.gov (3 pages) (Aug. 4, 2008).

International Search Report and the Written Opinion of the International Searching Authority corresponding to International Patent Application No. PCT/US2020/034171 (13 pages) (mailed Oct. 27, 2020).

Lopez et al. "UBE3A: An E3 Ubiquitin Ligase With Genome-Wide Impact in Neurodevelopmental Disease" Frontiers in Molecular Neuroscience, 11(476):1-8 (2019).

Yamamoto et al. "The Human E6-AP Gene (UBE3A) Encodes Three Potential Protein Isoforms Generated by Differential Splicing" Genomics, 41:263-266 (1997).

"Search Report corresponding to Singapore Application No. 11202112470Y dated Sep. 29, 2023".

"Written Opinion corresponding to Singapore Application No. 11202112470Y dated Oct. 2, 2023".

"*Homo sapiens* UBE3A gene, Virtual Transcript, partial sequence, genomic survey sequence.", EMBL, (Jun. 3, 2005), Database accession No. DQ045239, URL: EBI, XP002810131.

Extended European Search Report corresponding to European Patent Application No. 20809370.8 (13 pages) (dated Sep. 25, 2023).

Ameline, et al., "Long-term expression of melanopsin and channelrhodopsin causes no gross alterations in the dystrophic dog retina", Gene Therapy, 24, 2017, 735-741.

Judson, et al., "Dual-isoform hUBE3A gene transfer improves behavioral and seizure outcomes in Angelman syndrome model mice", JCI Insight, 6(20), 2021, e144712.

Sapkota, et al., "Cell-type-specific profiling of alternative translation identifies regulated protein isoform variation in the mouse brain", Cell Reports, 26, 2019, 594-607.

\* cited by examiner

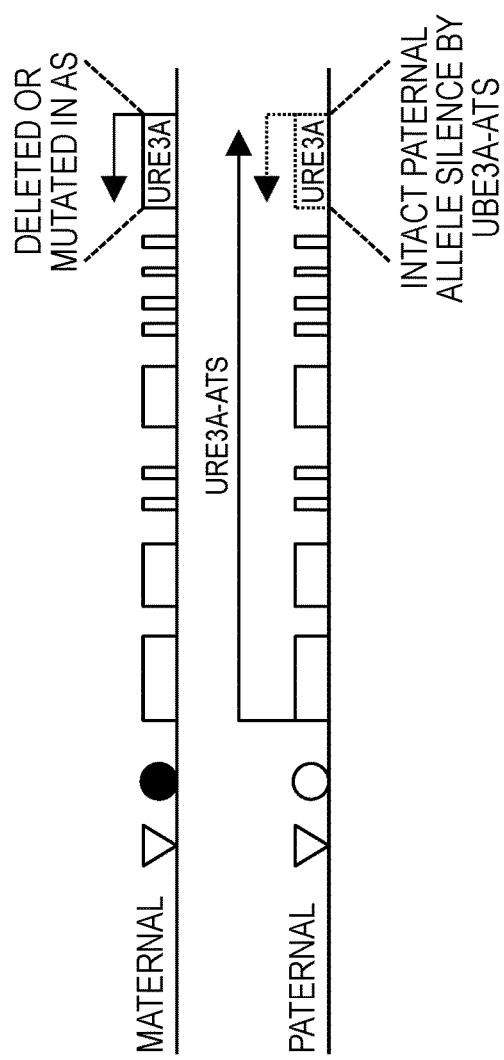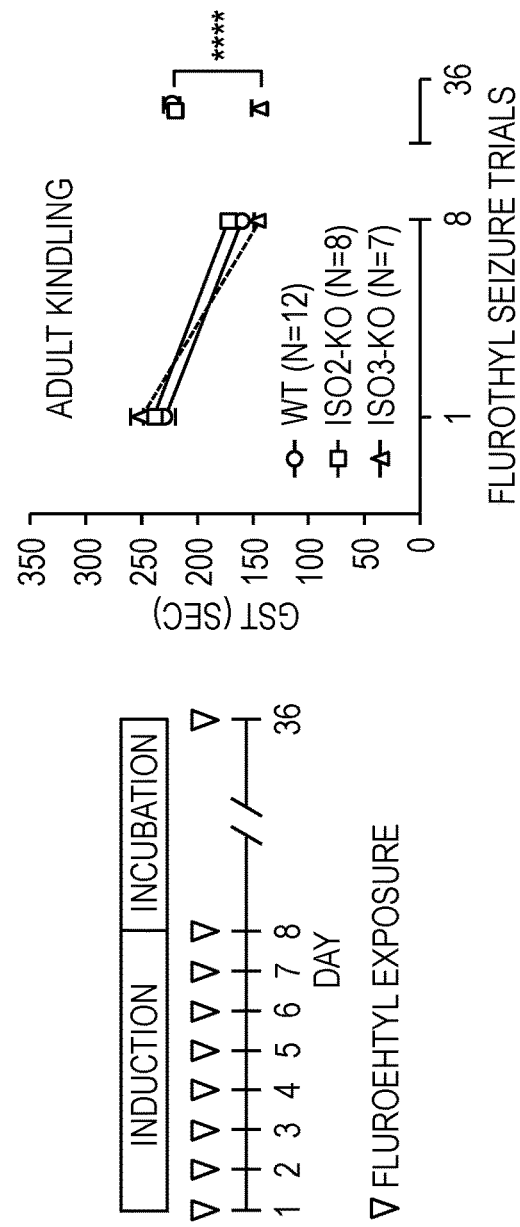
FIG. 1
FIG. 2A
FIG. 2B

HUMAN UBE3A ISOFORMS

SHORT – 1                                   MKRAAAKHLIERYYHQLTEGCGNEACTNEFCASC
LONG – 2  MEKLHQCYWKSGEPQSDDIEASRMKRAAAKHLIERYYHQLTEGCGNEACTNEFCASC
       – 3         MATACKRSGEPQSDDIEASRMKRAAAKHLIERYYHQLTEGCGNEACTNEFCASC

MOUSE UBE3A ISOFORMS

LONG  – 2  MATACKRSPGESQSEDIEASRMKRAAAKHLIERYYHQLTEGCGNEACTNEFCASC
SHORT – 3                                   MKRAAAKHLIERYYHQLTEGCGNEACTNEFCASC

FIG. 3A

DNA: GAATTCCGGATTTTTATGGCCACAGCTTGTAAAAGATCAGGAGAACCTCAGTCTGACGCTGTGAAGCATTGAAGCTAGCAGGATGAAG
(WEAK KOZAK) ... (STRONG KOZAK)

PROTEIN:
MATACKRSGEPQSDDIEASRMKRAAAKHLIERYYHQLTEGCGNEACTNEFCASCPTFLRMDNNAAAIKALELYKINAKLCDP
HPSKKGASSAYLENSKGAPNNSCSEIKMNKKGARIDFKDVTYLTEEKVYELELCREREDYSPLIRVIGRVFSSAEALVQSF
RKVKQHTKEELKSLQAKDEDKDEDEKEKAACSAAAMEEDSEASSSRIGDSSQGDNNLQKLGPDDVSVDIAIRRVYTRLLSN
EKIETAFLNALVYLSPNVECDLTYHNVYSRDPNYLNLFIIVMENRNLHSPEYLEMALPLFCKAMSKLPLAAQGKLIRLWSKY
NADQIRRMMETFQQLITYKVISNEFNSRNLVNDDDAIVAASKCLKMVYANVVGGEVDTNHNEEDDEEPIPESSELTLQELL
GEERRNKKGPRVDPLETELGVKTLDCRKPLIPEEFINEPLNEVLEMDKDYTFFKVETENKESFMTCPFLNAVTKNLGLYY
DNRIRMYSERRITVLYSLVQGQQLNPYLRLKVRRDHIIDDALVRLEMIAMENPADLKKQLYVEFEGEQGVDEGGVSKEFFQL
VVEEIFNPDIGMFTYDESTKLFWFNPSSFETEGQFTLIGIVLGLAIYNNCILDVHFPMVVYRKLMGKKGTFRDLGDSHPVLY
QSLKDLLEYEGNVEDDMMITFQISQTDLFGNPMMYDLKENGDKIPITNENRKEFVNLSYDILNKSVEKQFKAFRRGFHMVT
NESPLKYLFRPEEIELLICGSRNLDFQALEETTEYDGGYTRDSVLIREFWEIVHSFTDEQKRLFLQFTTGTDRAPVGGLGKL
KMIIAKNGPDTERLPTSHTCFNVLLPEYSSKEKLLKERLLKAITYAKGFGML

FIG. 3B

```
 721         CACC GAATGGCCAC AGCTTGTAAA AGATCAGGAG AACCTCAGTC TGACGACATT
 781 GAAGCTAGCC GAATGAAGCG AGCAGCTGCA AAGCATCTAA TAGAACGCTA CTACCACCAG
 841 TTAACTGAGG GCTGTGGAAA TGAAGCCTGC ACGAATGAGT TTTGTGCTTC CTGTCCAACT
 901 TTTCTTCGTA TGGATAATAA TGCAGCAGCT ATTAAAGCCC TCGAGCTTTA TAAGATTAAT
 961 GCAAAACTCT GTGATCCTCA TCCCTCCAAG AAAGGAGCAA GCTCAGCTTA CCTTGAGAAC
1021 TCGAAAGGTG CCCCCAACAA CTCCTGCTCT GAGATAAAAA TGAACAAGAA AGGCGCTAGA
1081 ATTGATTTTA AAGATGTGAC TTACTTAACA GAAGAGAAGG TATATGAAAT TCTTGAATTA
1141 TGTAGAGAAA GAGAGGATTA TTCCCCTTTA ATCCGTGTTA TTGGAAGAGT TTTTTCTAGT
1201 GCTGAGGCAT TGGTACAGAG CTTCCGGAAA GTTAAACAAC ACACCAAGGA AGAACTGAAA
1261 TCTCTTCAAG CAAAAGATGA AGACAAAGAT GAAGATGAAA AGGAAAAAGC TGCATGTTCT
1321 GCTGCTGCTA TGGAAGAAGA CTCAGAAGCA TCTTCCTCAA GGATAGGTGA TAGCTCACAG
1381 GGAGACAACA ATTTGCAAAA ATTAGGCCCT GATGATGTGT CTGTGGATAT TGATGCCATT
1441 AGAAGGGTCT ACACCAGATT GCTCTCTAAT GAAAAAATTG AAACTGCCTT TCTCAATGCA
1501 CTTGTATATT TGTCACCTAA CGTGGAATGT GACTTGACGT ATCACAATGT ATACTCTCGA
1561 GATCCTAATT ATCTGAATTT GTTCATTATC GTAATGGAGA ATAGAAATCT CCACAGTCCT
1621 GAATATCTGG AAATGGCTTT GCCATTATTT TGCAAAGCGA TGAGCAAGCT ACCCCTTGCA
1681 GCCCAAGGAA AACTGATCAG ACTGTGGTCT AAATACAATG CAGACCAGAT TCGGAGAATG
1741 ATGGAGACAT TCAGCAACT TATTACTTAT AAAGTCATAA GCAATGAATT TAACAGTCGA
1801 AATCTAGTGA ATGATGATGA TGCCATTGTT GCTGCTTCGA AGTGCTTGAA AATGGTTTAC
1861 TATGCAAATG TAGTGGGAGG GGAAGTGGAC ACAAATCACA ATGAAGAAGA TGATGAAGAG
1921 CCCATCCCTG AGTCCAGCGA GCTGACACTT CAGGAACTTT TGGGAGAAGA AAGAAGAAAC
1981 AAGAAGGTC CTCGAGTGGA CCCCCTGGAA ACTGAACTTG GTGTTAAAAC CCTGGATTGT
2041 CGAAAACCAC TTATCCCTTT TGAAGAGTTT ATTAATGAAC CACTGAATGA GGTTCTAGAA
2101 ATGGATAAAG ATTATACTTT TTTCAAAGTA GAAACAGAGA ACAAATTCTC TTTTATGACA
2161 TGTCCCTTTA TATTGAATGC TGTCACAAAG AATTTGGGAT TATATTATGA CAATAGAATT
2221 CGCATGTACA GTGAACGAAG AATCACTGTT CTCTACAGCT TAGTTCAAGG ACAGCAGTTG
2281 AATCCATATT TGAGACTCAA AGTTAGACGT GACCATATCA TAGATGATGC ACTTGTCCGG
2341 CTAGAGATGA TCGCTATGGA AAATCCTGCA GACTTGAAGA AGCAGTTGTA TGTGGAATTT
2401 GAAGGAGAAC AAGGAGTTGA TGAGGGAGGT GTTTCCAAAG AATTTTTCA GCTGGTTGTG
2461 GAGGAAATCT TCAATCCAGA TATTGGTATG TTCACATACG ATGAATCTAC AAAATTGTTT
2521 TGGTTTAATC CATCTTCTTT TGAAACTGAG GGTCAGTTTA CTCTGATTGG CATAGTACTG
2581 GGTCTGGCTA TTTACAATAA CTGTATACTG GATGTACATT TTCCCATGGT TGTCTACAGG
2641 AAGCTAATGG GGAAAAAAGG AACTTTTCGT GACTTGGGAG ACTCTCACCC AGTTCTATAT
2701 CAGAGTTTAA AAGATTTATT GGAGTATGAA GGGAATGTGG AAGATGACAT GATGATCACT
2761 TTCCAGATAT CACAGACAGA TCTTTTTGGT AACCCAATGA TGTATGATCT AAAGGAAAAT
2821 GGTGATAAAA TTCCAATTAC AAATGAAAAC AGGAAGGAAT TGTCAATCT TTATTCTGAC
2881 TACATTCTCA ATAAATCAGT AGAAAAACAG TTCAAGGCTT TTCGGAGAGG TTTTCATATG
2941 GTGACCAATG AATCTCCCTT AAAGTACTTA TTCAGACCAG AAGAAATTGA ATTGCTTATA
3001 TGTGGAAGCC GGAATCTAGA TTTCCAAGCA CTAGAAGAAA CTACAGAATA TGACGGTGGC
3061 TATACCAGGG ACTCTGTTCT GATTAGGGAG TTCTGGGAAA TCGTTCATTC ATTTACAGAT
3121 GAACAGAAAA GACTCTTCTT GCAGTTTACA ACGGGCACAG ACAGAGCACC TGTGGGAGGA
```

FIG. 13

```
 721       TTTT TTATGGCCAC AGCTTGTAAA AGATCAGGAG AACCTCAGTC TGACGACATT
 781 GAAGCTAGCA GGATGAAGCG AGCAGCTGCA AAGCATCTAA TAGAACGCTA CTACCACCAG
 841 TTAACTGAGG GCTGTGGAAA TGAAGCCTGC ACGAATGAGT TTTGTGCTTC CTGTCCAACT
 901 TTTCTTCGTA TGGATAATAA TGCAGCAGCT ATTAAAGCCC TCGAGCTTTA TAAGATTAAT
 961 GCAAAACTCT GTGATCCTCA TCCCTCCAAG AAAGGAGCAA GCTCAGCTTA CCTTGAGAAC
1021 TCGAAAGGTG CCCCCAACAA CTCCTGCTCT GAGATAAAAA TGAACAAGAA AGGCGCTAGA
1081 ATTGATTTTA AAGATGTGAC TTACTTAACA GAAGAGAAGG TATATGAAAT TCTTGAATTA
1141 TGTAGAGAAA GAGAGGATTA TTCCCCTTTA ATCCGTGTTA TTGGAAGAGT TTTTTCTAGT
1201 GCTGAGGCAT TGGTACAGAG CTTCCGGAAA GTTAAACAAC ACACCAAGGA AGAACTGAAA
1261 TCTCTTCAAG CAAAAGATGA AGACAAAGAT GAAGATGAAA AGGAAAAAGC TGCATGTTCT
1321 GCTGCTGCTA TGGAAGAAGA CTCAGAAGCA TCTTCCTCAA GGATAGGTGA TAGCTCACAG
1381 GGAGACAACA ATTTGCAAAA ATTAGGCCCT GATGATGTGT CTGTGGATAT TGATGCCATT
1441 AGAAGGGTCT ACACCAGATT GCTCTCTAAT GAAAAAATTG AAACTGCCTT TCTCAATGCA
1501 CTTGTATATT TGTCACCTAA CGTGGAATGT GACTTGACGT ATCACAATGT ATACTCTCGA
1561 GATCCTAATT ATCTGAATTT GTTCATTATC GTAATGGAGA ATAGAAATCT CCACAGTCCT
1621 GAATATCTGG AAATGGCTTT GCCATTATTT TGCAAAGCGA TGAGCAAGCT ACCCCTTGCA
1681 GCCCAAGGAA AACTGATCAG ACTGTGGTCT AAATACAATG CAGACCAGAT TCGGAGAATG
1741 ATGGAGACAT TCAGCAACT TATTACTTAT AAAGTCATAA GCAATGAATT TAACAGTCGA
1801 AATCTAGTGA ATGATGATGA TGCCATTGTT GCTGCTTCGA AGTGCTTGAA AATGGTTTAC
1861 TATGCAAATG TAGTGGGAGG GGAAGTGGAC ACAAATCACA ATGAAGAAGA TGATGAAGAG
1921 CCCATCCCTG AGTCCAGCGA GCTGACACTT CAGGAACTTT TGGGAGAAGA AAGAAGAAAC
1981 AAGAAGGTC CTCGAGTGGA CCCCCTGGAA ACTGAACTTG GTGTTAAAAC CCTGGATTGT
2041 CGAAAACCAC TTATCCCTTT TGAAGAGTTT ATTAATGAAC CACTGAATGA GGTTCTAGAA
2101 ATGGATAAAG ATTATACTTT TTTCAAAGTA GAAACAGAGA ACAAATTCTC TTTTATGACA
2161 TGTCCCTTTA TATTGAATGC TGTCACAAAG AATTTGGGAT TATATTATGA CAATAGAATT
2221 CGCATGTACA GTGAACGAAG AATCACTGTT CTCTACAGCT TAGTTCAAGG ACAGCAGTTG
2281 AATCCATATT TGAGACTCAA AGTTAGACGT GACCATATCA TAGATGATGC ACTTGTCCGG
2341 CTAGAGATGA TCGCTATGGA AAATCCTGCA GACTTGAAGA AGCAGTTGTA TGTGGAATTT
2401 GAAGGAGAAC AAGGAGTTGA TGAGGGAGGT GTTTCCAAAG AATTTTTTCA GCTGGTTGTG
2461 GAGGAAATCT TCAATCCAGA TATTGGTATG TTCACATACG ATGAATCTAC AAAATTGTTT
2521 TGGTTTAATC CATCTTCTTT TGAAACTGAG GGTCAGTTTA CTCTGATTGG CATAGTACTG
2581 GGTCTGGCTA TTTACAATAA CTGTATACTG GATGTACATT TTCCCATGGT TGTCTACAGG
2641 AAGCTAATGG GGAAAAAGG AACTTTTCGT GACTTGGGAG ACTCTCACCC AGTTCTATAT
2701 CAGAGTTTAA AAGATTTATT GGAGTATGAA GGGAATGTGG AAGATGACAT GATGATCACT
2761 TTCCAGATAT CACAGACAGA TCTTTTTGGT AACCCAATGA TGTATGATCT AAAGGAAAAT
2821 GGTGATAAAA TTCCAATTAC AAATGAAAAC AGGAAGGAAT TGTCAATCT TTATTCTGAC
2881 TACATTCTCA ATAAATCAGT AGAAAAACAG TTCAAGGCTT TCGGAGAGG TTTTCATATG
2941 GTGACCAATG AATCTCCCTT AAAGTACTTA TTCAGACCAG AAGAAATTGA ATTGCTTATA
3001 TGTGGAAGCC GGAATCTAGA TTTCCAAGCA CTAGAAGAAA CTACAGAATA TGACGGTGGC
3061 TATACCAGGG ACTCTGTTCT GATTAGGGAG TTCTGGGAAA TCGTTCATTC ATTTACAGAT
3121 GAACAGAAAA GACTCTTCTT GCAGTTTACA ACGGGCACAG ACAGAGCACC TGTGGGAGGA
```

FIG. 14

SEQUENCE LISTING

```
<160> NUMBER OF SEQ ID NOS: 27

<210> SEQ ID NO 1
<211> LENGTH: 5070
<212> TYPE: DNA
<213> ORGANISM: Homo sapiens

<400> SEQUENCE: 1
gctgcctgcc gggatactcg gcccgcccag ccagtcctcc cgtcttgcgc cgcggccgcg      60
agatccgtgt gtctcccaag atggtggcgc tgggctcggg gtgactacag gagacgacgg     120
ggccttttcc cttcgccagg acccgacaca ccaggcttcg ctcgctcgcg cacccctccg     180
ccgcgtagcc atccgccagc gcgggcgccc gccatccgcc gcctacttac gcttcacctc     240
```

-continued

| | |
|---|---|
| tgccgacccg gcgcgctcgg ctgcgggcgg cggcgcctcc ttcggctcct cctcggaata | 300 |
| gctcgcggcc tgtagcccct ggcaggaggg cccctcagcc ccccggtgtg gacaggcagc | 360 |
| ggcggctggc gacgaacgcc gggatttcgg cggcccccggc gctccctttc ccggcctcgt | 420 |
| tttccggata aggaagcgcg ggtcccgcat gagccccggc ggtggcggca gcgaaagaga | 480 |
| acgaggcggt ggcgggcgga ggcggcgggc gagggcgact acgaccagtg aggcggccgc | 540 |
| cgcagcccag gcgcggggggc gacgacagat caggagaacc tcagtctgac gacattgaag | 600 |
| ctagccgaat gaagcgagca gctgcaaagc atctaataga acgctactac caccagttaa | 660 |
| ctgagggctg tggaaatgaa gcctgcacga atgagttttg tgcttcctgt ccaacttttc | 720 |
| ttcgtatgga taataatgca gcagctatta aagccctcga gctttataag attaatgcaa | 780 |
| aactctgtga tcctcatccc tccaagaaag gagcaagctc agcttacctt gagaactcga | 840 |
| aaggtgcccc caacaactcc tgctctgaga taaaaatgaa caagaaaggc gctagaattg | 900 |
| attttaaaga tgtgacttac ttaacagaag agaaggtata tgaaattctt gaattatgta | 960 |
| gagaaagaga ggattattcc cctttaatcc gtgttattgg aagagttttt tctagtgctg | 1020 |
| aggcattggt acagagcttc cggaaagtta acaacacac caaggaagaa ctgaaatctc | 1080 |
| ttcaagcaaa agatgaagac aaagatgaag atgaaaagga aaaagctgca tgttctgctg | 1140 |
| ctgctatgga agaagactca gaagcatctt cctcaaggat aggtgatagc tcacagggag | 1200 |
| acaacaattt gcaaaaatta ggccctgatg atgtgtctgt ggatattgat gccattagaa | 1260 |
| gggtctacac cagattgctc tctaatgaaa aaattgaaac tgcctttctc aatgcacttg | 1320 |
| tatatttgtc acctaacgtg gaatgtgact tgacgtatca caatgtatac tctcgagatc | 1380 |
| ctaattatct gaatttgttc attatcgtaa tggagaatag aaatctccac agtcctgaat | 1440 |
| atctggaaat ggctttgcca ttattttgca agcgatgag caagctaccc cttgcagccc | 1500 |
| aaggaaaact gatcagactg tggtctaaat acaatgcaga ccagattcgg agaatgatgg | 1560 |
| agacatttca gcaacttatt acttataaag tcataagcaa tgaatttaac agtcgaaatc | 1620 |
| tagtgaatga tgatgatgcc attgttgctg cttcgaagtg cttgaaaatg gtttactatg | 1680 |
| caaatgtagt gggaggggaa gtggacacaa atcacaatga agaagatgat gaagagccca | 1740 |
| tccctgagtc cagcgagctg acacttcagg aacttttggg agaagaaaga agaaacaaga | 1800 |
| aaggtcctcg agtggacccc ctggaaactg aacttggtgt taaaaccctg gattgtcgaa | 1860 |
| aaccacttat ccctttttgaa gagtttatta tgaaccact gaatgaggtt ctagaaatgg | 1920 |
| ataaagatta tactttttttc aaagtagaaa cagagaacaa attctctttt atgacatgtc | 1980 |
| cctttatatt gaatgctgtc acaaagaatt tgggattata ttatgacaat agaattcgca | 2040 |
| tgtacagtga acgaagaatc actgttctct acagcttagt tcaaggacag cagttgaatc | 2100 |
| catatttgag actcaaagtt agacgtgacc atatcataga tgatgcactt gtccggctag | 2160 |
| agatgatcgc tatggaaaat cctgcagact tgaagaagca gttgtatgtg aatttgaag | 2220 |
| gagaacaagg agttgatgag ggaggtgttt ccaaagaatt ttttcagctg gttgtggagg | 2280 |
| aaatcttcaa tccagatatt ggtatgttca catacgatga atctacaaaa ttgttttggt | 2340 |
| ttaatccatc ttcttttgaa actgagggtc agtttactct gattggcata gtactgggtc | 2400 |
| tggctatttta caataactgt atactggatg tacatttttcc catggttgtc tacaggaagc | 2460 |
| taatggggaa aaaaggaact tttcgtgact tgggagactc tcacccagtt ctatatcaga | 2520 |
| gtttaaaaga tttattggag tatgaaggga atgtggaaga tgacatgatg atcactttcc | 2580 |

```
agatatcaca gacagatctt tttggtaacc caatgatgta tgatctaaag gaaaatggtg    2640
ataaaattcc aattacaaat gaaaacagga aggaatttgt caatctttat tctgactaca    2700
ttctcaataa atcagtagaa aaacagttca aggcttttcg gagaggtttt catatggtga    2760
ccaatgaatc tcccttaaag tacttattca gaccagaaga aattgaattg cttatatgtg    2820
gaagccggaa tctagatttc caagcactag aagaaactac agaatatgac ggtggctata    2880
ccagggactc tgttctgatt agggagttct gggaaatcgt tcattcattt acagatgaac    2940
agaaaagact cttcttgcag tttacaacgg gcacagacag agcacctgtg ggaggactag    3000
gaaaattaaa gatgattata gccaaaaatg gcccagacac agaaaggtta cctacatctc    3060
atacttgctt taatgtgctt ttacttccgg aatactcaag caaagaaaaa cttaaagaga    3120
gattgttgaa ggccatcacg tatgccaaag gatttggcat gctgtaaaac aaaacaaaac    3180
aaaataaaac aaaaaaaagg aaggaaaaaa aagaaaaaa tttaaaaaat tttaaaaata    3240
taacgaggga taaattttg gtggtgatag tgtcccagta caaaaaggct gtaagatagt    3300
caaccacagt agtcacctat gtctgtgcct cccttcttta ttggggacat gtgggctgga    3360
acagcagatt tcagctacat atatgaacaa atcctttatt attattataa ttatttttt    3420 gcgtgaaagt gttacatatt cttcacttg tatgtacaga gaggttttc tgaatattta    3480 ttttaagggt taaatcactt ttgcttgtgt ttattactgc ttgaggttga gccttttgag    3540
tatttaaaaa atatatacca acagaactac tctcccaagg aaaatattgc caccatttgt    3600
agaccacgta accttcaagt atgtgctact tttttgtccc tgtatctaac tcaaatcagg    3660
aactgtattt tttttaatga tttgcttttg aaacttgaag tcttgaaaac agtgtgatgc    3720
aattactgct gttctagccc ccaaagagtt ttctgtgcaa aatcttgaga atcaatcaat    3780
aaagaaagat ggaaggaagg gagaaattgg aatgttttaa ctgcagccct cagaacttta    3840
gtaacagcac aacaaattaa aaacaaaaac aactcatgcc acagtatgtc gtcttcatgt    3900
gtcttgcaat gaactgtttc agtagccaat cctctttctt agtatatgaa aggacaggga    3960 ttttgttct tgttgttctc gttgttgttt taagtttact ggggaaagtg catttggcca    4020
aatgaaatgg tagtcaagcc tattgcaaca aagttaggaa gtttgttgtt tgtttattat    4080
aaacaaaaag catgtgaaag tgcacttaag atagagtttt tattaattac ttacttatta    4140
cctagatttt aaatagacaa tccaaagtct ccccttcgtg ttgccatcat cttgttgaat    4200
cagccatttt atcgaggcac gtgatcagtg ttgcaacata atgaaaaga tggctactgt    4260 gccttgtgtt acttaatcat acagtaagct gacctggaaa tgaatgaaac tattactcct    4320
aagaattaca ttgtatagcc ccacagatta aatttaatta attaattcaa acatgttaa    4380 acgttacttt catgtactat ggaaaagtac aagtaggttt acattactga tttccagaag    4440
taagtagttt cccctttcct agtcttctgt gtatgtgatg ttgttaattt cttttattgc    4500
attataaaat aaaaggatta tgtatttta actaaggtga gacattgata tatcctttg    4560 ctacaagcta tagctaatgt gctgagcttg tgccttggtg attgattgat tgattgactg    4620
attgttttaa ctgattactg tagatcaacc tgatgatttg tttgtttgaa attggcagga    4680
aaaatgcagc tttcaaatca tgggggggag aaaaggatg tctttcagga ttattttaat    4740
taattttttt cataattgag acagaactgt tgttatgta ccataatgct aaataaaact    4800
gtggcacttt tcaccataat ttaatttagt ggaaaaagaa gacaatgctt tccatattgt    4860
gataaggtaa catgggtttt ttctgggcca gcctttagaa cactgttagg gtacatacgc    4920
taccttgatg aaagggacct tcgtgcaact gtagtcatct taaaggcttc tcatccactg    4980
```

-continued

| | |
|---|---|
| tgcttcttaa tgtgtaatta aagtgaggag aaattaaata ctctgagggc gttttatata | 5040 |
| ataaattcgt gaagaaatgt gtgctcttca | 5070 |

<210> SEQ ID NO 2
<211> LENGTH: 5319
<212> TYPE: DNA
<213> ORGANISM: Homo sapiens

<400> SEQUENCE: 2

| | |
|---|---|
| gctgcctgcc gggatactcg gcccgcccag ccagtcctcc cgtcttgcgc gcggccgcg | 60 |
| agatccgtgt gtctcccaag atggtggcgc tgggctcggg gtgactacag agacgacgg | 120 |
| ggccttttcc cttcgccagg acccgacaca ccaggcttcg ctcgctcgcg caccccctccg | 180 |
| ccgcgtagcc atccgccagc gcgggcgccc gccatccgcc gcctacttac gcttcacctc | 240 |
| tgccgacccg gcgcgctcgg ctgcgggcgg cggcgcctcc ttcggctcct cctcggaata | 300 |
| gctcgcggcc tgtagcccct ggcaggaggg cccctcagcc ccccggtgtg dacaggcagc | 360 |
| ggcggctggc gacgaacgcc gggatttcgg cggccccggc gctccctttc ccggcctcgt | 420 |
| tttccggata aggaagcgcg ggtcccgcat gagcccccggc ggtggcggca gcgaaagaga | 480 |
| acgaggcggt ggcgggcgga ggcggcgggc gagggcgact acgaccagtg aggcggccgc | 540 |
| cgcagcccag gcgcggggc gacgacaggt taaaaatctg taagagcctg attttagaat | 600 |
| tcaccagctc ctcagaagtt tggcgaaata tgagttatta agcctacgct cagatcaagg | 660 |
| tagcagctag actggtgtga caacctgttt ttaatcagtg actcaaagct gtgatcaccc | 720 |
| tgatgtcacc gaatggccac agcttgtaaa agagagttac agtggaggta aaaggagtgg | 780 |
| cttgcaggat ggagaagctg caccagtgtt attggaaatc aggagaacct cagtctgacg | 840 |
| acattgaagc tagccgaatg aagcgagcag ctgcaaagca tctaatagaa cgctactacc | 900 |
| accagttaac tgagggctgt ggaaatgaag cctgcacgaa tgagttttgt gcttcctgtc | 960 |
| caacttttct tcgtatggat aataatgcag cagctattaa agccctcgag ctttataaga | 1020 |
| ttaatgcaaa actctgtgat cctcatccct ccaagaaagg agcaagctca gcttaccttg | 1080 |
| agaactcgaa aggtgccccc aacaactcct gctctgagat aaaaatgaac aagaaaggcg | 1140 |
| ctagaattga ttttaaagat gtgacttact aacagaaga gaaggtatat gaaattcttg | 1200 |
| aattatgtag agaaagagag gattattccc ctttaatccg tgttattgga agagtttttt | 1260 |
| ctagtgctga ggcattggta cagagcttcc ggaaagttaa acaacacacc aaggaagaac | 1320 |
| tgaaatctct tcaagcaaaa gatgaagaca aagatgaaga tgaaaaggaa aaagctgcat | 1380 |
| gttctgctgc tgctatggaa gaagactcag aagcatcttc ctcaaggata ggtgatagct | 1440 |
| cacagggaga caacaatttg caaaaattag gccctgatga tgtgtctgtg atattgatg | 1500 |
| ccattagaag ggtctacacc agattgctct ctaatgaaaa aattgaaact gcctttctca | 1560 |
| atgcacttgt atatttgtca cctaacgtgg aatgtgactt gacgtatcac aatgtatact | 1620 |
| ctcgagatcc taattatctg aatttgttca ttatcgtaat ggagaataga aatctccaca | 1680 |
| gtcctgaata tctggaaatg gctttgccat tattttgcaa agcgatgagc aagctacccc | 1740 |
| ttgcagccca aggaaaactg atcagactgt ggtctaaata caatgcagac cagattcgga | 1800 |
| gaatgatgga gacatttcag caacttatta cttataaagt cataagcaat gaatttaaca | 1860 |
| gtcgaaatct agtgaatgat gatgatgcca ttgttgctgc ttcgaagtgc ttgaaaatgg | 1920 |
| tttactatgc aaatgtagtg ggaggggaag tggacacaaa tcacaatgaa gaagatgatg | 1980 |

```
aagagcccat ccctgagtcc agcgagctga cacttcagga acttttggga gaagaaagaa    2040
gaaacaagaa aggtcctcga gtggaccccc tggaaactga acttggtgtt aaaaccctgg    2100
attgtcgaaa accacttatc cctttttgaag agtttattaa tgaaccactg aatgaggttc   2160
tagaaatgga taaagattat acttttttca agtagaaac agagaacaaa ttctctttta    2220
tgacatgtcc ctttatattg aatgctgtca caaagaattt gggattatat tatgacaata   2280
gaattcgcat gtacagtgaa cgaagaatca ctgttctcta cagcttagtt caaggacagc   2340
agttgaatcc atatttgaga ctcaaagtta gacgtgacca tatcatagat gatgcacttg   2400
tccggctaga gatgatcgct atggaaaatc ctgcagactt gaagaagcag ttgtatgtgg   2460
aatttgaagg agaacaagga gttgatgagg gaggtgtttc caaagaattt tttcagctgg   2520
ttgtggagga aatcttcaat ccagatattg gtatgttcac atacgatgaa tctacaaaat   2580
tgttttggtt taatccatct tctttttgaaa ctgagggtca gtttactctg attggcatag   2640
tactgggtct ggctatttac aataactgta tactggatgt acatttttccc atggttgtct   2700 acaggaagct aatggggaaa aaaggaactt ttcgtgactt gggagactct cacccagttc   2760
tatatcagag tttaaaagat ttattggagt atgaagggaa tgtggaagat gacatgatga   2820
tcactttcca gatatcacag acagatcttt ttggtaaccc aatgatgtat gatctaaagg   2880
aaaatggtga taaaattcca attacaaatg aaaacaggaa ggaatttgtc aatctttatt   2940
ctgactacat tctcaataaa tcagtagaaa acagttcaa ggcttttcgg agaggttttc    3000
atatggtgac caatgaatct cccttaaagt acttattcag accagaagaa attgaattgc   3060
ttatatgtgg aagccggaat ctagatttcc aagcactaga agaaactaca gaatatgacg   3120
gtggctatac cagggactct gttctgatta gggagttctg ggaaatcgtt cattcattta   3180
cagatgaaca gaaaagactc ttcttgcagt ttacaacggg cacagacaga gcacctgtgg   3240
gaggactagg aaaattaaag atgattatag ccaaaaatgg cccagacaca gaaaggttac   3300
ctacatctca tacttgcttt aatgtgcttt tacttccgga atactcaagc aaagaaaaac   3360
ttaaagagag attgttgaag gccatcacgt atgccaaagg atttggcatg ctgtaaaaca   3420
aaacaaaaca aaataaaaca aaaaaaagga aggaaaaaaa aagaaaaaat ttaaaaaatt   3480
ttaaaaatat aacgagggat aaattttttgg tggtgatagt gtcccagtac aaaaaggctg   3540
taagatagtc aaccacagta gtcacctatg tctgtgcctc ccttctttat tgggacatg    3600 tgggctggaa cagcagattt cagctacata tatgaacaaa tcctttatta ttattataat   3660 tattttttg cgtgaaagtg ttacatattc tttcacttgt atgtacagag aggttttttct   3720 gaatatttat tttaagggtt aaatcacttt tgcttgtgtt tattactgct tgaggttgag   3780 cctttttgagt atttaaaaaa tatataccaa cagaactact ctcccaagga aaatattgcc   3840
accatttgta gaccacgtaa ccttcaagta tgtgctactt ttttgtccct gtatctaact   3900
caaatcagga actgtatttt ttttaatgat ttgcttttga aacttgaagt cttgaaaaca   3960
gtgtgatgca attactgctg ttctagcccc caaagagttt tctgtgcaaa atcttgagaa   4020
tcaatcaata aagaaagatg gaaggaaggg agaaattgga atgttttaac tgcagccctc   4080
agaactttag taacagcaca acaaattaaa aacaaaaaca actcatgcca cagtatgtcg   4140
tcttcatgtg tcttgcaatg aactgtttca gtagccaatc ctctttctta gtatatgaaa   4200
ggacagggat ttttgttctt gttgttctcg ttgttgtttt aagtttactg gggaaagtgc   4260
atttggccaa atgaaatggt agtcaagcct attgcaacaa agttaggaag tttgttgttt   4320
gtttattata aacaaaaagc atgtgaaagt gcacttaaga tagagttttt attaattact   4380
```

| | |
|---|---|
| tacttattac ctagatttta aatagacaat ccaaagtctc cccttcgtgt tgccatcatc | 4440 |
| ttgttgaatc agccatttta tcgaggcacg tgatcagtgt tgcaacataa tgaaaaagat | 4500 |
| ggctactgtg ccttgtgtta cttaatcata cagtaagctg acctggaaat gaatgaaact | 4560 |
| attactccta agaattacat tgtatagccc cacagattaa atttaattaa ttaattcaaa | 4620 |
| acatgttaaa cgttactttc atgtactatg gaaaagtaca agtaggttta cattactgat | 4680 |
| ttccagaagt aagtagtttc ccctttccta gtcttctgtg tatgtgatgt tgttaatttc | 4740 |
| ttttattgca ttataaaata aaaggattat gtattttaa ctaaggtgag acattgatat | 4800 |
| atccttttgc tacaagctat agctaatgtg ctgagcttgt gccttggtga ttgattgatt | 4860 |
| gattgactga ttgttttaac tgattactgt agatcaacct gatgatttgt ttgtttgaaa | 4920 |
| ttggcaggaa aaatgcagct ttcaaatcat tgggggaga aaaaggatgt cttcaggat | 4980 |
| tattttaatt aattttttc ataattgaga cagaactgtt tgttatgtac cataatgcta | 5040 |
| aataaaactg tggcactttt caccataatt taatttagtg gaaaagaag acaatgcttt | 5100 |
| ccatattgtg ataaggtaac atggggtttt tctgggccag cctttagaac actgttaggg | 5160 |
| tacatacgct accttgatga aagggaccttt cgtgcaactg tagtcatctt aaaggcttct | 5220 |
| catccactgt gcttcttaat gtgtaattaa agtgaggaga aattaaatac tctgagggcg | 5280 |
| ttttatataa taaattcgtg aagaaatgtg tgctcttca | 5319 |

<210> SEQ ID NO 3
<211> LENGTH: 5254
<212> TYPE: DNA
<213> ORGANISM: Homo sapiens

<400> SEQUENCE: 3

| | |
|---|---|
| gctgcctgcc gggatactcg gcccgcccag ccagtcctcc cgtcttgcgc cgcggccgcg | 60 |
| agatccgtgt gtctcccaag atggtggcgc tgggctcggg gtgactacag gagacgacgg | 120 |
| ggccttttcc cttcgccagg acccgacaca ccaggcttcg ctcgctcgcg caccccctccg | 180 |
| ccgcgtagcc atccgccagc gcgggcgccc gccatccgcc gcctacttac gcttcacctc | 240 |
| tgccgacccg gcgcgctcgg ctgcgggcgg cggcgcctcc ttcggctcct cctcggaata | 300 |
| gctcgcggcc tgtagcccct ggcaggaggg cccctcagcc cccggtgtg acaggcagc | 360 |
| ggcggctggc gacgaacgcc gggatttcgg cggcccggc gctcccttc ccggcctcgt | 420 |
| tttccggata aggaagcgcg ggtcccgcat gagccccggc ggtggcggca gcgaaagaga | 480 |
| acgaggcggt ggcgggcgga ggcggcgggc gagggcgact acgaccagtg aggcggccgc | 540 |
| cgcagcccag gcgcgggggc gacgacaggt taaaaatctg taagagcctg attttagaat | 600 |
| tcaccagctc ctcagaagtt tggcgaaata tgagttatta agcctacgct cagatcaagg | 660 |
| tagcagctag actggtgtga caacctgttt ttaatcagtg actcaaagct gtgatcaccc | 720 |
| tgatgtcacc gaatgccac agcttgtaaa agatcaggag aacctcagtc tgacgacatt | 780 |
| gaagctagcc gaatgaagcg agcagctgca aagcatctaa tagaacgcta ctaccaccag | 840 |
| ttaactgagg gctgtggaaa tgaagcctgc acgaatgagt tttgtgcttc ctgtccaact | 900 |
| tttcttcgta tggataataa tgcagcagct attaaagccc tcgagcttta taagattaat | 960 |
| gcaaaactct gtgatcctca tccctccaag aaaggagcaa gctcagctta ccttgagaac | 1020 |
| tcgaaaggtg cccccaacaa ctcctgctct gagataaaaa tgaacaagaa aggcgctaga | 1080 |
| attgatttta aagatgtgac ttacttaaca gaagagaagg tatatgaaat tcttgaatta | 1140 |

```
tgtagagaaa gagaggatta ttccccttta atccgtgtta ttggaagagt tttttctagt    1200
gctgaggcat tggtacagag cttccggaaa gttaaacaac acaccaagga agaactgaaa    1260
tctcttcaag caaagatga agacaaagat gaagatgaaa aggaaaaagc tgcatgttct     1320
gctgctgcta tggaagaaga ctcagaagca tcttcctcaa ggataggtga tagctcacag    1380
ggagacaaca atttgcaaaa attaggccct gatgatgtgt ctgtggatat tgatgccatt    1440
agaagggtct acaccagatt gctctctaat gaaaaaattg aaactgcctt tctcaatgca    1500
cttgtatatt tgtcacctaa cgtggaatgt gacttgacgt atcacaatgt atactctcga    1560
gatcctaatt atctgaattt gttcattatc gtaatggaga atagaaatct ccacagtcct    1620
gaatatctgg aaatggcttt gccattattt tgcaaagcga tgagcaagct accccttgca    1680
gcccaaggaa aactgatcag actgtggtct aaatacaatg cagaccagat tcggagaatg    1740
atggagacat ttcagcaact tattacttat aaagtcataa gcaatgaatt taacagtcga    1800
aatctagtga atgatgatga tgccattgtt gctgcttcga agtgcttgaa aatggtttac    1860
tatgcaaatg tagtgggagg ggaagtggac acaaatcaca atgaagaaga tgatgaagag    1920
cccatccctg agtccagcga gctgacactt caggaacttt tgggagaaga agaagaaac    1980 aagaaaggtc ctcgagtgga cccccctggaa actgaacttg tgttaaaac cctggattgt    2040 cgaaaaccac ttatcccttt tgaagagttt attaatgaac cactgaatga ggttctagaa    2100
atggataaag attatacttt tttcaaagta gaaacagaga acaaattctc ttttatgaca    2160 tgtccccttta tattgaatgc tgtcacaaag aatttgggat tatattatga caatagaatt    2220
cgcatgtaca gtgaacgaag aatcactgtt ctctacagct tagttcaagg acagcagttg    2280
aatccatatt tgagactcaa agttagacgt gaccatatca tagatgatgc acttgtccgg    2340
ctagagatga tcgctatgga aaatcctgca gacttgaaga agcagttgta tgtggaattt    2400
gaaggagaac aaggagttga tgagggaggt gttccaaagg aatttttttca gctggttgtg    2460 gaggaaatct tcaatccaga tattggtatg ttcacatacg atgaatctac aaaattgttt    2520
tggtttaatc catcttcttt tgaaactgag ggtcagttta ctctgattgg catagtactg    2580
ggtctggcta tttacaataa ctgtatactg gatgtacatt ttcccatggt tgtctacagg    2640
aagctaatgg ggaaaaaagg aacttttcgt gacttgggag actctcaccc agttctatat    2700
cagagtttaa aagatttatt ggagtatgaa gggaatgtgg aagatgacat gatgatcact    2760
ttccagatat cacagacaga tctttttggt aacccaatga tgtatgatct aaaggaaaat    2820
ggtgataaaa ttccaattac aaatgaaaac aggaaggaat tgtcaatct ttattctgac    2880 tacattctca ataaatcagt agaaaaacag ttcaaggctt ttcggagagg ttttcatatg    2940
gtgaccaatg aatctccctt aaagtactta ttcagaccag aagaaattga attgcttata    3000
tgtggaagcc ggaatctaga tttccaagca ctagaagaaa ctacagaata tgacggtggc    3060
tataccaggg actctgttct gattagggag ttctgggaaa tcgttcattc atttacagat    3120
gaacagaaaa gactcttctt gcagtttaca acgggcacag acagagcacc tgtgggagga    3180
ctaggaaaat taaagatgat tatagccaaa aatggcccag acacagaaag gttacctaca    3240
tctcatactt gctttaatgt gcttttactt ccggaatact caagcaaaga aaaacttaaa    3300
gagagattgt tgaaggccat cacgtatgcc aaaggatttg gcatgctgta aaacaaaaca    3360
aaacaaaata aaacaaaaaa aaggaaggaa aaaaaagaa aaatttaaa aaattttaaa    3420 aatataacga gggataaatt tttggtggtg atagtgtccc agtacaaaaa ggctgtaaga    3480
tagtcaacca cagtagtcac ctatgtctgt gcctcccttc tttattgggg acatgtgggc    3540
```

```
tggaacagca gatttcagct acatatatga acaaatcctt tattattatt ataattattt    3600
ttttgcgtga aagtgttaca tattctttca cttgtatgta cagagaggtt tttctgaata    3660
tttattttaa gggttaaatc acttttgctt gtgtttatta ctgcttgagg ttgagccttt    3720
tgagtattta aaaaatatat accaacagaa ctactctccc aaggaaaata ttgccaccat    3780
ttgtagacca cgtaaccttc aagtatgtgc tactttttg tccctgtatc taactcaaat     3840
caggaactgt atttttttta atgatttgct tttgaaactt gaagtcttga aaacagtgtg    3900
atgcaattac tgctgttcta gcccccaaag agttttctgt gcaaaatctt gagaatcaat    3960
caataaagaa agatggaagg aagggagaaa ttggaatgtt ttaactgcag ccctcagaac    4020
tttagtaaca gcacaacaaa ttaaaaacaa aaacaactca tgccacagta tgtcgtcttc    4080
atgtgtcttg caatgaactg tttcagtagc caatcctctt tcttagtata tgaaaggaca    4140 gggattttg ttcttgttgt tctcgttgtt gttttaagtt tactggggaa agtgcatttg     4200
gccaaatgaa atggtagtca agcctattgc aacaaagtta ggaagtttgt tgtttgttta    4260
ttataaacaa aaagcatgtg aaagtgcact taagatagag ttttattaa ttacttactt     4320 attacctaga ttttaaatag acaatccaaa gtctccccctt cgtgttgcca tcatcttgtt   4380
gaatcagcca ttttatcgag gcacgtgatc agtgttgcaa cataatgaaa aagatggcta   4440
ctgtgccttg tgttacttaa tcatacagta agctgacctg gaaatgaatg aaactattac    4500
tcctaagaat tacattgtat agccccacag attaaattta attaattaat tcaaaacatg    4560
ttaaacgtta ctttcatgta ctatggaaaa gtacaagtag gtttacatta ctgatttcca    4620
gaagtaagta gtttcccctt tcctagtctt ctgtgtatgt gatgttgtta atttcttta    4680 ttgcattata aaataaaagg attatgtatt tttaactaag gtgagacatt gatatatcct    4740
tttgctacaa gctatagcta atgtgctgag cttgtgcctt ggtgattgat tgattgattg    4800
actgattgtt ttaactgatt actgtagatc aacctgatga tttgtttgtt tgaaattggc    4860
aggaaaaatg cagcttttcaa atcattgggg ggagaaaaag gatgtctttc aggattattt   4920
taattaattt ttttcataat tgagacagaa ctgtttgtta tgtaccataa tgctaaataa    4980
aactgtggca cttttcacca taattttaatt tagtggaaaa agaagacaat gctttccata   5040
ttgtgataag gtaacatggg gttttttctgg gccagccttt agaacactgt tagggtacat   5100
acgctacctt gatgaaaggg accttcgtgc aactgtagtc atcttaaagg cttctcatcc    5160
actgtgcttc ttaatgtgta attaaagtga ggagaaatta aatactctga gggcgtttta    5220
tataataaat tcgtgaagaa atgtgtgctc ttca                                5254

<210> SEQ ID NO 4
<211> LENGTH: 10
<212> TYPE: RNA
<213> ORGANISM: Homo sapiens

<400> SEQUENCE: 4
ugcaggaugg                                                              10

<210> SEQ ID NO 5
<211> LENGTH: 10
<212> TYPE: RNA
<213> ORGANISM: Homo sapiens

<400> SEQUENCE: 5
caccgaaugg                                                              10
```

```
<210> SEQ ID NO 6
<211> LENGTH: 10
<212> TYPE: RNA
<213> ORGANISM: Artificial
<220> FEATURE:
<223> OTHER INFORMATION: modified UBE3A first Kozak sequence

<400> SEQUENCE: 6
uuuuuuaugg                                                            10

<210> SEQ ID NO 7
<211> LENGTH: 10
<212> TYPE: RNA
<213> ORGANISM: Homo sapiens

<400> SEQUENCE: 7
agccgaauga                                                            10

<210> SEQ ID NO 8
<211> LENGTH: 10
<212> TYPE: RNA
<213> ORGANISM: Artificial
<220> FEATURE:
<223> OTHER INFORMATION: modified UBE3A second Kozak sequence

<400> SEQUENCE: 8
agcaggauga                                                            10

<210> SEQ ID NO 9
<211> LENGTH: 2622
<212> TYPE: DNA
<213> ORGANISM: Artificial
<220> FEATURE:
<223> OTHER INFORMATION: human codon-optimized UBE3A isoform 1 and
      isoform 3

<400> SEQUENCE: 9
atggccacag cttgtaaaag atcaggagaa cctcagtctg acgacattga agctagcagg      60
atgaagagag ccgccgcaaa gcacctgatc gaacgctact accatcagct caccgagggt     120
tgcggcaacg aagcgtgtac caacgagttc tgtgcctcct gccccacgtt cctgcggatg     180
gataacaatg ccgccgcaat caaggcgctt gaactgtata agatcaacgc caagctgtgc     240
gatccccacc cttccaagaa gggagccagc tcagcctacc tggaaaactc caagggcgcc     300
cctaacaact catgctccga gatcaagatg aataagaagg gcgcccggat tgacttcaag     360
gatgtgacct acctgaccga ggagaaggtg tacgagatcc tggaactctg ccgagaacgg     420
gaggactact cccctctgat ccgcgtgatc ggaagagtgt tcagctccgc tgaagcgctc     480
gtgcagtcgt tcagaaaggt caagcagcac actaaggaag aactcaagtc cctgcaggcc     540
aaagatgagg ataaggacga agatgaaaaa gaaaaggccg cctgctcagc tgccgcgatg     600
gaagaagatt cagaggcctc cagcagcagg attggcgaca gctcccaggg ggacaacaac     660
ctccagaagc tgggtccaga cgatgtgtcg gtggacatcg acgccattcg agagtgtac      720 acccgactgc tctcgaacga aaagatcgag actgcattcc tgaacgccct tgtctacctg     780
agcccgaacg tggaatgcga ccttacttac cataacgtct actcccggga cccaaactac     840
ctgaacctgt tcatcatcgt gatggaaaac cggaacctcc attccccga gtacctggaa      900 atggccctgc cctgttttctg caaggccatg tcaaagcttc gctggccgc acaaggaaag     960 ctgatccgct tgtggtccaa gtacaacgcg gaccagatca gacgcatgat ggaaacgttc    1020
```

```
cagcaactga ttacttacaa ggtcatctcc aatgagttca actcccggaa tcttgtgaac    1080
gacgatgatg ccattgtggc cgcctccaaa tgcctgaaga tggtctacta tgcgaacgtc    1140
gtgggcgggg aagtcgatac caaccacaac gaggaggacg acgaggaacc tatccctgag    1200
tcatcagaac tgactctgca agaactgctg ggcgaagaac gccggaacaa gaagggccca    1260
agagtcgacc cgttggaaac cgaactggga gtcaaaaccc tggactgcag aaagcctctg    1320
atcccgttcg aagagttcat caacgaaccc ctgaacgagg tgctgaaaat ggacaaggac    1380
tacaccttct tcaaggtcga aaccgagaac aagttctctt tcatgacttg cccgttcatt    1440
ctgaacgcag tgaccaagaa cctgggcctc tactacgaca accgcatccg catgtacagc    1500
gaacgccgca tcaccgtgct gtactccctg gtgcaaggcc aacagctgaa cccctacctt    1560
cgcctgaaag tccgccgcga ccatatcatt gatgacgctc tcgtgcgcct tgagatgatc    1620
gcgatggaga ccccgcaga tctgaagaag cagctctacg tcgagttcga aggagaacag    1680
ggggtggacg aaggaggagt gtccaaggag ttctttcagc tcgtggtgga ggaaatcttt    1740
aaccctgaca tcggaatgtt cacctatgac gaatccacaa agctgttttg gtttaacccg    1800
tcctcgttcg aaactgaggg tcaattcacc ctcatcggca ttgtgctggg actcgccatc    1860
tacaacaatt gcatcctcga cgtgcacttc ccgatggtgg tgtaccgcaa actgatgggc    1920
aaaaagggaa ccttcagaga tctgggagac tcacacccgg tgctgtacca gtcgctcaag    1980
gacttgttgg aatacgaagg gaacgtggaa gatgatatga tgattacctt ccaaatctcg    2040
cagactgact tgtttggaaa ccctatgatg tacgacctga aggagaatgg agacaagatc    2100
ccgatcacga acgaaaaccg caaggagttc gtcaacctgt actccgacta tattctgaac    2160
aagagcgtgg agaagcagtt taaggctttc cgccggggat tccacatggt caccaacgaa    2220
agcccgctca gtacctcttt tcggcccgaa gagattgaac tgctgatctg cgggtcgagg    2280
aatctggact tccaggccct tgaagagact actgagtacg acggaggcta tacccgggac    2340
tccgtgctga taagagagtt ctgggagatc gtgcactcct tcaccgatga gcagaagcgg    2400
ctgttcctcc aattcaccac cggcactgac agagcgccag tcggaggact ggggaagctg    2460
aagatgatca ttgcgaagaa cggtcccgac actgagaggt tgcccacttc ccacacttgt    2520
ttcaacgtgc tgctgctccc ggagtactcc tccaaggaga agctgaagga acggctcctg    2580
aaggccatta catacgccaa aggtttcggc atgctttaat ga                        2622
```

<210> SEQ ID NO 10
<211> LENGTH: 471
<212> TYPE: DNA
<213> ORGANISM: Homo sapiens

<400> SEQUENCE: 10

```
ggtaccaggg ccctgcgtat gagtgcaagt gggttttagg accaggatga ggcggggtgg      60
gggtgcctac ctgacgaccg accccgaccc actggacaag cacccaaccc ccattcccca     120
aattgcgcat cccctatcag agaggggag gggaaacagg atgcggcgag gcgcgtgcgc     180
actgccagct tcagcaccgc ggacagtgcc ttcgcccccg cctggcggcg cgcgccaccg     240
ccgcctcagc actgaaggcg cgctgacgtc actcgccggt cccccgcaaa ctcccccttcc     300 cggccacctt ggtcgcgtcc gcgccgccgc cggcccagcc ggaccgcacc acgcgaggcg     360
cgagataggg gggcacgggc gcgaccatct gcgctgcggc gccggcgact cagcgctgcc     420
tcagtctgcg gtgggcagcg gaggagtcgt gtcgtgcctg agagcgcagt c               471
```

<210> SEQ ID NO 11
<211> LENGTH: 254
<212> TYPE: DNA
<213> ORGANISM: Artificial
<220> FEATURE:
<223> OTHER INFORMATION: growth hormone polyadenylation signal

<400> SEQUENCE: 11

```
ctcgactgtg ccttctagtt gccagccatc tgttgtttgc ccctcccccg tgccttcctt      60
gaccctggaa ggtgccactc ccactgtcct ttcctaataa aatgaggaaa ttgcatcgca     120
ttgtctgagt aggtgtcatt ctattctggg gggtggggtg gggcaggaca gcaaggggga     180
ggattgggaa gacaacagca ggcatgctgg ggatgcggtg ggctctatgg cttctgaggc     240
ggaaagaacc agct                                                       254
```

<210> SEQ ID NO 12
<211> LENGTH: 48
<212> TYPE: DNA
<213> ORGANISM: Artificial
<220> FEATURE:
<223> OTHER INFORMATION: synthetic polyadenylation signal

<400> SEQUENCE: 12

```
aataaagagc tcagatgcat cgatcagagt gtgttggttt tttgtgtg                   48
```

<210> SEQ ID NO 13
<211> LENGTH: 143
<212> TYPE: DNA
<213> ORGANISM: Artificial
<220> FEATURE:
<223> OTHER INFORMATION: Simian virus 40

<400> SEQUENCE: 13

```
agacatgata agatacattg atgagtttgg acaaaccaca actagaatgc agtgaaaaaa      60
atgctttatt tgtgaaattt gtgatgctat tgctttattt gtaaccatta taagctgcaa     120
taaacaagtt aacaacaaca att                                             143
```

<210> SEQ ID NO 14
<211> LENGTH: 3396
<212> TYPE: DNA
<213> ORGANISM: Artificial
<220> FEATURE:
<223> OTHER INFORMATION: human UBE3A expression cassette

<400> SEQUENCE: 14

```
gaattcggta ccagggccct gcgtatgagt gcaagtgggt tttaggacca ggatgaggcg      60
gggtgggggt gcctacctga cgaccgaccc cgacccactg acaagcaccc aaccccccat     120
tccccaaatt gcgcatcccc tatcagagag ggggagggga aacaggatgc ggcgaggcgc     180
gtgcgcactg ccagcttcag caccgcggac agtgccttcg ccccgcctg gcggcgcgcg     240
ccaccgccgc ctcagcactg aaggcgcgct gacgtcactc gccggtcccc cgcaaactcc     300
ccttcccggc caccttggtc gcgtccgcgc cgccgccggc ccagccggac cgcaccacgc     360
gaggcgcgag atagggggc acgggcgcga ccatctgcgc tgcggcgccg gcgactcagc      420
gctgcctcag tctgcggtgg gcagcggagg agtcgtgtcg tgcctgagag cgcagtctct     480
ccgattttt atggccacag cttgtaaaag atcaggagaa cctcagtctg acgacattga     540
agctagcagg atgaagagag ccgccgcaaa gcacctgatc gaacgctact accatcagct     600
caccgagggt tgcggcaacg aagcgtgtac caacgagttc tgtgcctcct gccccacgtt     660
```

```
cctgcggatg gataacaatg ccgccgcaat caaggcgctt gaactgtata agatcaacgc    720
caagctgtgc gatccccacc cttccaagaa gggagccagc tcagcctacc tggaaaactc    780
caagggcgcc cctaacaact catgctccga gatcaagatg aataagaagg gcgcccggat    840
tgacttcaag gatgtgacct acctgaccga ggagaaggtg tacgagatcc tggaactctg    900
ccgagaacgg gaggactact cccctctgat ccgcgtgatc ggaagagtgt tcagctccgc    960
tgaagcgctc gtgcagtcgt tcagaaaggt caagcagcac actaaggaag aactcaagtc   1020
cctgcaggcc aaagatgagg ataaggacga agatgaaaaa gaaaaggccg cctgctcagc   1080
tgccgcgatg gaagaagatt cagaggcctc cagcagcagg attggcgaca gctcccaggg   1140
ggacaacaac ctccagaagc tgggtccaga cgatgtgtcg gtggacatcg acgccattcg   1200
gagagtgtac acccgactgc tctcgaacga aaagatcgag actgcattcc tgaacgccct   1260
tgtctacctg agcccgaacg tggaatgcga ccttacttac cataacgtct actcccggga   1320
cccaaactac ctgaacctgt tcatcatcgt gatggaaaac cggaacctcc attccccga    1380 gtacctggaa atggccctgc ccctgttctg caaggccatg tcaaagcttc cgctggccgc   1440
acaaggaaag ctgatccgct tgtggtccaa gtacaacgcg gaccagatca gacgcatgat   1500
ggaaacgttc cagcaactga ttacttacaa ggtcatctcc aatgagttca actcccggaa   1560
tcttgtgaac gacgatgatg ccattgtggc cgcctccaaa tgcctgaaga tggtctacta   1620
tgcgaacgtc gtgggcgggg aagtcgatac caaccacaac gaggaggacg acgaggaacc   1680
tatccctgag tcatcagaac tgactctgca agaactgctg ggcgaagaac gccggaacaa   1740
gaagggccca agagtcgacc cgttggaaac cgaactggga gtcaaaaccc tggactgcag   1800
aaagcctctg atcccgttcg aagagttcat caacgaaccc ctgaacgagg tgctggaaat   1860
ggacaaggac tacaccttct tcaaggtcga accgagaaac aagttctctt tcatgacttg   1920
cccgttcatt ctgaacgcag tgaccaagaa cctgggcctc tactacgaca accgcatccg   1980
catgtacagc gaacgccgca tcaccgtgct gtactccctg gtgcaaggcc aacagctgaa   2040
cccctacctt cgcctgaaag tccgccgcga ccatatcatt gatgacgctc tcgtgcgcct   2100
tgagatgatc gcgatggaga accccgcaga tctgaagaag cagctctacg tcgagttcga   2160
aggagaacag ggggtggacg aaggaggagt gtccaaggag ttctttcagc tcgtggtgga   2220
ggaaatcttt aaccctgaca tcggaatgtt cacctatgac gaatccacaa agctgttttg   2280
gtttaacccg tcctcgttcg aaactgaggg tcaattcacc ctcatcggca ttgtgctggg   2340
actcgccatc tacaacaatt gcatcctcga cgtgcacttc ccgatggtgg tgtaccgcaa   2400
actgatgggc aaaaagggaa ccttcagaga tctgggagac tcacacccgg tgctgtacca   2460
gtcgctcaag gacttgttgg aatacgaagg gaacgtggaa gatgatatga tgattacctt   2520
ccaaatctcg cagactgact tgtttggaaa ccctatgatg tacgacctga aggagaatgg   2580
agacaagatc ccgatcacga acgaaaaccg caaggagttc gtcaacctgt actccgacta   2640
tattctgaac aagagcgtgg agaagcagtt taaggctttc cgccggggat ccacatggt    2700 caccaacgaa agcccgctca agtacctctt tcggcccgaa gagattgaac tgctgatctg   2760
cgggtcgagg aatctggact tccaggccct tgaagagact actgagtacg acggaggcta   2820 taccccgggac tccgtgctga taagagagtt ctgggagatc gtgcactcct tcaccgatga   2880
gcagaagcgg ctgttcctcc aattcaccac cggcactgac agagcgccag tcggaggact   2940
ggggaagctg aagatgatca ttgcgaagaa cggtcccgac actgagaggt tgcccacttc   3000
ccacacttgt ttcaacgtgc tgctgctccc ggagtactcc tccaaggaga agctgaagga   3060
```

```
acggctcctg aaggccatta catacgccaa aggtttcggc atgctttaat gactcgagcg   3120
gccgcgggat ccctcgagac tgtgccttct agttgccagc catctgttgt ttgcccctcc   3180
cccgtgcctt ccttgaccct ggaaggtgcc actcccactg tcctttccta ataaaatgag   3240
gaaattgcat cgcattgtct gagtaggtgt cattctattc tggggggtgg ggtggggcag   3300
gacagcaagg gggaggattg gaagacaac agcaggcatg ctggggatgc ggtgggctct    3360
atggcttctg aggcggaaag aaccagctga ccgcgt                             3396
```

<210> SEQ ID NO 15
<211> LENGTH: 34
<212> TYPE: PRT
<213> ORGANISM: Homo sapiens

<400> SEQUENCE: 15

Met Lys Arg Ala Ala Lys His Leu Ile Glu Arg Tyr Tyr His Gln
1               5                   10                  15

Leu Thr Glu Gly Cys Gly Asn Glu Ala Cys Thr Asn Glu Phe Cys Ala
            20                  25                  30

Ser Cys

<210> SEQ ID NO 16
<211> LENGTH: 57
<212> TYPE: PRT
<213> ORGANISM: Homo sapiens

<400> SEQUENCE: 16

Met Glu Lys Leu His Gln Cys Tyr Trp Lys Ser Gly Glu Pro Gln Ser
1               5                   10                  15

Asp Asp Ile Glu Ala Ser Arg Met Lys Arg Ala Ala Ala Lys His Leu
            20                  25                  30

Ile Glu Arg Tyr Tyr His Gln Leu Thr Glu Gly Cys Gly Asn Glu Ala
        35                  40                  45

Cys Thr Asn Glu Phe Cys Ala Ser Cys
    50                  55

<210> SEQ ID NO 17
<211> LENGTH: 54
<212> TYPE: PRT
<213> ORGANISM: Homo sapiens

<400> SEQUENCE: 17

Met Ala Thr Ala Cys Lys Arg Ser Gly Glu Pro Gln Ser Asp Asp Ile
1               5                   10                  15

Glu Ala Ser Arg Met Lys Arg Ala Ala Ala Lys His Leu Ile Glu Arg
            20                  25                  30

Tyr Tyr His Gln Leu Thr Glu Gly Cys Gly Asn Glu Ala Cys Thr Asn
        35                  40                  45

Glu Phe Cys Ala Ser Cys
    50

<210> SEQ ID NO 18
<211> LENGTH: 55
<212> TYPE: PRT
<213> ORGANISM: Mus musculus

<400> SEQUENCE: 18

Met Ala Thr Ala Cys Lys Arg Ser Pro Gly Glu Ser Gln Ser Glu Asp
1               5                   10                  15

```
Ile Glu Ala Ser Arg Met Lys Arg Ala Ala Ala Lys His Leu Ile Glu
            20                  25                  30

Arg Tyr Tyr His Gln Leu Thr Glu Gly Cys Gly Asn Glu Ala Cys Thr
        35                  40                  45

Asn Glu Phe Cys Ala Ser Cys
    50                  55

<210> SEQ ID NO 19
<211> LENGTH: 34
<212> TYPE: PRT
<213> ORGANISM: Mus musculus

<400> SEQUENCE: 19

Met Lys Arg Ala Ala Ala Lys His Leu Ile Glu Arg Tyr Tyr His Gln
1               5                   10                  15

Leu Thr Glu Gly Cys Gly Asn Glu Ala Cys Thr Asn Glu Phe Cys Ala
            20                  25                  30

Ser Cys

<210> SEQ ID NO 20
<211> LENGTH: 82
<212> TYPE: DNA
<213> ORGANISM: Artificial
<220> FEATURE:
<223> OTHER INFORMATION: codon-optimized hUBE3A

<400> SEQUENCE: 20
gaattccgga ttttttatgg ccacagcttg taaaagatca ggagaacctc agtctgacga      60
cattgaagct agcaggatga ag                                              82

<210> SEQ ID NO 21
<211> LENGTH: 872
<212> TYPE: PRT
<213> ORGANISM: Artificial
<220> FEATURE:
<223> OTHER INFORMATION: codon-optimized hUBE3A

<400> SEQUENCE: 21

Met Ala Thr Ala Cys Lys Arg Ser Gly Glu Pro Gln Ser Asp Asp Ile
1               5                   10                  15

Glu Ala Ser Arg Met Lys Arg Ala Ala Ala Lys His Leu Ile Glu Arg
            20                  25                  30

Tyr Tyr His Gln Leu Thr Glu Gly Cys Gly Asn Glu Ala Cys Thr Asn
        35                  40                  45

Glu Phe Cys Ala Ser Cys Pro Thr Phe Leu Arg Met Asp Asn Asn Ala
    50                  55                  60

Ala Ala Ile Lys Ala Leu Glu Leu Tyr Lys Ile Asn Ala Lys Leu Cys
65                  70                  75                  80

Asp Pro His Pro Ser Lys Lys Gly Ala Ser Ser Ala Tyr Leu Glu Asn
                85                  90                  95

Ser Lys Gly Ala Pro Asn Asn Ser Cys Ser Glu Ile Lys Met Asn Lys
            100                 105                 110

Lys Gly Ala Arg Ile Asp Phe Lys Asp Val Thr Tyr Leu Thr Glu Glu
        115                 120                 125

Lys Val Tyr Glu Ile Leu Glu Leu Cys Arg Glu Arg Glu Asp Tyr Ser
    130                 135                 140

Pro Leu Ile Arg Val Ile Gly Arg Val Phe Ser Ser Ala Glu Ala Leu
145                 150                 155                 160
```

```
Val Gln Ser Phe Arg Lys Val Lys Gln His Thr Lys Glu Glu Leu Lys
                165                 170                 175

Ser Leu Gln Ala Lys Asp Glu Asp Lys Asp Glu Asp Glu Lys Glu Lys
            180                 185                 190

Ala Ala Cys Ser Ala Ala Met Glu Glu Asp Ser Glu Ala Ser Ser
        195                 200                 205

Ser Arg Ile Gly Asp Ser Ser Gln Gly Asp Asn Asn Leu Gln Lys Leu
            210                 215                 220

Gly Pro Asp Asp Val Ser Val Asp Ile Asp Ala Ile Arg Arg Val Tyr
225                 230                 235                 240

Thr Arg Leu Leu Ser Asn Glu Lys Ile Glu Thr Ala Phe Leu Asn Ala
                245                 250                 255

Leu Val Tyr Leu Ser Pro Asn Val Glu Cys Asp Leu Thr Tyr His Asn
                260                 265                 270

Val Tyr Ser Arg Asp Pro Asn Tyr Leu Asn Leu Phe Ile Ile Val Met
            275                 280                 285

Glu Asn Arg Asn Leu His Ser Pro Glu Tyr Leu Glu Met Ala Leu Pro
            290                 295                 300

Leu Phe Cys Lys Ala Met Ser Lys Leu Pro Leu Ala Ala Gln Gly Lys
305                 310                 315                 320

Leu Ile Arg Leu Trp Ser Lys Tyr Asn Ala Asp Gln Ile Arg Arg Met
                325                 330                 335

Met Glu Thr Phe Gln Gln Leu Ile Thr Tyr Lys Val Ile Ser Asn Glu
            340                 345                 350

Phe Asn Ser Arg Asn Leu Val Asn Asp Asp Ala Ile Val Ala Ala
            355                 360                 365

Ser Lys Cys Leu Lys Met Val Tyr Tyr Ala Asn Val Val Gly Gly Glu
370                 375                 380

Val Asp Thr Asn His Asn Glu Glu Asp Asp Glu Glu Pro Ile Pro Glu
385                 390                 395                 400

Ser Ser Glu Leu Thr Leu Gln Glu Leu Leu Gly Glu Glu Arg Arg Asn
                405                 410                 415

Lys Lys Gly Pro Arg Val Asp Pro Leu Glu Thr Glu Leu Gly Val Lys
            420                 425                 430

Thr Leu Asp Cys Arg Lys Pro Leu Ile Pro Phe Glu Glu Phe Ile Asn
            435                 440                 445

Glu Pro Leu Asn Glu Val Leu Glu Met Asp Lys Asp Tyr Thr Phe Phe
            450                 455                 460

Lys Val Glu Thr Glu Asn Lys Phe Ser Phe Met Thr Cys Pro Phe Ile
465                 470                 475                 480

Leu Asn Ala Val Thr Lys Asn Leu Gly Leu Tyr Tyr Asp Asn Arg Ile
                485                 490                 495

Arg Met Tyr Ser Glu Arg Arg Ile Thr Val Leu Tyr Ser Leu Val Gln
            500                 505                 510

Gly Gln Gln Leu Asn Pro Tyr Leu Arg Leu Lys Val Arg Arg Asp His
            515                 520                 525

Ile Ile Asp Asp Ala Leu Val Arg Leu Glu Met Ile Ala Met Glu Asn
            530                 535                 540

Pro Ala Asp Leu Lys Lys Gln Leu Tyr Val Glu Phe Glu Gly Glu Gln
545                 550                 555                 560

Gly Val Asp Glu Gly Gly Val Ser Lys Glu Phe Phe Gln Leu Val Val
                565                 570                 575
```

-continued

```
Glu Glu Ile Phe Asn Pro Asp Ile Gly Met Phe Thr Tyr Asp Glu Ser
                580             585                 590
Thr Lys Leu Phe Trp Phe Asn Pro Ser Ser Phe Glu Thr Glu Gly Gln
            595                 600             605
Phe Thr Leu Ile Gly Ile Val Leu Gly Leu Ala Ile Tyr Asn Asn Cys
        610             615             620
Ile Leu Asp Val His Phe Pro Met Val Val Tyr Arg Lys Leu Met Gly
625             630             635             640
Lys Lys Gly Thr Phe Arg Asp Leu Gly Asp Ser His Pro Val Leu Tyr
            645                 650             655
Gln Ser Leu Lys Asp Leu Leu Glu Tyr Glu Gly Asn Val Glu Asp Asp
            660             665             670
Met Met Ile Thr Phe Gln Ile Ser Gln Thr Asp Leu Phe Gly Asn Pro
            675             680             685
Met Met Tyr Asp Leu Lys Glu Asn Gly Asp Lys Ile Pro Ile Thr Asn
        690             695             700
Glu Asn Arg Lys Glu Phe Val Asn Leu Tyr Ser Asp Tyr Ile Leu Asn
705             710             715             720
Lys Ser Val Glu Lys Gln Phe Lys Ala Phe Arg Arg Gly Phe His Met
            725             730             735
Val Thr Asn Glu Ser Pro Leu Lys Tyr Leu Phe Arg Pro Glu Glu Ile
            740             745             750
Glu Leu Leu Ile Cys Gly Ser Arg Asn Leu Asp Phe Gln Ala Leu Glu
        755             760             765
Glu Thr Thr Glu Tyr Asp Gly Gly Tyr Thr Arg Asp Ser Val Leu Ile
        770             775             780
Arg Glu Phe Trp Glu Ile Val His Ser Phe Thr Asp Glu Gln Lys Arg
785             790             795             800
Leu Phe Leu Gln Phe Thr Thr Gly Thr Asp Arg Ala Pro Val Gly Gly
            805             810             815
Leu Gly Lys Leu Lys Met Ile Ile Ala Lys Asn Gly Pro Asp Thr Glu
            820             825             830
Arg Leu Pro Thr Ser His Thr Cys Phe Asn Val Leu Leu Leu Pro Glu
        835             840             845
Tyr Ser Ser Lys Glu Lys Leu Lys Glu Arg Leu Leu Lys Ala Ile Thr
850             855             860
Tyr Ala Lys Gly Phe Gly Met Leu
865             870
```

<210> SEQ ID NO 22
<211> LENGTH: 13
<212> TYPE: DNA
<213> ORGANISM: Artificial
<220> FEATURE:
<223> OTHER INFORMATION: Kozak sequence

<400> SEQUENCE: 22 tttttttatgg cca                                                  13

<210> SEQ ID NO 23
<211> LENGTH: 12
<212> TYPE: DNA
<213> ORGANISM: Artificial
<220> FEATURE:
<223> OTHER INFORMATION: Kozak consensus sequence

<400> SEQUENCE: 23

```
                                                                    agcaggatga ag                                                       12

<210> SEQ ID NO 24
<211> LENGTH: 10
<212> TYPE: RNA
<213> ORGANISM: Artificial
<220> FEATURE:
<223> OTHER INFORMATION: Kozak sequence

<400> SEQUENCE: 24 gccrccaugg                                                                                                                              10

<210> SEQ ID NO 25
<211> LENGTH: 10
<212> TYPE: DNA
<213> ORGANISM: Artificial
<220> FEATURE:
<223> OTHER INFORMATION: Kozak sequence

<400> SEQUENCE: 25
agcaggatga                                                                                                                              10

<210> SEQ ID NO 26
<211> LENGTH: 2454
<212> TYPE: DNA
<213> ORGANISM: Artificial
<220> FEATURE:
<223> OTHER INFORMATION: human UBE3A isoform 3 and isoform 1

<400> SEQUENCE: 26
caccgaatgg ccacagcttg taaaagatca ggagaacctc agtctgacga cattgaagct            60
agccgaatga agcgagcagc tgcaaagcat ctaatagaac gctactacca ccagttaact           120
gagggctgtg aaatgaagc  ctgcacgaat gagttttgtg cttcctgtcc aacttttctt           180
cgtatggata ataatgcagc agctattaaa gccctcgagc tttataagat taatgcaaaa           240
ctctgtgatc ctcatccctc caagaaagga gcaagctcag cttaccttga gaactcgaaa           300
ggtgccccca caactcctg  ctctgagata aaaatgaaca agaaaggcgc tagaattgat           360
tttaaagatg tgacttactt aacagaagag aaggtatatg aaattcttga attatgtaga           420
gaaagagagg attattcccc tttaatccgt gttattggaa gagttttttc tagtgctgag           480
gcattggtac agagcttccg gaaagttaaa caacacacca aggaagaact gaaatctctt           540
caagcaaaag atgaagacaa agatgaagat gaaaaggaaa agctgcatg  ttctgctgct           600 gctatggaag aagactcaga agcatcttcc tcaaggatag gtgatagctc acagggagac           660
aacaatttgc aaaaattagg ccctgatgat gtgtctgtgg atattgatgc cattagaagg           720
gtctacacca gattgctctc taatgaaaaa attgaaactg cctttctcaa tgcacttgta           780
tatttgtcac ctaacgtgga atgtgacttg acgtatcaca atgtatactc tcgagatcct           840
aattatctga atttgttcat tatcgtaatg gagaataaga atctccacag tcctgaatat           900
ctggaaatgg ctttgccatt attttgcaaa gcgatgagca agctaccct  tgcagcccaa           960 ggaaaactga tcagactgtg gtctaaatac aatgcagacc agattcggag aatgatggag          1020
acatttcagc aacttattac ttataaagtc ataagcaatg aatttaacag tcgaaatcta          1080
gtgaatgatg atgatgccat tgttgctgct tcgaagtgct gaaaatggt  ttactatgca          1140 aatgtagtgg gagggaagt  ggacacaaat cacaatgaag aagatgatga agagcccatc          1200
cctgagtcca gcgagctgac acttcaggaa cttttgggag aagaagaag  aaacaagaaa          1260 ggtcctcgag tggaccccct ggaaactgaa cttggtgtta aaccctgga  ttgtcgaaaa          1320
```

-continued

```
ccacttatcc cttttgaaga gtttattaat gaaccactga atgaggttct agaaatggat    1380
aaagattata cttttttcaa agtagaaaca gagaacaaat tctcttttat gacatgtccc    1440
tttatattga atgctgtcac aaagaatttg ggattatatt atgacaatag aattcgcatg    1500
tacagtgaac gaagaatcac tgttctctac agcttagttc aaggacagca gttgaatcca    1560
tatttgagac tcaaagttag acgtgaccat atcatagatg atgcacttgt ccggctagag    1620
atgatcgcta tggaaaatcc tgcagacttg aagaagcagt tgtatgtgga atttgaagga    1680
gaacaaggag ttgatgaggg aggtgtttcc aaagaatttt ttcagctggt tgtggaggaa    1740
atcttcaatc cagatattgg tatgttcaca tacgatgaat ctacaaaatt gttttggttt    1800
aatccatctt cttttgaaac tgagggtcag tttactctga ttggcatagt actgggtctg    1860
gctatttaca ataactgtat actggatgta cattttccca tggttgtcta caggaagcta    1920
atggggaaaa aaggaacttt tcgtgacttg ggagactctc acccagttct atatcagagt    1980
ttaaaagatt tattggagta tgaagggaat gtggaagatg acatgatgat cactttccag    2040
atatcacaga cagatctttt tggtaaccca atgatgtatg atctaaagga aaatggtgat    2100
aaaattccaa ttacaaatga aaacaggaag gaatttgtca atctttattc tgactacatt    2160
ctcaataaat cagtagaaaa acagttcaag gcttttcgga gaggttttca tatggtgacc    2220
aatgaatctc ccttaaagta cttattcaga ccagaagaaa ttgaattgct tatatgtgga    2280
agccggaatc tagatttcca agcactagaa gaaactacag aatatgacgg tggctatacc    2340
agggactctg ttctgattag ggagttctgg gaaatcgttc attcatttac agatgaacag    2400
aaaagactct tcttgcagtt tacaacgggc acagacagag cacctgtggg agga          2454
```

<210> SEQ ID NO 27
<211> LENGTH: 2454
<212> TYPE: DNA
<213> ORGANISM: Artificial
<220> FEATURE:
<223> OTHER INFORMATION: human UBE3A isoform 3 and isoform 1

<400> SEQUENCE: 27

```
tttttatgg ccacagcttg taaaagatca ggagaacctc agtctgacga cattgaagct      60
agcaggatga agcgagcagc tgcaaagcat ctaatagaac gctactacca ccagttaact     120
gagggctgtg aaatgaagc ctgcacgaat gagttttgtg cttcctgtcc aactttttctt     180 cgtatggata taatgcagc agctattaaa gccctcgagc tttataagat taatgcaaaa     240
ctctgtgatc ctcatccctc caagaaagga gcaagctcag cttaccttga aactcgaaa     300 ggtgccccca caactcctg ctctgagata aaatgaaca agaaaggcgc tagaattgat     360
tttaaagatg tgacttactt aacagaagag aaggtatatg aaattcttga attatgtaga     420
gaaagagagg attattcccc tttaatccgt gttattggaa gagttttttc tagtgctgag     480
gcattggtac agagcttccg gaaagttaaa caacacacca aggaagaact gaaatctctt     540
caagcaaaag atgaagacaa agatgaagat gaaaaggaaa agctgcatg ttctgctgct     600 gctatggaag aagactcaga agcatcttcc tcaaggatag gtgatagctc acagggagac     660
aacaatttgc aaaaattagg ccctgatgat gtgtctgtgg atattgatgc cattagaagg     720
gtctacacca gattgctctc taatgaaaaa attgaaactg cctttctcaa tgcacttgta     780
tatttgtcac ctaacgtgga atgtgacttg acgtatcaca atgtatactc tcgagatcct     840
aattatctga atttgttcat tatcgtaatg gagaatagaa atctccacag tcctgaatat     900
```

```
ctggaaatgg cttttgccatt attttgcaaa gcgatgagca agctacccct tgcagcccaa      960
ggaaaactga tcagactgtg gtctaaatac aatgcagacc agattcggag aatgatggag     1020
acatttcagc aacttattac ttataaagtc ataagcaatg aatttaacag tcgaaatcta     1080
gtgaatgatg atgatgccat tgttgctgct tcgaagtgct tgaaaatggt ttactatgca     1140
aatgtagtgg gaggggaagt ggacacaaat cacaatgaag aagatgatga agagcccatc     1200
cctgagtcca gcgagctgac acttcaggaa cttttgggag aagaaagaag aaacaagaaa     1260
ggtcctcgag tggacccct ggaaactgaa cttggtgtta aaaccctgga ttgtcgaaaa     1320
ccacttatcc cttttgaaga gtttattaat gaaccactga atgaggttct agaaatggat     1380
aaagattata ctttttcaa agtagaaaca gagaacaaat tctcttttat gacatgtccc     1440
tttatattga atgctgtcac aaagaatttg ggattatatt atgacaatag aattcgcatg     1500
tacagtgaac gaagaatcac tgttctctac agcttagttc aaggacagca gttgaatcca     1560
tatttgagac tcaaagttag acgtgaccat atcatagatg atgcacttgt ccggctagag     1620
atgatcgcta tggaaaatcc tgcagacttg aagaagcagt tgtatgtgga atttgaagga     1680
gaacaaggag ttgatgaggg aggtgtttcc aaagaatttt ttcagctggt tgtggaggaa     1740
atcttcaatc cagatattgg tatgttcaca tacgatgaat ctacaaaatt gttttggttt     1800
aatccatctt cttttgaaac tgagggtcag tttactctga ttggcatagt actgggtctg     1860
gctatttaca ataactgtat actggatgta catttttccca tggttgtcta caggaagcta     1920
atggggaaaa aaggaacttt tcgtgacttg ggagactctc acccagttct atatcagagt     1980
ttaaaagatt tattggagta tgaagggaat gtggaagatg acatgatgat cactttccag     2040
atatcacaga cagatcttt tggtaaccca atgatgtatg atctaaagga aaatggtgat     2100
aaaattccaa ttacaaatga aaacaggaag gaatttgtca atctttattc tgactacatt     2160
ctcaataaat cagtagaaaa acagttcaag gcttttcgga gaggttttca tatggtgacc     2220
aatgaatctc ccttaaagta cttattcaga ccagaagaaa ttgaattgct tatatgtgga     2280
agccggaatc tagatttcca agcactagaa gaaactacag aatatgacgg tggctatacc     2340
agggactctg ttctgattag ggagttctgg gaaatcgttc attcatttac agatgaacag     2400
aaaagactct tcttgcagtt tacaacgggc acagacagag cacctgtggg agga          2454
```

UBE3A GENES AND EXPRESSION CASSETTES AND THEIR USE

STATEMENT OF PRIORITY

This patent application is a 35 U.S.C. § 371 national phase application of PCT Application PCT/US2020/034171 filed May 22, 2020, which claims the benefit, under 35 U.S.C. § 119(e), of U.S. Provisional Application No. 62/851,411, filed on May 22, 2019, the entire contents of each of which are incorporated by reference herein

STATEMENT REGARDING ELECTRONIC FILING OF A SEQUENCE LISTING

A Sequence Listing in ASCII text format, submitted under 37 C.F.R. § 1.821, entitled 5470-867_ST25.txt, 49,301 bytes in size, generated on Nov. 13, 2021 and filed via EFS-Web, is provided in lieu of a paper copy. This Sequence Listing is hereby incorporated herein by reference into the specification for its disclosures.

FIELD OF THE INVENTION

This invention relates to polynucleotides comprising UBE3A open reading frame (ORF) sequences, vectors comprising the same, and methods of using the same for delivery of the ORF to a cell or a subject and to treat disorders associated with aberrant expression of a UBE3A gene or aberrant activity of a UBE3A gene product in the subject, such as Angelman Syndrome.

BACKGROUND OF THE INVENTION

Angelman Syndrome (AS) is a neurodevelopmental disorder affecting approximately 1:15,000 individuals. Individuals with AS have seizures, movement disorders, intellectual disability, and lack speech throughout life. Individuals usually present with ataxia during the first year of life. Loss of a functional UBE3A gene in neurons causes AS.

UBE3A is located on chromosome 15, and is the only gene within the 15q11-q13 region that exhibits biased expression from the maternal allele. The paternal allele is silenced in neurons due to paternal imprinting. Accordingly, both deletions of maternal 15q11-13 and loss-of-function mutations of maternal UBE3A cause AS (see FIG. 1). Point mutations that impair the E3 ubiquitin ligase function of UBE3A protein (also known as E6AP ubiquitin-protein ligase (E6AP)) are sufficient to produce the full spectrum of AS phenotypes, highlighting the importance of UBE3A to the pathogenesis of AS. The consensus is that neuronal loss of UBE3A precipitates AS. Glia are less likely to play a role, as unlike neurons, they express UBE3A biallelically and at very low levels.

There are currently no specific treatments available for AS. Individuals affected by AS are managed by supportive symptomatic care.

SUMMARY OF THE INVENTION

The present invention is based, in part, on the development of optimized UBE3A genes, expression cassettes, and vectors capable of providing therapeutic levels of UBE3A expression for treating disorders associated with UBE3A misexpression such as Angelman Syndrome. Aspects of the present invention overcome shortcomings in the art by providing codon-optimized UBE3A genes, expression cassettes, and vectors capable of providing therapeutic levels of UBE3A expression for treating disorders associated with UBE3A expression such as AS.

Thus, one aspect of the invention relates to a polynucleotide comprising a human UBE3A open reading frame, wherein the human UBE3A open reading frame encodes human UBE3A short isoform and long isoform.

A further aspect of the invention relates to an expression cassette comprising a polynucleotide comprising a human UBE3A open reading frame and vectors, transformed cells, and transgenic animals comprising the polynucleotide of the invention.

Another aspect of the invention relates to a pharmaceutical formulation comprising the polynucleotide, expression cassette, vector, and/or transformed cell of the invention in a pharmaceutically acceptable carrier.

An additional aspect of the invention relates to a method of expressing a UBE3A open reading frame in a cell, comprising contacting the cell with the polynucleotide, expression cassette, and/or vector of the invention, thereby expressing the UBE3A open reading frame in the cell.

A further aspect of the invention relates to a method of expressing a UBE3A open reading frame in a subject, comprising delivering to the subject the polynucleotide, expression cassette, vector, and/or transformed cell of the invention, thereby expressing the UBE3A open reading frame in the subject.

An additional aspect of the invention relates to a method of treating a disorder associated with aberrant expression of a UBE3A gene or aberrant activity of a UBE3A gene product in a subject in need thereof, comprising administering to the subject a therapeutically effective amount of the polynucleotide, expression cassette, vector, and/or transformed cell of the invention, such that the UBE3A open reading frame is expressed in the subject.

A further aspect of the invention relates to a method of treating Angelman Syndrome (AS) in a subject in need thereof, comprising administering to the subject a therapeutically effective amount of the polynucleotide, expression cassette, vector, and/or transformed cell of the invention, such that the UBE3A open reading frame is expressed in the subject.

Another aspect of the invention relates to a polynucleotide, expression cassette, vector, and/or transformed cell of the invention for use in a method of treating a disorder associated with aberrant expression of a UBE3A gene or aberrant activity of a UBE3A gene product in a subject in need thereof.

These and other aspects of the invention are set forth in more detail in the description of the invention below.

BRIEF DESCRIPTION OF THE DRAWINGS

FIG. 1 shows a diagram of neuronal regulation of UBE3A, wherein neurons have paternal silencing of UBE3A.

FIGS. 2A-2B show the experimental design for flurothyl kindling and rechallenge (FIG. 2A) and generalized seizure thresholds (GST, FIG. 2B) for wildtype mice (WT), mice lacking long UBE3A (1502-KO), and mice lacking short UBE3A (1503-KO).

FIG. 3A shows the N-terminal amino acid sequences of WT human and mouse UBE3A isoforms (SEQ ID NOS:15-19). Mouse isoform 1 (not shown) is truncated and does not express a stable protein.

FIG. 3B shows the 5' DNA sequence of the codon-optimized hUBE3A1>>3 open reading frame (SEQ ID NO:20) (top), in register with corresponding amino acid residues of resultant hUBE3A protein (SEQ ID NO:21) (bottom). Both long and short hUBE3A are encoded in the same reading frame. Kozak sequences of different strengths were engineered to bias translation initiation from the second start codon (CAGG<u>ATG</u>A) beginning the short isoform of hUBE3A.

FIG. 7A shows lateral to medial series of UBE3A-stained sagittal sections harvested from mice at varying postnatal ages (P10, P15, P25), following ICV injection of AS gene therapy virus (PHP.B/hUBE3A) at P1. FIG. 7B shows the efficiency of hUBE3A gene transfer within hippocampal area CA3 in high-magnification confocal micrographs. Arrows indicate rare neurons (NeuN+) not re-expressing UBE3A. UBE3A protein shows pronounced nuclear localization, consistent with dominant expression of the short hUBE3A isoform.

FIG. 13 shows WT (native) coding sequences for UBE3A ORF that encodes both human UBE3A Isoform 3 and Isoform 1, with WT Kozak sequences (SEQ ID NO: 26). The Kozak sequences regulating the respective expressed isoforms are shown in bold, the translation start sites are underlined.

FIG. 14 shows WT (native) coding sequences for UBE3A ORF that encodes both human UBE3A Isoform 3 and Isoform 1, with modified Kozak sequences (SEQ ID NO: 27). The Kozak sequences regulating the respective expressed isoforms are shown in bold, the translation start sites are underlined.

DETAILED DESCRIPTION OF THE INVENTION

Figure 3C:
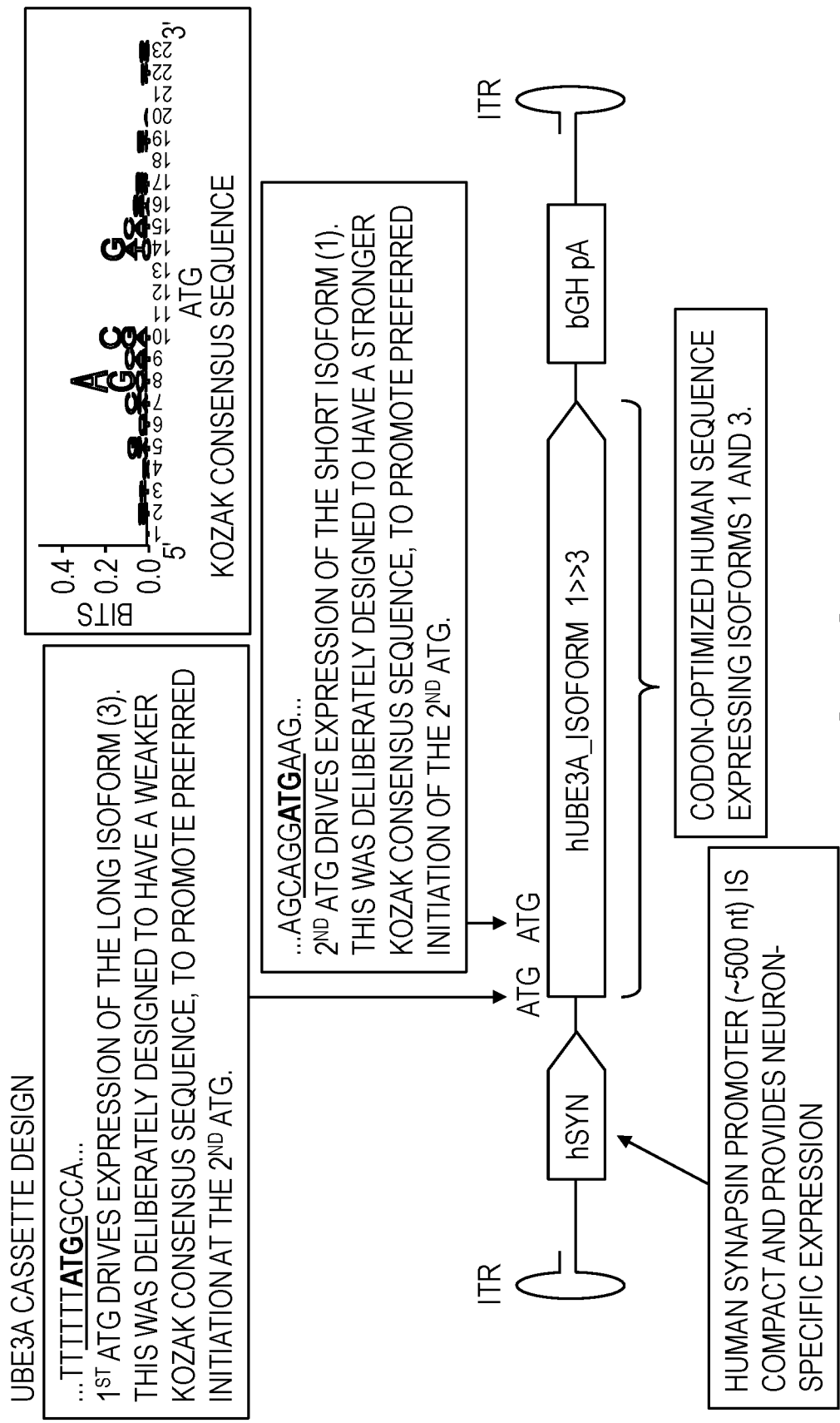
FIG. 3C shows a schematic depicting the full AS gene therapy construct for expressing both long (isoform 3) and short (isoform 1) isoforms of hUBE3A (SEQ ID NOS:22-24).

The present invention is explained in greater detail below. This description is not intended to be a detailed catalog of all the different ways in which the invention may be implemented, or all the features that may be added to the instant invention. For example, features illustrated with respect to one embodiment may be incorporated into other embodiments, and features illustrated with respect to a particular embodiment may be deleted from that embodiment. In addition, numerous variations and additions to the various embodiments suggested herein will be apparent to those skilled in the art in light of the instant disclosure which do not depart from the instant invention. Hence, the following specification is intended to illustrate some particular embodiments of the invention, and not to exhaustively specify all permutations, combinations and variations thereof.

Unless the context indicates otherwise, it is specifically intended that the various features of the invention described herein can be used in any combination. Moreover, the present invention also contemplates that in some embodiments of the invention, any feature or combination of features set forth herein can be excluded or omitted. To illustrate, if the specification states that a complex comprises components A, B and C, it is specifically intended that any of A, B or C, or a combination thereof, can be omitted and disclaimed singularly or in any combination.

Unless otherwise defined, all technical and scientific terms used herein have the same meaning as commonly understood by one of ordinary skill in the art to which this invention belongs. The terminology used in the description of the invention herein is for the purpose of describing particular embodiments only and is not intended to be limiting of the invention.

Nucleotide sequences are presented herein by single strand only, in the 5' to 3' direction, from left to right, unless specifically indicated otherwise. Nucleotides and amino acids are represented herein in the manner recommended by the IUPAC-IUB Biochemical Nomenclature Commission, or (for amino acids) by either the one-letter code, or the three letter code, both in accordance with 37 C.F.R. § 1.822 and established usage.

Except as otherwise indicated, standard methods known to those skilled in the art may be used for production of recombinant and synthetic polypeptides, antibodies or antigen-binding fragments thereof, manipulation of nucleic acid sequences, production of transformed cells, the construction of rAAV constructs, modified capsid proteins, packaging vectors expressing the AAV rep and/or cap sequences, and transiently and stably transfected packaging cells. Such techniques are known to those skilled in the art. See, e.g., SAMBROOK et al., MOLECULAR CLONING: A LABORATORY MANUAL 2nd Ed. (Cold Spring Harbor, N.Y., 1989); F. M. AUSUBEL et al. CURRENT PROTOCOLS IN MOLECULAR BIOLOGY (Green Publishing Associates, Inc. and John Wiley & Sons, Inc., New York).

All publications, patent applications, patents, nucleotide sequences, amino acid sequences and other references mentioned herein are incorporated by reference in their entirety.

Definitions

As used in the description of the invention and the appended claims, the singular forms "a," "an" and "the" are intended to include the plural forms as well, unless the context clearly indicates otherwise.

As used herein, "and/or" refers to and encompasses any and all possible combinations of one or more of the associated listed items, as well as the lack of combinations when interpreted in the alternative ("or").

Moreover, the present invention also contemplates that in some embodiments of the invention, any feature or combination of features set forth herein can be excluded or omitted.

Furthermore, the term "about," as used herein when referring to a measurable value such as an amount of a compound or agent of this invention, dose, time, temperature, and the like, is meant to encompass variations of ±10%, ±5%, ±1%, ±0.5%, or even ±0.1% of the specified amount.

As used herein, the transitional phrase "consisting essentially of" is to be interpreted as encompassing the recited materials or steps and those that do not materially affect the basic and novel characteristic(s) of the claimed invention. Thus, the term "consisting essentially of" as used herein should not be interpreted as equivalent to "comprising."

The term "consists essentially of" (and grammatical variants), as applied to a polynucleotide or polypeptide sequence of this invention, means a polynucleotide or polypeptide that consists of both the recited sequence (e.g., SEQ ID NO) and a total of ten or less (e.g., 1, 2, 3, 4, 5, 6, 7, 8, 9, or 10) additional nucleotides or amino acids on the 5' and/or 3' or N-terminal and/or C-terminal ends of the recited sequence or between the two ends (e.g., between domains) such that the function of the polynucleotide or polypeptide is not materially altered. The total of ten or less additional nucleotides or amino acids includes the total number of additional nucleotides or amino acids added together. The term "materially altered," as applied to polynucleotides of the invention, refers to an increase or decrease in ability to express the encoded polypeptide of at least about 50% or more as compared to the expression level of a polynucleotide consisting of the recited sequence. The term "materially altered," as applied to polypeptides of the invention, refers to an increase or decrease in biological activity of at least about 50% or more as compared to the activity of a polypeptide consisting of the recited sequence.

The term "parvovirus" as used herein encompasses the family Parvoviridae, including autonomously-replicating parvoviruses and dependoviruses. The autonomous parvoviruses include members of the genera Parvovirus, Erythrovirus, Densovirus, Iteravirus, and Contravirus. Exemplary autonomous parvoviruses include, but are not limited to, minute virus of mouse, bovine parvovirus, canine parvovirus, chicken parvovirus, feline panleukopenia virus, feline parvovirus, goose parvovirus, H1 parvovirus, muscovy duck parvovirus, snake parvovirus, and B19 virus. Other autonomous parvoviruses are known to those skilled in the art. See, e.g., FIELDS et al., VIROLOGY, volume 2, chapter 69 (4th ed., Lippincott-Raven Publishers).

The genus Dependovirus contains the adeno-associated viruses (AAV), including but not limited to, AAV type 1, AAV type 2, AAV type 3 (including types 3A and 3B), AAV type 4, AAV type 5, AAV type 6, AAV type 7, AAV type 8, AAV type 9, AAV type 10, AAV type 11, AAV type 12, AAV type 13, avian AAV, bovine AAV, canine AAV, goat AAV, snake AAV, equine AAV, and ovine AAV. See, e.g., FIELDS et al., VIROLOGY, volume 2, chapter 69 (4th ed., Lippincott-Raven Publishers); and Table 1.

The term "adeno-associated virus" (AAV) in the context of the present invention includes without limitation AAV type 1, AAV type 2, AAV type 3 (including types 3A and 3B), AAV type 4, AAV type 5, AAV type 6, AAV type 7, AAV type 8, AAV type 9, AAV type 10, AAV type 11, avian AAV, bovine AAV, canine AAV, equine AAV, and ovine AAV and any other AAV now known or later discovered. See, e.g., BERNARD N. FIELDS et al., VIROLOGY, volume 2, chapter 69 (4th ed., Lippincott-Raven Publishers). A number of additional AAV serotypes and clades have been identified (see, e.g., Gao et al., (2004) J. Virol. 78:6381-6388 and Table 1), which are also encompassed by the term "AAV."

The parvovirus particles and genomes of the present invention can be from, but are not limited to, AAV. The genomic sequences of various serotypes of AAV and the autonomous parvoviruses, as well as the sequences of the native ITRs, Rep proteins, and capsid subunits are known in the art. Such sequences may be found in the literature or in public databases such as GenBank. See, e.g., GenBank Accession Numbers NC_002077, NC_001401, NC_001729, NC_001863, NC_001829, NC_001862, NC_000883, NC_001701, NC_001510, NC_006152, NC_006261, AF063497, U89790, AF043303, AF028705, AF028704, J02275, J01901, J02275, X01457, AF288061, AH009962, AY028226, AY028223, AY631966, AX753250, EU285562, NC_001358, NC_001540, AF513851, AF513852 and AY530579; the disclosures of which are incorporated by reference herein for teaching parvovirus and AAV nucleic acid and amino acid sequences. See also, e.g., Bantel-Schaal et al., (1999) J. Virol. 73: 939; Chiorini et al., (1997) J. Virol. 71:6823; Chiorini et al., (1999) J. Virol. 73:1309; Gao et al., (2002) Proc. Nat. Acad. Sci. USA 99:11854; Moris et al., (2004) Virol. 33-:375-383; Mori et al., (2004) Virol. 330: 375; Muramatsu et al., (1996) Virol. 221:208; Ruffing et al., (1994) J. Gen. Virol. 75:3385; Rutledge et al., (1998) J. Virol. 72:309; Schmidt et al., (2008) J. Virol. 82:8911; Shade et al., (1986) J. Virol. 58:921; Srivastava et al., (1983) J. Virol. 45:555; Xiao et al., (1999) J. Virol. 73:3994; international patent publications WO 00/28061, WO 99/61601, WO 98/11244; and U.S. Pat. No. 6,156,303; the disclosures of which are incorporated by reference herein for teaching parvovirus and AAV nucleic acid and amino acid sequences. See also Table 1. An early description of the AAV1, AAV2 and AAV3 ITR sequences is provided by Xiao, X., (1996), "Characterization of Adeno-associated virus (AAV) DNA replication and integration," Ph.D. Dissertation, University of Pittsburgh, Pittsburgh, Pa. (incorporated herein it its entirety).

A "chimeric" AAV nucleic acid capsid coding sequence or AAV capsid protein is one that combines portions of two or more capsid sequences. A "chimeric" AAV virion or particle comprises a chimeric AAV capsid protein.

The term "tropism" as used herein refers to preferential but not necessarily exclusive entry of the vector (e.g., virus vector) into certain cell or tissue type(s) and/or preferential but not necessarily exclusive interaction with the cell surface that facilitates entry into certain cell or tissue types, optionally and preferably followed by expression (e.g., transcription and, optionally, translation) of sequences carried by the vector contents (e.g., viral genome) in the cell, e.g., for a recombinant virus, expression of the heterologous nucleotide sequence(s). Those skilled in the art will appreciate that transcription of a heterologous nucleic acid sequence from the viral genome may not be initiated in the absence of trans-acting factors, e.g., for an inducible promoter or otherwise regulated nucleic acid sequence. In the case of a rAAV genome, gene expression from the viral genome may be from a stably integrated provirus and/or from a non-integrated episome, as well as any other form which the virus nucleic acid may take within the cell.

The term "tropism profile" refers to the pattern of transduction of one or more target cells, tissues and/or organs. Representative examples of chimeric AAV capsids have a tropism profile characterized by efficient transduction of cells of the central nervous system (CNS) with only low transduction of peripheral organs (see e.g. U.S. Pat. No. 9,636,370 McCown et al., and US patent publication 2017/0360960 Gray et al.). Vectors (e.g., virus vectors, e.g., AAV capsids) expressing specific tropism profiles may be referred to as "tropic" for their tropism profile, e.g., neuro-tropic, liver-tropic, etc.

TABLE 1

| AAV Serotypes/Isolates | GenBank Accession Number |
|---|---|
| Clonal Isolates | |
| Avian AAV ATCC VR-865 | AY186198, AY629583, NC_004828 |
| Avian AAV strain DA-1 | NC_006263, AY629583 |
| Bovine AAV | NC_005889, AY388617 |
| AAV4 | NC_001829 |
| AAV5 | AY18065, AF085716 |
| Rh34 | AY243001 |
| Rh33 | AY243002 |
| Rh32 | AY243003 |
| AAV10 | AY631965 |
| AAV11 | AY631966 |
| AAV12 | DQ813647 |
| AAV13 | EU285562 |
| Clade A | |
| AAV1 | NC_002077, AF063497 |
| AAV6 | NC_001862 |
| Hu.48 | AY530611 |
| Hu 43 | AY530606 |
| Hu 44 | AY530607 |
| Hu 46 | AY530609 |
| Clade B | |
| Hu19 | AY530584 |
| Hu20 | AY530586 |
| Hu23 | AY530589 |
| Hu22 | AY530588 |
| Hu24 | AY530590 |
| Hu21 | AY530587 |
| Hu27 | AY530592 |
| Hu28 | AY530593 |
| Hu29 | AY530594 |
| Hu63 | AY530624 |
| Hu64 | AY530625 |
| Hu13 | AY530578 |
| Hu56 | AY530618 |

TABLE 1-continued

| AAV Serotypes/Isolates | GenBank Accession Number |
|---|---|
| Hu57 | AY530619 |
| Hu49 | AY530612 |
| Hu58 | AY530620 |
| Hu34 | AY530598 |
| Hu35 | AY530599 |
| AAV2 | NC_001401 |
| Hu45 | AY530608 |
| Hu47 | AY530610 |
| Hu51 | AY530613 |
| Hu52 | AY530614 |
| Hu T41 | AY695378 |
| Hu S17 | AY695376 |
| Hu T88 | AY695375 |
| Hu T71 | AY695374 |
| Hu T70 | AY695373 |
| Hu T40 | AY695372 |
| Hu T32 | AY695371 |
| Hu T17 | AY695370 |
| Hu LG15 | AY695377 |
| Clade C | |
| AAV 3 | NC 001729 |
| AAV 3B | NC_001863 |
| Hu9 | AY530629 |
| Hu10 | AY530576 |
| Hu11 | AY530577 |
| Hu53 | AY530615 |
| Hu55 | AY530617 |
| Hu54 | AY530616 |
| Hu7 | AY530628 |
| Hu18 | AY530583 |
| Hu15 | AY530580 |
| Hu16 | AY530581 |
| Hu25 | AY530591 |
| Hu60 | AY530622 |
| Ch5 | AY243021 |
| Hu3 | AY530595 |
| Hu1 | AY530575 |
| Hu4 | AY530602 |
| Hu2 | AY530585 |
| Hu61 | AY530623 |
| Clade D | |
| Rh62 | AY530573 |
| Rh48 | AY530561 |
| Rh54 | AY530567 |
| Rh55 | AY530568 |
| Cy2 | AY243020 |
| AAV7 | AF513851 |
| Rh35 | AY243000 |
| Rh37 | AY242998 |
| Rh36 | AY242999 |
| Cy6 | AY243016 |
| Cy4 | AY243018 |
| Cy3 | AY243019 |
| Cy5 | AY243017 |
| Rh13 | AY243013 |
| Clade E | |
| Rh38 | AY530558 |
| Hu66 | AY530626 |
| Hu42 | AY530605 |
| Hu67 | AY530627 |
| Hu40 | AY530603 |
| Hu41 | AY530604 |
| Hu37 | AY530600 |
| Rh40 | AY530559 |
| Rh2 | AY243007 |
| Bb1 | AY243023 |
| Bb2 | AY243022 |
| Rh10 | AY243015 |
| Hu17 | AY530582 |
| Hu6 | AY530621 |
| Rh25 | AY530557 |
| Pi2 | AY530554 |
| Pi1 | AY530553 |
| Pi3 | AY530555 |
| Rh57 | AY530569 |
| Rh50 | AY530563 |
| Rh49 | AY530562 |
| Hu39 | AY530601 |
| Rh58 | AY530570 |
| Rh61 | AY530572 |
| Rh52 | AY530565 |
| Rh53 | AY530566 |
| Rh51 | AY530564 |
| Rh64 | AY530574 |
| Rh43 | AY530560 |
| AAV8 | AF513852 |
| Rh8 | AY242997 |
| Rh1 | AY530556 |
| Clade F | |
| AAV9 (Hu14) | AY530579 |
| Hu31 | AY530596 |
| Hu32 | AY530597 |

The term "disorder associated with aberrant expression of a UBE3A gene" as used herein refers to a disease, disorder, syndrome, or condition that is caused by or a symptom of decreased or altered expression of the UBE3A gene in a subject relative to the expression level in a normal subject or in a population.

The term "disorder associated with aberrant activity of a UBE3A gene product" as used herein refers to a disease, disorder, syndrome, or condition that is caused by or a symptom of decreased or altered activity of the UBE3A gene product in a subject relative to the activity in a normal subject or in a population. In some embodiments, a disorder associated with aberrant activity of a UBE3A gene product may be Angelman Syndrome.

Angelman Syndrome (AS) is a monogenic disorder caused by deletions or mutations in the maternal UBE3A allele. The intact paternal allele is silenced in neurons of healthy and AS patients by the antisense DNA transcript UBE3A-ATS, as diagramed in FIG. 1. There are three human UBE3A protein isoforms (FIG. 3A). The shortest (i.e., human isoform 1) has the unique capacity to localize to the nucleus and is expressed in excess of the two long isoforms—human isoforms 2 and 3—which are distinguished by amino acid extensions that align with the N-terminus of long mouse isoform 2 (Miao et al, J Neuroscience, 2013; 33(1):327-333). Mice deficient for the short isoform (isoform 3 in mice; ISO3-KO) have been shown to broadly phenocopy electrophysiological and behavioral deficits in AS model mice (Avagliano et al., Nat Neurosci, 2019:22 (8):1235-1247). More recently, the inventors demonstrated that ISO3-KO mice, similar to AS mice (Gu et al, J Clin Invest, 2019; 129(1):163-168), exhibit enhanced sensitivity to seizure rechallenge following flurothyl kindling. In contrast, a complementary mouse model harboring a selective deletion of the long UBE3A isoform (isoform 2 in mice; ISO2-KO) has thus far failed to express any AS mouse phenotypes (FIG. 2B; Avagliano et al., Nat Neurosci, 2019: 22(8):1235-1247). Recent clinical data similarly supports the critical importance of short UBE3A, but suggests that long UBE3A also contributes to healthy brain development and function, despite being expressed at lower levels (Sadhwani et al, Am J Med Genet A, 2018; 176(7):1641-1647). While not wishing to be bound to theory, endogenous expression ratios of short and long UBE3A isoforms from an exogenously added expression cassette may be approximated by modulating the relative strength or weakness of the Kozak sequences governing their translation.

As used herein, a Kozak sequence refers to a nucleotide sequence comprising nucleotides upstream of, downstream of, and encompassing a start/initiation codon (i.e., translation start site). The Kozak sequence is recognized by the ribosome as the translational start site. Sequence variations (e.g., by natural and/or human-made modifications) from a known Kozak consensus sequence (e.g., of gccRccAUGG (SEQ ID NO:24)) can alter in strength of initiation (see FIG. 3C Kozak consensus sequence), wherein the underlined nucleotides indicate a start/initiation codon, uppercase letters indicate highly conserved bases, R indicates a conserved purine (most commonly adenine), and lowercase letters indicate common, yet variable, bases. The known consensus Kozak sequence is a consensus representative of the most common nucleotide at each position based on a multitude of human mRNAs; the native/wildtype Kozak sequence(s) of an individual gene and/or open reading frame may vary. As known in the art, a thymidine (T) nucleotide in a DNA sequence corresponds to (e.g., is transcribed as) a uridine (U) nucleotide in a corresponding mRNA (e.g., a DNA ATG start codon corresponds to an mRNA AUG, etc.). Any sequence disclosed herein is considered a disclosure as both a T and a U for DNA and RNA, respectively.

As used herein, "transduction" of a cell by a virus vector (e.g., an AAV vector) means entry of the vector into the cell and transfer of genetic material into the cell by the incorporation of nucleic acid into the virus vector and subsequent transfer into the cell via the virus vector.

Unless indicated otherwise, "efficient transduction" or "efficient tropism," or similar terms, can be determined by reference to a suitable positive or negative control (e.g., at least about 50%, 60%, 70%, 80%, 85%, 90%, 95% or more of the transduction or tropism, respectively, of a positive control or at least about 110%, 120%, 150%, 200%, 300%, 500%, 1000% or more of the transduction or tropism, respectively, of a negative control).

Similarly, it can be determined if a virus "does not efficiently transduce" or "does not have efficient tropism" for a target tissue, or similar terms, by reference to a suitable control. In particular embodiments, the virus vector does not efficiently transduce (i.e., does not have efficient tropism for) tissues outside the CNS, e.g., liver, kidney, gonads and/or germ cells. In particular embodiments, undesirable transduction of tissue(s) (e.g., liver) is 20% or less, 10% or less, 5% or less, 1% or less, 0.1% or less of the level of transduction of the desired target tissue(s) (e.g., CNS cells).

The terms "5' portion" and "3' portion" are relative terms to define a spatial relationship between two or more elements. Thus, for example, a "3' portion" of a polynucleotide indicates a segment of the polynucleotide that is downstream of another segment. The term "3' portion" is not intended to indicate that the segment is necessarily at the 3' end of the polynucleotide, or even that it is necessarily in the 3' half of the polynucleotide, although it may be. Likewise, a "5' portion" of a polynucleotide indicates a segment of the polynucleotide that is upstream of another segment. The term "5' portion" is not intended to indicate that the segment is necessarily at the 5' end of the polynucleotide, or even that it is necessarily in the 5' half of the polynucleotide, although it may be.

As used herein, the term "polypeptide" encompasses both peptides and proteins, unless indicated otherwise.

A "polynucleotide," "nucleic acid," or "nucleotide sequence" may be of RNA, DNA or DNA-RNA hybrid sequences (including both naturally occurring and non-naturally occurring nucleotides), but is preferably either a single or double stranded DNA sequence.

The term "regulatory element" refers to a genetic element which controls some aspect of the expression of nucleic acid sequences. For example, a promoter is a regulatory element which facilitates the initiation of transcription of an operably linked coding region. Other regulatory elements are splicing signals, polyadenylation signals, termination signals, etc. The region in a nucleic acid sequence or polynucleotide in which one or more regulatory elements are found may be referred to as a "regulatory region."

As used herein with respect to nucleic acids, the term "operably linked" refers to a functional linkage between two or more nucleic acids. For example, a promoter sequence may be described as being "operably linked" to a heterologous nucleic acid sequence because the promoter sequence initiates and/or mediates transcription of the heterologous nucleic acid sequence. In some embodiments, the operably linked nucleic acid sequences are contiguous and/or are in the same reading frame.

The term "open reading frame (ORF)," as used herein, refers to the portion of a polynucleotide (e.g., a gene) that encodes a polypeptide, and is inclusive of the initiation start site (i.e., Kozak sequence) that initiates transcription of the polypeptide. The term "coding region" may be used interchangeably with open reading frame.

The term "codon-optimized," as used herein, refers to a gene coding sequence that has been optimized to increase expression by substituting one or more codons normally present in a coding sequence (for example, in a wildtype sequence, including, e.g., a coding sequence for UBE3A) with a codon for the same amino acid. This is referred to as a synonymous codon. In this manner, the protein encoded by the gene is identical, but the underlying nucleobase sequence of the gene or corresponding mRNA is different. In some embodiments, the optimization substitutes one or more rare codons (that is, codons for tRNA that occur relatively infrequently in cells from a particular species) with synonymous codons that occur more frequently to improve the efficiency of translation. For example, in human codon-optimization one or more codons in a coding sequence are replaced by codons that occur more frequently in human cells for the same amino acid. Codon optimization can also increase gene expression through other mechanisms that can improve efficiency of transcription and/or translation. Strategies include, without limitation, increasing total GC content (that is, the percent of guanines and cytosines in the entire coding sequence), decreasing CpG content (that is, the number of CG or GC dinucleotides in the coding sequence), removing cryptic splice donor or acceptor sites, and/or adding or removing ribosomal entry and/or initiation sites, such as Kozak sequences. Desirably, a codon-optimized gene exhibits improved protein expression, for example, the protein encoded thereby is expressed at a detectably greater level in a cell compared with the level of expression of the protein provided by the wildtype gene in an otherwise similar cell. Codon-optimization also provides the ability to distinguish a codon-optimized gene and/or corresponding mRNA from an endogenous gene and/or corresponding mRNA in vitro or in vivo.

The term "sequence identity," as used herein, has the standard meaning in the art. As is known in the art, a number of different programs can be used to identify whether a polynucleotide or polypeptide has sequence identity or similarity to a known sequence. Sequence identity or similarity may be determined using standard techniques known in the art, including, but not limited to, the local sequence identity algorithm of Smith & Waterman, *Adv. Appl. Math.* 2:482 (1981), by the sequence identity alignment algorithm of Needleman & Wunsch, *J. Mol. Biol.* 48:443 (1970), by the search for similarity method of Pearson & Lipman, *Proc. Natl. Acad. Sci. USA* 85:2444 (1988), by computerized implementations of these algorithms (GAP, BESTFIT, FASTA, and TFASTA in the Wisconsin Genetics Software Package, Genetics Computer Group, 575 Science Drive, Madison, Wis.), the Best Fit sequence program described by Devereux et al., *Nucl. Acid Res.* 12:387 (1984), preferably using the default settings, or by inspection.

An example of a useful algorithm is PILEUP. PILEUP creates a multiple sequence alignment from a group of related sequences using progressive, pairwise alignments. It can also plot a tree showing the clustering relationships used to create the alignment. PILEUP uses a simplification of the progressive alignment method of Feng & Doolittle, *J. Mol. Evol.* 35:351 (1987); the method is similar to that described by Higgins & Sharp, *CABIOS* 5:151 (1989).

Another example of a useful algorithm is the BLAST algorithm, described in Altschul et al., *J. Mol. Biol.* 215:403 (1990) and Karlin et al., *Proc. Natl. Acad. Sci. USA* 90:5873 (1993). A particularly useful BLAST program is the WU-BLAST-2 program which was obtained from Altschul et al., *Meth. Enzymol.*, 266:460 (1996); blast.wustl/edu/blast/RE-ADME.html. WU-BLAST-2 uses several search parameters, which are preferably set to the default values. The parameters are dynamic values and are established by the program itself depending upon the composition of the particular sequence and composition of the particular database against which the sequence of interest is being searched; however, the values may be adjusted to increase sensitivity.

An additional useful algorithm is gapped BLAST as reported by Altschul et al., *Nucleic Acids Res.* 25:3389 (1997).

A percentage amino acid sequence identity value is determined by the number of matching identical residues divided by the total number of residues of the "longer" sequence in the aligned region. The "longer" sequence is the one having the most actual residues in the aligned region (gaps introduced by WU-Blast-2 to maximize the alignment score are ignored).

In a similar manner, percent nucleic acid sequence identity is defined as the percentage of nucleotide residues in the candidate sequence that are identical with the nucleotides in the polynucleotide specifically disclosed herein.

The alignment may include the introduction of gaps in the sequences to be aligned. In addition, for sequences which contain either more or fewer nucleotides than the polynucleotides specifically disclosed herein, it is understood that in one embodiment, the percentage of sequence identity will be determined based on the number of identical nucleotides in relation to the total number of nucleotides. Thus, for example, sequence identity of sequences shorter than a sequence specifically disclosed herein, will be determined using the number of nucleotides in the shorter sequence, in one embodiment. In percent identity calculations relative weight is not assigned to various manifestations of sequence variation, such as insertions, deletions, substitutions, etc.

In one embodiment, only identities are scored positively (+1) and all forms of sequence variation including gaps are assigned a value of "0," which obviates the need for a weighted scale or parameters as described below for sequence similarity calculations. Percent sequence identity can be calculated, for example, by dividing the number of matching identical residues by the total number of residues of the "shorter" sequence in the aligned region and multiplying by 100. The "longer" sequence is the one having the most actual residues in the aligned region.

As used herein, an "isolated" nucleic acid or nucleotide sequence (e.g., an "isolated DNA" or an "isolated RNA") means a nucleic acid or nucleotide sequence separated or substantially free from at least some of the other components of the naturally occurring organism or virus, for example, the cell or viral structural components or other polypeptides or nucleic acids commonly found associated with the nucleic acid or nucleotide sequence.

Likewise, an "isolated" polypeptide means a polypeptide that is separated or substantially free from at least some of the other components of the naturally occurring organism or virus, for example, the cell or viral structural components or other polypeptides or nucleic acids commonly found associated with the polypeptide.

As used herein, the term "modified," as applied to a polynucleotide or polypeptide sequence, refers to a sequence that differs from a wildtype sequence due to one or more deletions, additions, substitutions, or any combination thereof.

As used herein, by "isolate" (or grammatical equivalents) a virus vector, it is meant that the virus vector is at least partially separated from at least some of the other components in the starting material.

By the term "treat," "treating," or "treatment of" (or grammatically equivalent terms) is meant to reduce or to at least partially improve or ameliorate the severity of the subject's condition and/or to alleviate, mitigate or decrease in at least one clinical symptom and/or to delay the progression of the condition.

As used herein, the term "prevent," "prevents," or "prevention" (and grammatical equivalents thereof) means to delay or inhibit the onset of a disease. The terms are not meant to require complete abolition of disease, and encompass any type of prophylactic treatment to reduce the incidence of the condition or delays the onset of the condition.

A "therapeutically effective" amount as used herein is an amount that is sufficient to provide some improvement or benefit to the subject. Alternatively stated, a "therapeutically effective" amount is an amount that will provide some alleviation, mitigation, decrease or stabilization in at least one clinical symptom in the subject. Those skilled in the art will appreciate that the therapeutic effects need not be complete or curative, as long as some benefit is provided to the subject.

A "prevention effective" amount as used herein is an amount that is sufficient to prevent and/or delay the onset of a disease, disorder and/or clinical symptoms in a subject and/or to reduce and/or delay the severity of the onset of a disease, disorder and/or clinical symptoms in a subject relative to what would occur in the absence of the methods of the invention. Those skilled in the art will appreciate that the level of prevention need not be complete, as long as some benefit is provided to the subject.

The term "heterologous" as used to describe a nucleic acid sequence or protein means that the nucleic acid or protein was derived from a different organism, or a different species of the same organism, than the host cell or subject in which it is expressed. The term "heterologous" when used with reference to a protein or a nucleic acid in a plasmid, expression cassette, or vector, indicates that the protein or the nucleic acid is present with another sequence or subsequence with which the protein or nucleic acid in question is not found in relationship to in nature. Typically the heterologous nucleic acid is a nucleic acid of interest that comprises an open reading frame that encodes a polypeptide, and/or comprises a nontranslated RNA, each of which may be referred to herein as a "transgene". The nucleic acid of interest may encode a therapeutic polypeptide or therapeutic RNA, or a diagnostic polypeptide or diagnostic RNA. The nucleic acid of interest/heterologous nucleic acid is often in the context of an expression cassette.

As the term is used herein, an "expression cassette" comprises the nucleic acid of interest operably linked/associated with appropriate regulatory element sequences (regulatory elements), for example, transcription/translation control signals, origins of replication, polyadenylation signals, internal ribosome entry sites (IRES), promoters, and/or enhancers, and the like. In some embodiments of the invention, the expression cassette comprises a promoter (e.g., eukaryotic) operably linked to the nucleic acid of interest, and optionally a (eukaryotic) transcription termination sequence. Typically the expression cassette is in the context of a vector (e.g., flanked by vector sequences). When in the context of a viral vector, it is typically flanked by viral packaging signals for viral vectors. For example, for an AAV viral vector, the packaging signals are at least one inverted terminal repeat which is located adjacent the expression cassette, optionally the 5' inverted terminal repeat (ITR) and the 3' ITR flank the expression cassette.

A "vector" refers to a compound used as a vehicle to carry foreign genetic material into another cell, where it can be replicated and/or expressed. A cloning vector containing foreign nucleic acid is termed a recombinant vector. Examples of nucleic acid vectors are plasmids, viral vectors, cosmids, and artificial chromosomes. Recombinant vectors typically contain an origin of replication, a multicloning site, and a selectable marker. The nucleic acid sequence typically consists of an insert (recombinant nucleic acid or transgene) and a larger sequence that serves as the "backbone" of the vector. The purpose of a vector which transfers genetic information to another cell is typically to isolate, multiply, or express the insert in the target cell. Expression vectors (expression constructs) are for the expression of the exogenous gene in the target cell, and generally have a promoter sequence that drives expression of the exogenous gene/ORF. Insertion of a vector into the target cell is referred to transformation or transfection for bacterial and eukaryotic cells, although insertion of a viral vector is often called transduction. The term "vector" may also be used in general to describe items to that serve to carry foreign genetic material into another cell, such as, but not limited to, a transformed cell or a nanoparticle.

As used herein, the term "vector," "virus vector," "delivery vector" (and similar terms) in a specific embodiment generally refers to a virus particle that functions as a nucleic acid delivery vehicle, and which comprises the viral nucleic acid (i.e., the vector genome) packaged within the virion. Virus vectors according to the present invention comprise a chimeric AAV capsid according to the invention and can package an AAV or rAAV genome or any other nucleic acid including viral nucleic acids. Alternatively, in some contexts, the term "vector," "virus vector," "delivery vector" (and similar terms) may be used to refer to the vector genome (e.g., vDNA) in the absence of the virion and/or to a viral capsid that acts as a transporter to deliver molecules tethered to the capsid or packaged within the capsid.

The virus vectors of the invention can further be duplexed parvovirus particles as described in international patent publication WO 01/92551 (the disclosure of which is incorporated herein by reference in its entirety). Thus, in some embodiments, double stranded (duplex) genomes can be packaged.

A "recombinant AAV vector genome" or "rAAV genome" is an AAV genome (i.e., vDNA) that comprises at least one inverted terminal repeat (e.g., one, two or three inverted terminal repeats) and one or more heterologous nucleotide sequences. rAAV vectors generally retain the 145 base terminal repeat(s) (TR(s)) in cis to generate virus; however, modified AAV TRs and non-AAV TRs including partially or completely synthetic sequences can also serve this purpose. All other viral sequences are dispensable and may be supplied in trans (Muzyczka, (1992) *Curr. Topics Microbiol. Immunol.* 158:97). The rAAV vector optionally comprises two TRs (e.g., AAV TRs), which generally will be at the 5' and 3' ends of the heterologous nucleotide sequence(s), but need not be contiguous thereto. The TRs can be the same or different from each other. The vector genome can also contain a single ITR at its 3' or 5' end.

The term "terminal repeat" or "TR" includes any viral terminal repeat or synthetic sequence that forms a hairpin structure and functions as an inverted terminal repeat (ITR) (i.e., mediates the desired functions such as replication, virus packaging, integration and/or provirus rescue, and the like). The TR can be an AAV TR (referred to herein as an AAV ITR) or a non-AAV TR. For example, a non-AAV TR (referred to herein as a non-AAV ITR) sequence such as those of other parvoviruses (e.g., canine parvovirus (CPV), mouse parvovirus (MVM), human parvovirus B-19) or the SV40 hairpin that serves as the origin of SV40 replication can be used as a TR, which can further be modified by truncation, substitution, deletion, insertion and/or addition. Further, the TR (ITR) can be partially or completely synthetic, such as the "double-D sequence" as described in U.S. Pat. No. 5,478,745 to Samulski et al.

Parvovirus genomes have palindromic sequences at both their 5' and 3' ends. The palindromic nature of the sequences leads to the formation of a hairpin structure that is stabilized by the formation of hydrogen bonds between the complementary base pairs. This hairpin structure is believed to adopt a "Y" or a "T" shape. See, e.g., FIELDS et al., VIROLOGY, volume 2, chapters 69 & 70 (4th ed., Lippincott-Raven Publishers).

An "AAV inverted terminal repeat" or "AAV ITR" may be from any AAV serotype or isolate, including but not limited to serotypes 1, 2, 3, 4, 5, 6, 7, 8, 9, 10, 11, 12, 13 or any other AAV now known or later discovered (see, e.g., Table 1). An AAV ITR need not have the native ITR (e.g., a native AAV ITR sequence may be altered by insertion, deletion, truncation and/or missense mutations), as long as the ITR mediates the desired functions, e.g., replication, virus packaging, integration, and/or provirus rescue, and the like.

The terms "rAAV particle" and "rAAV virion" are used interchangeably here. A "rAAV particle" or "rAAV virion" comprises a rAAV vector genome packaged within an AAV capsid.

The virus vectors of the invention can further be "targeted" virus vectors (e.g., having a directed tropism) and/or a "hybrid" parvovirus (i.e., in which the viral ITRs and viral capsid are from different parvoviruses) as described in international patent publication WO 00/28004 and Chao et al., (2000) *Mol. Therapy* 2:619.

Further, the viral capsid or genomic elements can contain other modifications, including insertions, deletions and/or substitutions.

As used herein, the term "amino acid" encompasses any naturally occurring amino acids, modified forms thereof, and synthetic amino acids, including non-naturally occurring amino acids.

Naturally occurring, levorotatory (L-) amino acids are shown in Table 2.

TABLE 2

| Amino Acid Residue | Abbreviation | |
|---|---|---|
| | Three-Letter Code | One-Letter Code |
| Alanine | Ala | A |
| Arginine | Arg | R |
| Asparagine | Asn | N |
| Aspartic acid (Aspartate) | Asp | D |
| Cysteine | Cys | C |
| Glutamine | Gln | Q |
| Glutamic acid (Glutamate) | Glu | E |
| Glycine | Gly | G |
| Histidine | His | H |
| Isoleucine | Ile | I |
| Leucine | Leu | L |
| Lysine | Lys | K |
| Methionine | Met | M |
| Phenylalanine | Phe | F |
| Proline | Pro | P |
| Serine | Ser | S |
| Threonine | Thr | T |
| Tryptophan | Trp | W |
| Tyrosine | Tyr | Y |
| Valine | Val | V |

Alternatively, the amino acid can be a modified amino acid residue (nonlimiting examples are shown in Table 3) or can be an amino acid that is modified by post-translation modification (e.g., acetylation, amidation, formylation, hydroxylation, methylation, phosphorylation or sulfatation).

TABLE 3

| Amino Acid Residue Derivatives | |
|---|---|
| Modified Amino Acid Residue | Abbreviation |
| 2-Aminoadipic acid | Aad |
| 3-Aminoadipic acid | bAad |
| beta-Alanine, beta-Aminoproprionic acid | bAla |
| 2-Aminobutyric acid | Abu |
| 4-Aminobutyric acid, Piperidinic acid | 4Abu |
| 6-Aminocaproic acid | Acp |
| 2-Aminoheptanoic acid | Ahe |
| 2-Aminoisobutyric acid | Aib |
| 3-Aminoisobutyric acid | bAib |
| 2-Aminopimelic acid | Apm |
| t-butylalanine | t-BuA |
| Citrulline | Cit |
| Cyclohexylalanine | Cha |
| 2,4-Diaminobutyric acid | Dbu |
| Desmosine | Des |
| 2,2'-Diaminopimelic acid | Dpm |
| 2,3-Diaminoproprionic acid | Dpr |
| N-Ethylglycine | EtGly |
| N-Ethylasparagine | EtAsn |
| Homoarginine | hArg |
| Homocysteine | hCys |
| Homoserine | hSer |
| Hydroxylysine | Hyl |
| Allo-Hydroxylysine | aHyl |
| 3-Hydroxyproline | 3Hyp |
| 4-Hydroxyproline | 4Hyp |
| Isodesmosine | Ide |
| allo-Isoleucine | ale |
| Methionine sulfoxide | MSO |
| N-Methylglycine, sarcosine | MeGly |
| N-Methylisoleucine | MeIle |

TABLE 3-continued

| Amino Acid Residue Derivatives | |
|---|---|
| Modified Amino Acid Residue | Abbreviation |
| 6-N-Methyllysine | MeLys |
| N-Methylvaline | MeVal |
| 2-Naphthylalanine | 2-Nal |
| Norvaline | Nva |
| Norleucine | Nle |
| Ornithine | Orn |
| 4-Chlorophenylalanine | Phe(4-Cl) |
| 2-Fluorophenylalanine | Phe(2-F) |
| 3-Fluorophenylalanine | Phe(3-F) |
| 4-Fluorophenylalanine | Phe(4-F) |
| Phenylglycine | Phg |
| Beta-2-thienylalanine | Thi |

Further, the non-naturally occurring amino acid can be an "unnatural" amino acid as described by Wang et al., (2006) Annu. Rev. Biophys. Biomol. Struct. 35:225-49. These unnatural amino acids can advantageously be used to chemically link molecules of interest to the AAV capsid protein.

The term "template" or "substrate" is used herein to refer to a polynucleotide sequence that may be replicated to produce the parvovirus viral DNA. For the purpose of vector production, the template will typically be embedded within a larger nucleotide sequence or construct, including but not limited to a plasmid, naked DNA vector, bacterial artificial chromosome (BAC), yeast artificial chromosome (YAC) or a viral vector (e.g., adenovirus, herpesvirus, Epstein-Barr Virus, AAV, baculoviral, retroviral vectors, and the like). Alternatively, the template may be stably incorporated into the chromosome of a packaging cell.

As used herein, parvovirus or AAV "Rep coding sequences" indicate the nucleic acid sequences that encode the parvoviral or AAV non-structural proteins that mediate viral replication and the production of new virus particles. The parvovirus and AAV replication genes and proteins have been described in, e.g., FIELDS et al., VIROLOGY, volume 2, chapters 69 & 70 (4th ed., Lippincott-Raven Publishers).

The "Rep coding sequences" need not encode all of the parvoviral or AAV Rep proteins. For example, with respect to AAV, the Rep coding sequences do not need to encode all four AAV Rep proteins (Rep78, Rep 68, Rep52 and Rep40), in fact, it is believed that AAV5 only expresses the spliced Rep68 and Rep40 proteins. In representative embodiments, the Rep coding sequences encode at least those replication proteins that are necessary for viral genome replication and packaging into new virions. The Rep coding sequences will generally encode at least one large Rep protein (i.e., Rep78/68) and one small Rep protein (i.e., Rep52/40). In particular embodiments, the Rep coding sequences encode the AAV Rep78 protein and the AAV Rep52 and/or Rep40 proteins. In other embodiments, the Rep coding sequences encode the Rep68 and the Rep52 and/or Rep40 proteins. In a still further embodiment, the Rep coding sequences encode the Rep68 and Rep52 proteins, Rep68 and Rep40 proteins, Rep78 and Rep52 proteins, or Rep78 and Rep40 proteins.

As used herein, the term "large Rep protein" refers to Rep68 and/or Rep78. Large Rep proteins of the claimed invention may be either wildtype or synthetic. A wildtype large Rep protein may be from any parvovirus or AAV, including but not limited to serotypes 1, 2, 3a, 3b, 4, 5, 6, 7, 8, 9, 10, 11, or 13, or any other AAV now known or later discovered (see, e.g., Table 1). A synthetic large Rep protein may be altered by insertion, deletion, truncation and/or missense mutations.

Those skilled in the art will further appreciate that it is not necessary that the replication proteins be encoded by the same polynucleotide. For example, for MVM, the NS-1 and NS-2 proteins (which are splice variants) may be expressed independently of one another. Likewise, for AAV, the p19 promoter may be inactivated and the large Rep protein(s) expressed from one polynucleotide and the small Rep protein(s) expressed from a different polynucleotide. Typically, however, it will be more convenient to express the replication proteins from a single construct. In some systems, the viral promoters (e.g., AAV p19 promoter) may not be recognized by the cell, and it is therefore necessary to express the large and small Rep proteins from separate expression cassettes. In other instances, it may be desirable to express the large Rep and small Rep proteins separately, i.e., under the control of separate transcriptional and/or translational control elements. For example, it may be desirable to control expression of the large Rep proteins, so as to decrease the ratio of large to small Rep proteins. In the case of insect cells, it may be advantageous to down-regulate expression of the large Rep proteins (e.g., Rep78/68) to avoid toxicity to the cells (see, e.g., Urabe et al., (2002) *Human Gene Therapy* 13:1935).

As used herein, the parvovirus or AAV "cap coding sequences" encode the structural proteins that form a functional parvovirus or AAV capsid (i.e., can package DNA and infect target cells). Typically, the cap coding sequences will encode all of the parvovirus or AAV capsid subunits, but less than all of the capsid subunits may be encoded as long as a functional capsid is produced. Typically, but not necessarily, the cap coding sequences will be present on a single nucleic acid molecule.

The capsid structure of autonomous parvoviruses and AAV are described in more detail in BERNARD N. FIELDS et al., VIROLOGY, volume 2, chapters 69 & 70 (4th ed., Lippincott-Raven Publishers).

By "substantially retain" a property, it is meant that at least about 75%, 85%, 90%, 95%, 97%, 98%, 99% or 100% of the property (e.g., activity or other measurable characteristic) is retained.

UBE3A Expression Cassettes and Vectors

The present invention relates to the design of a UBE3A expression cassette to provide therapeutic levels of intracellular (e.g., non-secretory) expression of UBE3A protein (also known as E6AP ubiquitin-protein ligase (E6AP)), the enzyme encoded by the UBE3A gene, and the use of the expression cassette to achieve therapeutic levels of UBE3A/E6AP in a subject.

Thus, one aspect of the present invention relates to a polynucleotide comprising a mammalian UBE3A open reading frame. The open reading frame is the portion of the UBE3A gene that encodes UBE3A/E6AP. In some embodiments, the mammalian UBE3A open reading frame may be a human UBE3A open reading frame. The human UBE3A open reading frame may encode one or more isoforms of human UBE3A in the same reading frame. For example, in some embodiments, the mammalian UBE3A open reading frame may be a human UBE3A short isoform (i.e., human UBE3A isoform 1), and/or a human UBE3A long isoform (e.g., human UBE3A isoform 2 and/or 3) open reading frame. In some embodiments, the mammalian UBE3A open reading frame may be a human UBE3A isoform 1 and isoform 3 open reading frame. In other embodiments, the mammalian UBE3A open reading frame may be a human UBE3A isoform 1 and isoform 2 open reading frame. As used herein, a mammalian UBE3A open reading frame refers to a nucleotide sequence that encodes mammalian UBE3A/E6AP, e.g., a human UBE3A open reading frame refers to a nucleotide sequence that encodes a human UBE3A/E6AP. Where appropriate for function, as the term UBE3A open reading frame is used herein to refer to an open reading frame that encodes both a human UBE3A short isoform and a human UBE3A long isoform, the open reading frame includes 5' upstream nucleic acid sequences that encompass a Kozak sequence that influences expression of the long isoform. Such an open reading frame is shown in FIG. 13 and FIG. 14.

```
SEQ ID NO: 1. Wildtype human UBE3A short isoform (isoform 1; GenBank
accession # NM_130838.3)
GCTGCCTGCCGGGATACTCGGCCCGCCCAGCCAGTCCTCCCGTCTTGCGCCGCGGCCGCGAGATCCGTGT
GTCTCCCAAGATGGTGGCGCTGGGCTCGGGGTGACTACAGGAGACGACGGGGCCTTTTCCCTTCGCCAGG
ACCCGACACACCAGGCTTCGCTCGCTCGCTCGCGCACCCCTCCGCCGCGTAGCCATCCGCCAGCGCGGGCGCCC
GCCATCCGCCGCCTACTTACGCTTCACCTCTGCCGACCCGGCGCGCTCGGCTGCGGGCGGCGGCGCCTCC
TTCGGCTCCTCCTCGGAATAGCTCGCGGCCTGTAGCCCCTGGCAGGAGGGCCCCTCAGCCCCCCGGTGTG
GACAGGCAGCGGCGGCTGGCGACGAACGCCGGGATTTCGGCGGCCCCGGCGCTCCCTTTCCCGGCCTCGT
TTTCCGGATAAGGAAGCGCGGGTCCCGCATGAGCCCCGGCGGTGGCGGCAGCGAAAGAGAACGAGGCGGT
GGCGGGCGGAGGCGGCGGGCGAGGGCGACTACGACCAGTGAGGCGGCCGCCGCAGCCCAGGCGCGGGGGC
GACGACAGATCAGGAGAACCTCAGTCTGACGACATTGAAGCTAGCCGAATGAAGCGAGCAGCTGCAAAGC
ATCTAATAGAACGCTACTACCACCAGTTAACTGAGGGCTGTGGAAATGAAGCCTGCACGAATGAGTTTTG
TGCTTCCTGTCCAACTTTTCTTCGTATGGATAATAATGCAGCAGCTATTAAAGCCCTCGAGCTTTATAAG
ATTAATGCAAAACTCTGTGATCCTCATCCCTCCAAGAAAGGAGCAAGCTCAGCTTACCTTGAGAACTCGA
AAGGTGCCCCCAACAACTCCTGCTCTGAGATAAAAATGAACAAGAAAGGCGCTAGAATTGATTTTAAAGA
TGTGACTTACTTAACAGAAGAGAAGGTATATGAAATTCTTGAATTATGTAGAGAAAGAGAGGATTATTCC
CCTTTAATCCGTGTTATTGGAAGAGTTTTTTCTAGTGCTGAGGCATTGGTACAGAGCTTCCGGAAAGTTA
AACAACACACCAAGGAAGAACTGAAATCTCTTCAAGCAAAAGATGAAGACAAAGATGAAGATGAAAAGGA
AAAAGCTGCATGTTCTGCTGCTGCTATGGAAGAAGACTCAGAAGCATCTTCCTCAAGGATAGGTGATAGC
TCACAGGGAGACAACAATTTGCAAAAATTAGGCCCTGATGATGTGTCTGTGGATATTGATGCCATTAGAA
GGGTCTACACCAGATTGCTCTCTAATGAAAAAATTGAAACTGCCTTTCTCAATGCACTTGTATATTTGTC
ACCTAACGTGGAATGTGACTTGACGTATCACAATGTATACTCTCGAGATCCTAATTATCTGAATTTGTTC
ATTATCGTAATGGAGAATAGAAATCTCCACAGTCCTGAATATCTGGAAATGGCTTTGCCATTATTTTGCA
AAGCGATGAGCAAGCTACCCCTTGCAGCCCAAGGAAAACTGATCAGACTGTGGTCTAAATACAATGCAGA
CCAGATTCGGAGAATGATGGAGACATTTCAGCAACTTATTACTTATAAAGTCATAAGCAATGAATTTAAC
AGTCGAAATCTAGTGAATGATGATGATGCCATTGTTGCTGCTTCGAAGTGCTTGAAAATGGTTTACTATG
CAAATGTAGTGGGAGGGGAAGTGGACACAAATCACAATGAAGAAGATGATGAAGAGCCCATCCCTGAGTC
CAGCGAGCTGACACTTCAGGAACTTTTGGGAGAAGAAAGAAGAAACAAGAAAGGTCCTCGAGTGGACCCC
CTGGAAACTGAACTTGGTGTTAAAACCCTGGATTGTCGAAAACCACTTATCCCTTTTGAAGAGTTTATTA
ATGAACCACTGAATGAGGTTCTAGAAATGGATAAAGATTATACTTTTTTCAAAGTAGAAACAGAGAACAA
ATTCTCTTTTATGACATGTCCCTTTATATTGAATGCTGTCACAAAGAATTTGGGATTATATTATGACAAT
AGAATTCGCATGTACAGTGAACGAAGAATCACTGTTCTCTACAGCTTAGTTCAAGGACAGCAGTTGAATC
```

-continued

CATATTTGAGACTCAAAGTTAGACGTGACCATATCATAGATGATGCACTTGTCCGGCTAGAGATGATCGC
TATGGAAAATCCTGCAGACTTGAAGAAGCAGTTGTATGTGGAATTTGAAGGAGAACAAGGAGTTGATGAG
GGAGGTGTTTCCAAAGAATTTTTTCAGCTGGTTGTGGAGGAAATCTTCAATCCAGATATTGGTATGTTCA
CATACGATGAATCTACAAAATTGTTTTGGTTTAATCCATCTTCTTTTGAAACTGAGGGTCAGTTTACTCT
GATTGGCATAGTACTGGGTCTGGCTATTTACAATAACTGTATACTGGATGTACATTTTCCCATGGTTGTC
TACAGGAAGCTAATGGGGAAAAAAGGAACTTTTCGTGACTTGGGAGACTCTCACCCAGTTCTATATCAGA
GTTTAAAAGATTTATTGGAGTATGAAGGGAATGTGGAAGATGACATGATGATCACTTTCCAGATATCACA
GACAGATCTTTTTGGTAACCCAATGATGTATGATCTAAAGGAAAATGGTGATAAAATTCCAATTACAAAT
GAAAACAGGAAGGAATTTGTCAATCTTTATTCTGACTACATTCTCAATAAATCAGTAGAAAAACAGTTCA
AGGCTTTTCGGAGAGGTTTTCATATGGTGACCAATGAATCTCCCTTAAAGTACTTATTCAGACCAGAAGA
AATTGAATTGCTTATATGTGGAAGCCGGAATCTAGATTTCCAAGCACTAGAAGAAACTACAGAATATGAC
GGTGGCTATACCAGGGACTCTGTTCTGATTAGGGAGTTCTGGGAAATCGTTCATTCATTTACAGATGAAC
AGAAAAGACTCTTCTTGCAGTTTACAACGGGCACAGACAGAGCACCTGTGGGAGGACTAGGAGAATTAAA
GATGATTATAGCCAAAAATGGCCCAGACACAGAAAGGTTACCTACATCTCATACTTGCTTTAATGTGCTT
TTACTTCCGGAATACTCAAGCAAAGAAAACTTAAAGAGAGATTGTTGAAGGCCATCACGTATGCCAAAG
GATTTGGCATGCTGTAAAACAAAACAAAACAAATAAAACAAAAAAAGGAAGGAAAAAAAAAGAAAAAA
TTTAAAAAATTTTAAAAATATAACGAGGGATAAATTTTTGGTGGTGATAGTGTCCCAGTACAAAAGGCT
GTAAGATAGTCAACCACAGTAGTCACCTATGTCTGTGCCTCCCTTCTTTATTGGGGACATGTGGGCTGGA
ACAGCAGATTTCAGCTACATATATGAACAAATCCTTTATTATTATTATAATTATTTTTTTGCGTGAAAGT
GTTACATATTCTTTCACTTGTATGTACAGAGAGGTTTTTCTGAATATTTATTTTAAGGGTTAAATCACTT
TTGCTTGTGTTTATTACTGCTTGAGGTTGAGCCTTTTGAGTATTTAAAAAATATATACCAACAGAACTAC
TCTCCCAAGGAAAATATTGCCACCATTTGTAGACCACGTAACCTTCAAGTATGTGCTACTTTTTTGTCCC
TGTATCTAACTCAAATCAGGAACTGTATTTTTTTAATGATTTTGCTTTTGAAACTTGAAGTCTTGAAAAC
AGTGTGATGCAATTACTGCTGTTCTAGCCCCCAAAGAGTTTTCTGTGCAAAATCTTGAGAATCAATCAAT
AAAGAAAGATGGAAGGAAGGGAGAAATTGGAATGTTTTAACTGCAGCCCTCAGAACTTTAGTAACAGCAC
AACAAATTAAAAACAAAAACAACTCATGCCACAGTATGTCGTCTTTCATGTGTCTTGCAATGAACTGTTTC
AGTAGCCAATCCTCTTTCTTAGTATATGAAAGGACAGGGATTTTTGTTCTTGTTGTTCTCGTTGTTGTTT
TAAGTTTACTGGGGAAAGTGCATTTGGCCAAATGAAATGGTAGTCAAGCCTATTGCAACAAAGTTAGGAA
GTTTGTTGTTTGTTTATTATAAACAAAAAGCATGTGAAAGTGCACTTAAGATAGAGTTTTTATTAATTAC
TTACTTATTACCTAGATTTTAAATAGACAATCCAAAGTCTCCCCTTCGTGTTGCCATCATCTTGTTGAAT
CAGCCATTTTATCGAGGCACGTGATCAGTGTTGCAACATAATGAAAAAGATGGCTACTGTGCCTTGTGTT
ACTTAATCATACAGTAAGCTGACCTGGAAATGAATGAAACTATTACTCCTAAGAATTACATTGTATAGCC
CCACAGATTAAATTTAATTAATTAATTCAAAACATGTTAAACGTTACTTTCATGTACTATGGAAAAGTAC
AAGTAGGTTTACATTACTGATTTCCAGAAGTAAGTAGTTTCCCCTTTCCTACTAGTCTTCTGTGTATGTGATG
TTGTTAATTTCTTTTATTGCATTATAAAATAAAAGGATTATGTATTTTTAACTAAGGTGAGACATTGATA
TATCCTTTTGCTACAAGCTATAGCTAATGTGCTGAGCTTGTGCCTTGGTGATTGATTGATTGATTGACTG
ATTGTTTTAACTGATTACTGTAGATCAACCTGATGATTTGTTTGTTTGAAATTGGCAGGAAAATGCAGC
TTTCAAATCATTGGGGGGAGAAAAAGGATGTCTTTCAGGATTATTTTAATTAATTTTTTTCATAATTGAG
ACAGAACTGTTTGTTATGTACCATAATGCTAAATAAAACTGGAGCACTTTTCACCATAATTTAATTTAGT
GGAAAAAGAAGACAATGCTTTCCATATTGTGATAAGGTAACATGGGGTTTTTCTGGGCCAGCCTTTAGAA
CACTGTTAGGGTACATACGCTACCTTGATGAAAGGGACCTTCGTGCAACTGTAGTCATCTTAAAGGCTTC
TCATCCACTGTGCTTCTTAATGTGTAATTAAAGTGAGGAGAAATTAAATACTCTGAGGGCGTTTTATATA
ATAAATTCGTGAAGAAATGTGTGCTCTTCA

SEQ ID NO: 2. Wildtype human UBE3A long isoform (isoform 2; GenBank
accession # NM_000462.5)
GCTGCCTGCCGGGATACTCGGCCCGCCCAGCCAGTCCTCCCGTCTTGCGCCGCGGCCGCGAGATCCGTGT
GTCTCCCAAGATGGTGGCGCTGGGCTCGGGGTGACTACAGGAGACGACGGGGCCTTTTCCCTTCGCCAGG
ACCCGACACACCAGGCTTCGCTCGCTCGCGCACCCCTCCGCCGCGTAGCCATCCGCCAGCGCGGGCGCCC
GCCATCCGCCGCCTACTTACGCTTCACCTCTGCCGACCCGGCGCGCTCGGCTGCGGGCGGCGGCGCCTCC
TTCGGCTCCTCCTCGGAATAGCTCGCGGCCTGTAGCCCCTGGCAGGAGGGCCCCTCAGCCCCCCGGTGTG
GACAGGCAGCGGCGGCTGGCGACGAACGCCGGGATTTCGGCGGCCCCGGCGCTCCCTTTCCCGGCCTCGT
TTTCCGGATAAGGAAGCGCGGGTCCCGCATGAGCCCCGGCGGTGGCGGCAGCGAAAGAGAACGAGGCGGT
GGCGGGCGGAGGCGGCGGGCGAGGGCGACTACGACCAGTGAGGCGGCCGCCGCAGCCCAGGCGCGGGGGC
GACGACAGGTTAAAAATCTGTAAGAGCCTGATTTTAGAATTCACCAGCTCCTCAGAAGTTTGGCGAAATA
TGAGTTATTAAGCCTACGCTCAGATCAAGGTAGCAGCTAGACTGGTGTGACAACCTGTTTTTAATCAGTG
ACTCAAAGCTGTGATCACCCTGATGTCACCGAATGGCCACAGCTTGTAAAAGAGAGTTACAGTGGAGGTA
AAAGGAGTGGCTTCAGGATGGAGAAGCTGCACCAGTGTTATTGAAATCAGGAGAACCTCAGTCTGACG
ACATTGAAGCTAGCCGAATGAAGCAGCAGCTGCAAAGCATCTAATAGAACGCTACTACCACCAGTTAAC
TGAGGGCTGTGGAAATGAAGCCTGCACGAATGAGTTTTGTGCTTCCTGTCCAACTTTTCTTCGTATGGAT
AATAATGCAGCAGCTATTAAAGCCCTCGAGCTTTATAAGATTAATGCAAAACTCTGTGATCCTCATCCCT
CCAAGAAAGGAGCAAGCTCAGCTTACCTTGAGAACTCGAAAGGTGCCCCAACAACTCCTGCTCTGAGAT
AAAAATGAACAAGAAAGGCGCTAGAATTGATTTTAAAGATGTGACTTACTTAACAGAAGAGAAGGTATAT
GAAATTCTTGAATTATGTAGAGAAAAGAGAGGATTATTCCCCTTTAATCCGTGTTATTGGAAGAGTTTTTTT
CTAGTGCTGAGGCATTGGTACAGAGCTTCCGGAAAGTTAAACAACACACCAAGGAAGAACTGAAATCTCT
TCAAGCAAAAGATGAAGACAAAGATGAAGATGAAAAGGAAAAGCTGCATGTTCTGCTGCTATGGAA
GAAGACTCAGAAGCATCTTCCTCAAGGATAGGTGATAGCTCACAGGGAGACAACAATTTGCAAAAATTAG
GCCCTGATGATGTGTCTGTGGATATTGATGCCATTAGAAGGGTCTACACCAGATTGCTCTCTAATGAAA
AATTGAAACTGCCTTTCTCAATGCACTTGTATATTTGTCACCTAACGTGGAATGTGACTTGACGTATCAC
AATGTATACTCGAGATCCTAATTATCTGAATTTGTTCATTATCGTAATGGAGAATAGAAATCTCCACA
GTCCTGAATATCTGGAAATGGCTTTGCCATTATTTTGCAAAGCGATGAGCAAGCTACCCCTTGCAGCCCA
AGGAAAACTGATCAGACTGTGGTCTAAATACAATGCAGACCAGATTCGGAGAATGATGGAGACATTTCAG
CAACTTATTACTTATAAAGTCATAAGCAATGAATTTAACAGTCGAAATCTAGTGAATGATGATGATGCCA
TTGTTGCTGCTTCGAAGTGCTTGAAATGGTTTACTATGCAAATGTAGTGGGAGGGAAGTGGACACAAA
TCACAATGAAGAAGATGATGAAGAGCCCATCCCTGAGTCCAGCGAGCTGACACTTCAGGAACTTTTGGGA
GAAGAAAGAAGAAGAAGACAAGAAAAGGTCCTCGAGTGGACCCCCCTGGAACTGAACTTGGTGTTAAACCCTGG
ATTGTCGAAAACCACTTATCCCTTTTGAAGAGTTTATTAATGAACCACTGAATGAGGTTCTAGAAATGGA
TAAAGATTATACTTTTTTCAAAGTAGAAACAGAGAACAAATTCTCTTTTATGACATGTCCCTTTATATTG
AATGCTGTCACAAAGAATTTGGGATTATATTATGACAATAGAATTCGCATGTACAGTGAACGAAGAATCA
CTGTTCTCTACAGCCTTAGTTCAAGGACAGCAGTTGAATCCATATTTGAGACTCAAAGTTAGACGTGACCA
TATCATAGATGATGCACTTGTCCGGCTAGAGATGATCGCTATGGAAAATCCTGCAGACTTGAAGAAGCAG -continued

```
TTGTATGTGGAATTTGAAGGAGAACAAGGAGTTGATGAGGGAGGTGTTTCCAAAGAATTTTTTCAGCTGG
TTGTGGAGGAAATCTTCAATCCAGATATTGGTATGTTCACATACGATGAATCTACAAAATTGTTTTGGTT
TAATCCATCTTCTTTTGAAACTGAGGGTCAGTTTACTCTGATTGGCATAGTACTGGGTCTGGCTATTTAC
AATAACTGTATACTGGATGTACATTTTCCCATGGTTGTCTACAGGAAGCTAATGGGAAAAAAGGAACTT
TTCGTGACTTGGGAGACTCTCACCCAGTTCTATATCAGAGTTTAAAAGATTTATTGGAGTATGAAGGGAA
TGTGGAAGATGACATGATGATCACTTTCCAGATATCACAGACAGATCTTTTTGGTAACCCAATGATGTAT
GATCTAAAGGAAAATGGTGATAAAATTCCAATTACAAATGAAAACAGGAAGGAATTTGTCAATCTTTATT
CTGACTACATTCTCAATAAATCAGTAGAAAAACAGTTCAAGGCTTTTCGGAGAGGTTTTCATATGGTGAC
CAATGAATCTCCCTTAAAGTACTTATTCAGACCAGAAGAAATTGAATTGCTTATATGTGGAAGCCGGAAT
CTAGATTTCCAAGCACTAGAAGAAACTACAGAATATGACGGTGGCTATACCAGGGACTCTGTTCTGATTA
GGGAGTTCTGGGAAATCGTTCATTCATTTACAGATGAACAGAAAAGACTCTTCTTGCAGTTTACAACGGG
CACAGACAGAGCACCTGTGGGAGGACTAGGAAAATTAAAGATGATTATAGCCAAAAATGGCCCAGACACA
GAAAGGTTACCTACATCTCATACTTGCTTTAATGTGCTTTTACTTCCGGAATACTCAAGCAAAGAAAAAC
TTAAAGAGAGATTGTTGAAGGCCATCACGTATGCCAAAGGATTTGGCATGCTGTAAAACAAAACAAACA
AAATAAAACAAAAAAAGGAAGGAAAAAAAAGAAAAAATTTAAAAAATTTTAAAAATATAACGAGGGAT
AAATTTTTGGTGGTGATAGTGTCCCAGTACAAAAAGGCTGTAAGATAGTCAACCACAGTAGTCACCTATG
TCTGTGCCTCCCTTCTTTATTGGGGACATGTGGGCTGGAACAGCAGATTTCAGCTACATATATGAACAAA
TCCTTTATTATTATTATAATTATTTTTTGCGTGAAAGTGTTACATATTCTTTCACTTGTATGTACAGAG
AGGTTTTTCTGAATATTTATTTTAAGGGTTAAATCACTTTTGCTTGTGTTTATTACTGCTTGAGGTTGAG
CCTTTTGAGTATTTAAAAATATATACCAACAGAACTACTCTCCCAAGGAAATATTGCCACCATTTGTA
GACCACGTAACCTTCAAGTATGTGCTACTTTTTTGTCCCTGTATCTAACTCAAATCAGGAACTGTATTTT
TTTTAATGATTTGCTTTTGAAACTTGAAGTCTTGAAAACAGTGTGATGCAATTACTGCTGTTCTAGCCCC
CAAAGAGTTTTCTGTGCAAAATCTTGAGAATCAATCAATAAAGAAAGATGGAAGGAAGGGAGAAATTGGA
ATGTTTTAACTGCAGCCCTCAGAACTTTAGTAACAGCACAACAAATTAAAAACAAAAACAACTCATGCCA
CAGTATGTCGTCTTCATGTGTCTTGCAATGAACTGTTTCAGTAGCCAATCCTCTTTCTTAGTATATGAAA
GGACAGGGATTTTTGTTCTTGTTGTTCTCGTTGTTGTTTTAAGTTTACTGGGGAAAGTGCATTTGGCCAA
ATGAAATGGTAGTCAAGCCTATTGCAACAAAGTTAGGAAGTTTGTTGTTTGTTTATTATAAACAAAAAGC
ATGTGAAAGTGCACTTAAGATAGAGTTTTATTAATTACTTACTTATTACCTAGATTTTAAATAGACAAT
CCAAAGTCTCCCCTTCGTGTTGCCATCATCTTGTTGAATCAGCCATTTTATCGAGGCACGTGATCAGTGT
TGCAACATAATGAAAAAGATGGCTACTGTGCCTTGTGTTACTTAATCATACAGTAAGCTGACCTGGAAAT
GAATGAAACTATTACTCCTAAGAATTACATTGTATAGCCCCACAGATTAAATTTAATTAATTAATTCAAA
ACATGTTAAACGTTACTTTCATGTACTATGGAAAAGTACAAGTAGGTTTACATTACTGATTTCCAGAAGT
AAGTAGTTTCCCCTTTCCTAGTCTTCTGTGTATGTGATGTTGTTAATTTCTTTTATTGCATTATAAAATA
AAAGGATTATGTATTTTTAACTAAGGTGAGACATTGATATATCCTTTTGCTACAAGCTATAGCTAATGTG
CTGAGCTTGTGCCTTGGTGATTGATTGATTGATTGACTGATTGTTTTAACTGATTACTGTAGATCAACCT
GATGATTTGTTTGTTTGAAATTGGCAGGAAAAATGCAGCTTTCAAATCATTGGGGGGAGAAAAAGGATGT
CTTTCAGGATTATTTTAATTAATTTTTTTCATAATTGAGACAGAACTGTTTGTTATGTACCATAATGCTA
AATAAAACTGTGGCACTTTTCACCATAATTTAATTTAGTGGAAAAAGAAGACAATGCTTTCCATATTGTG
ATAAGGTAACATGGGGTTTTTCTGGGCCAGCCTTTAGAACACTGTTAGGGTACATACGCTACCTTGATGA
AAGGGACCTTCGTGCAACTGTAGTCATCTTAAAGGCTTCTCATCCACTGTGCTTCTTAATGTGTAATTAA
AGTGAGGAGAAATTAAATACTCTGAGGGCGTTTTATATAATAAATTCGTGAAGAAATGTGTGCTCTTCA
```

SEQ ID NO: 3. Wildtype human UBE3A long isoform (isoform 3; GenBank
accession # NM_130839.4)
```
GCTGCCTGCCGGGATACTCGGCCCGCCCAGCCAGTCCTCCCGTCTTGCGCCGCGGCCGCGAGATCCGTGT
GTCTCCCAAGATGGTGGCGCTGGGCTCGGGGTGACTACAGGAGACGACGGGGCCTTTTCCCTTCGCCAGG
ACCCGACACACCAGGCTTCGCTCGCTCGCGCACCCCTCCGCCGCGTAGCCATCCGCCAGCGCGGGCGCCC
GCCATCCGCCGCCTACTTACGCTTCACCTCTGCCGACCCGGCGCGCTCGGCTGCGGGCGGCGGCGCCTCC
TTCGGCTCCTCCTCGGAATAGCTCGCGGCCTGTAGCCCCTGGCAGGAGGGCCCCTCAGCCCCCCGGTGTG
GACAGGCAGCGGCGGCTGGCGACGAACGCCGGGATTTCGGCGGCCCCGGCGCTCCCTTTCCCGGCCTCGT
TTTCCGGATAAGGAAGCGCGGGTCCCGCATGAGCCCCGGCGGTGGCGGCAGCGAAAGAGAACGAGGCGGT
GGCGGGCGGAGGCGGCGGGCGAGGGCGACTACGACCAGTGAGGCGGCCGCCGCAGCCCAGGCGCGGGGGC
GACGACAGGTTAAAAATCTGTAAGAGCCTGATTTTAGAATTCACCAGCTCCTCAGAAGTTTGGCGAAATA
TGAGTTATTAAGCCTACGCTCAGATCAAGGTAGCAGCTAGACTGGTGTGACAACCTGTTTTTAATCAGTG
ACTCAAAGCTGTGATCACCCTGATGTCACCGAATGGCCACAGCTTGTAAAAGATCAGGAGAACCTCAGTC
TGACACATTGAAGCTAGCCGAATGAAGCGAGCAGCTGCAAAGCATCTAATAGAACGCTACTACCACCAG
TTAACTGAGGGCTGTGGAAATGAAGCCTGCACGAATGAGTTTTGTGCTTCCTGTCCAACTTTTCTTCGTA
TGGATAATAATGCAGCAGCTATTAAAGCCCTCGAGCTTTATAAGATTAATGCAAAACTCTGTGATCCTCA
TCCCTCCAAGAAAGGAGCAAGCTCAGCTTACCTTGAGAACTCGAAAGGTGCCCCAACAACTCCTGCTCT
GAGATAAAAATGAACAAGAAAGGCGCTAGAATTGATTTTAAAGATGTGACTTACTTAACAGAAGAGAAGG
TATATGAAATTCTTGAATTATGTAGAGAAAGAGAGGATTATTCCCCTTTAATCCGTGTTATTGGAAGAGT
TTTTTCTAGTGCTGAGGCATTGGTACAGAGCTTCCGGAAAGTTAAACAACACACCAAGGAAGAACTGAAA
TCTCTTCAAGCAAAAGATGAAGACAAAGATGAAGATGAAAAGGAAAAAGCTGCATGTTCTGCTGCTGCTA
TGGAAGAAGACTCAGAAGCTCAGCTTCCTCAAGGATAGGTGATAGCTCACAGGGAGACAACAATTTGCAAA
ATTAGGCCCTGATGATGTGTCTGTGGATATTGATGCCATTAGAAGGGTCTACACCAGATTGCTCTCTAAT
GAAAAAATTGAAACTGCCTTTCTCAATGCACTTGTATATTTGTCACCTAACGTGGAATGTGACTTGACGT
ATCACAATGTATACTCTCGAGATCCTAATTATCTGAATTTGTTCATTATCGTAATGGAGAATAGAAATCT
CCACAGTCCTGAATATCTGGAAATGGCTTTGCCATTATTTTGCAAGCGATGAGCAAGCTACCCCTTGCA
GCCCAAGGAAAACTGATCAGACTGTGGTCTAAATACAATGCAGACCAGATTCGGAGAATGATGGAGACAT
TTCAGCAACTTATTACTTATAAAGTCATAAGCAATGAATTTAACAGTCGAAATCTAGTAATGATGATGA
TGCCATTGTTGCTGCTTCGAAGTGCTTGAAATGGTTTACTATGCAAATGTAGTGGGAGGGAAGTGGAC
ACAAATCACAATGAAGAAGATGATGAAGAGCCCATCCCTGAGTCCAGCGAGCTGACACTTCAGAACTTT
TGGGAGAAGAAAGAAGAAACAAGAAAGGTCCTCGAGTGGACCCCCTGGAAACTGAACTTGGTGTTAAAAC
CCTGGATTGTCGAAAACCACTTATCCCTTTTGAAGAGTTTATTAATGAACCACTGAATGAGGTTCTAGAA
ATGGATAAAGATTATACTTTTTTCAAAGTAGAAACAGAGAACAAATTCTCTTTTATGACATGTCCCTTTA
TATTGAATGCTGTCACAAAGAATTTGGGATTATATTATGACAATGAATTCACAGTGACAGTGAACGAAA
AATCACTGTTCTCTACAGCTTAGTTCAAGGACAGCAGTTGAATCCATATTTGAGACTCAAAGTTAGACGT
GACCCATATCATAGATGATGCACTTGTCCGGCTAGAGATGATCGCTATGGAAAATCCTGCAGACTTGAAGA
AGCAGTTGTATGTGGAATTTGAAGGAGAACAAGGAGTTGATGAGGGAGGTGTTTCCAAAGAATTTTTTCA
GCTGGTTGTGGAGGAAATCTTCAATCCAGATATTGGTATGTTCACATACGATGAATCTACAAAATTGTTT
TGGTTTAATCCATCTTCTTTTGAAACTGAGGGTCAGTTTACTCTGATTGGCATAGTACTGGGTCTGGCTA
```

```
                                        -continued
TTTACAATAACTGTATACTGGATGTACATTTTCCCATGGTTGTCTACAGGAAGCTAATGGGGAAAAAGG
AACTTTTCGTGACTTGGGAGACTCTCACCCAGTTCTATATCAGAGTTTAAAAGATTTATTGGAGTATGAA
GGGAATGTGGAAGATGACATGATGATCACTTTCCAGATATCACAGACAGATCTTTTTGGTAACCCAATGA
TGTATGATCTAAAGGAAAATGGTGATAAAATTCCAATTACAAATGAAAACAGGAAGGAATTTGTCAATCT
TTATTCTGACTACATTCTCAATAAATCAGTAGAAAAACAGTTCAAGGCTTTTCGGAGAGGTTTTCATATG
GTGACCAATGAATCTCCCTTAAAGTACTTATTCAGACCAGAAGAAATTGAATTGCTTATATGTGGAAGCC
GGAATCTAGATTTCCAAGCACTAGAAGAAACTACAGAATATGACGGTGGCTATACCAGGGACTCTGTTCT
GATTAGGGAGTTCTGGGAAATCGTTCATTCATTTACAGATGAACAGAAAAGACTCTTCTTGCAGTTTACA
ACGGGCACAGACAGAGCACCTGTGGGAGGACTAGGAAAATTAAAGATGATTATAGCCAAAAATGGCCCAG
ACACAGAAAGGTTACCTACATCTCATACTTGCTTTAATGTGCTTTTACTTCCGGAATACTCAAGCAAAGA
AAAACTTAAAGAGAGATTGTTGAAGGCCATCACGTATGCCAAAGGATTTGGCATGCTGTAAAACAAAACA
AAACAAAATAAAACAAAAAAAGGAAGGAAAAAAAAAGAAAAAATTTAAAAAATTTTAAAAATATAACGA
GGGATAAATTTTTGGTGGTGATAGTGTCCCAGTACAAAAAGGCTGTAAGATAGTCAACCACAGTAGTCAC
CTATGTCTGTGCCTCCCTTCTTTATTGGGGACATGTGGGCTGGAACGACAGATTTCAGCTACATATATGA
ACAAATCCTTTATTATTATTATAATTATTTTTTTGCGTGAAAGTGTTACATATTCTTTCACTTGTATGTA
CAGAGAGGTTTTCTGAATATTTATTTTAAGGGTTAAATCACTTTTGCTTGTGTTTATTACTGCTTGAGG
TTGAGCCTTTTGAGTATTTAAAAAATATATACCAACAGAACTACTCTCCCAAGGAAAATATTGCCACCAT
TTGTAGACCACGTAACCTTCAAGTATGTGCTACTTTTTTGTCCCTGTATCTAACTCAAATCAGGAACTGT
ATTTTTTTTAATGATTTGCTTTTGAAACTTGAAGTCTTGAAAACAGTGTGATGCAATTACTGCTGTTCTA
GCCCCCAAAGAGTTTTCTGTGCAAAATCTTGAGAATCAATCAATAAAGAAAGATGGAAGGAAGGGAGAA
TTGGAATGTTTTAACTGCAGCCCTCAGAACTTTAGTAACAGCACAACAAATTAAAAACAAAAACAACTCA
TGCCACAGTATGTCGTCTTCATGTGTCTTGCAATGAACTGTTTCAGTAGCCAATCCTCTTTCTTAGTATA
TGAAAGGACAGGGATTTTTGTTCTTGTTGTTCTCGTTGTTGTTTTAAGTTTACTGGGGAAAGTGCATTTG
GCCAAATGAAATGGTAGTCAAGCCTATTGCAACAAAGTTAGGAAGTTTGTTGTTTGTTTATTATAAACAA
AAAGCATGTGAAAGTGCACTTAAGATAGAGTTTTTATTAATTACTTACTTATTACCTAGATTTTAAATAG
ACAATCCAAAGTCTCCCCTTCGTGTTGCCATCATCTTGTTGAATCAGCCATTTTATCGAGGCACGTGATC
AGTGTTGCAACATAATGAAAAAGATGGCTACTGTGCCTTGTGTTACTTAATCATACAGTAAGCTGACCTG
GAAATGAATGAAACTATTACTCCTAAGAATTACATTGTATAGCCCCACAGATTAAATTTAATTAATTAAT
TCAAAACATGTTAAACGTTACTTTCATGTACTATGGAAAAGTACAAGTAGGTTTACATTACTGATTTCCA
GAAGTAAGTAGTTTCCCCTTTCCTAGTCTTCTGTGTATGTGATGTTGTTAATTTCTTTTATTGCATTATA
AAATAAAAGGATTATGTATTTTTAACTAAGGTGAGACATTGATATATCCTTTTGCTACAAGCTATAGCTA
ATGTGCTGAGCTTGTGCCTTGGTGATTGATTGATTGATTGACTGATTGTTTTAACTGATTACTGTAGATC
AACCTGATGATTTGTTTGTTTGAAATTGGCAGGAAAAATGCAGCTTTCAAATCATTGGGGGGAGAAAAAG
GATGTCTTTCAGGATTATTTTAATTAATTTTTTTCATAATTGAGACAGAACTGTTTGTTATGTACCATAA
TGCTAAATAAAACTGTGGCACTTTTCACCATAATTTAATTTAGTGGAAAAAGAAGACAATGCTTTCCATA
TTGTGATAAGGTAACATGGGGTTTTTCTGGGCCAGCCTTTAGAACACTGTTAGGGTACATACGCTACCTT
GATGAAAGGGACCTTCGTGCAACTGTAGTCATCTTAAAGGCTTCTCATCCACTGTGCTTCTTAATGTGTA
ATTAAAGTGAGGAGAAATTAAATACTCTGAGGGCGTTTTATATAATAAATTCGTGAAGAAATGTGTGCTC
TTCA
```

While not wishing to be bound by theory, analysis of UBE3A isoform expression in human brain tissue indicated that short UBE3A isoform 1 is expressed at a ratio of at least 4:1, and up to 8:1, as compared to long UBE3A isoforms, depending on the specific brain region assayed (Mele et al, Science, 2015; 348(6235):660-665. Thus, in some embodiments, the mammalian UBE3A open reading frame may comprise one or more Kozak sequences that is modified from a WT or control, e.g., comprises, consists essentially of, or consists of a polynucleotide sequence in which 1, 2, 3, 4, 5, or more nucleotides have been substituted, added, and/or deleted compared to a WT or control, e.g., the consensus Kozak sequence and/or a wildtype UBE3A Kozak sequence(s). In some embodiments, the mammalian UBE3A open reading frame may comprise one or more Kozak sequences comprising nucleotide modifications (e.g., substitutions) that reduce and/or enhance initiation activity of one or more start codons (i.e., one or more initiation codons, also known as translation start sites) in the open reading frame. In some embodiments, the mammalian UBE3A open reading frame may comprise one or more Kozak sequences comprising nucleotide modifications (e.g., substitutions) that reduce initiation activity of one or more start codons (e.g., reduce expression of an isoform) by 5%, 10%, 20%, 30%, 40%, 50%, 60%, 70%, 80%, 90%, 95%, 96%, 97%, 98%, 99% or more as compared to a control, e.g., the consensus Kozak sequence, or e.g., a wildtype (e.g., unmodified) UBE3A Kozak sequence. In some embodiments, the mammalian UBE3A open reading frame may comprise one or more Kozak sequences comprising nucleotide modifications (e.g., substitutions) that enhance initiation activity of one or more start codons (e.g., enhance expression of an isoform) by 5%, 10%, 20%, 30%, 40%, 50%, 60%, 70%, 80%, 90%, 95%, 96%, 97%, 98%, 99%, 100%, 150%, 200% or more as compared to a control, e.g., the consensus Kozak sequence, or e.g., a wildtype (e.g., unmodified) UBE3A Kozak sequence. In some embodiments, the mammalian UBE3A open reading frame may comprise one or more nucleotide modifications to provide expression of a short isoform at a ratio of about 1:1 to about 15:1 as compared to expression of a long isoform, e.g., a ratio of about 1:1, 2:1, 3:1, 4:1, 5:1, 6:1, 7:1, 8:1, 9:1, 10:1, 11:1, 12:1, 13:1, 14:1, or 15:1 or any value or range therein. For example, in some embodiments, the mammalian (e.g., human) UBE3A open reading frame may comprise one or more nucleotide modifications to provide expression of a short isoform at a ratio of about 2:1 to about 4.5:1, about 1:1 to about 10:1, about 3:1 to about 8.5:1, or about 3:1 to about 4:1 as compared to expression of a long isoform. For example, in some embodiments, the mammalian (e.g., human) UBE3A open reading frame may comprise one or more nucleotide modifications to provide expression of a short isoform at a ratio of about 2.5:1, about 3:1, about 4:1, about 6.5:1, about 8:1, or about 10:1 as compared to expression of a long isoform.

In some embodiments, the mammalian UBE3A open reading frame comprises a first Kozak sequence comprising, consisting essentially of, or consisting of the nucleotide sequence of SEQ ID NO:6 or a sequence at least about 50% identical thereto, e.g., at least about 50, 55, 60, 65, 70, 75, 80, 85, 90, 91, 92, 93, 94, 95, 96, 97, 98, or 99% identical thereto. In some embodiments, the first Kozak sequence (e.g., SEQ ID NO: 6) is operably linked to isoform 3 or isoform 2, such as by replacing or modifying the WT isoform 3 or WT isoform 2 Kozak sequence (SEQ ID NO: 5 or 4 respectively).

SEQ ID NO: 4. Wildtype human UBE3A long isoform 2
Kozak sequence (start codon in underline).
UGCAGG<u>AUG</u>G SEQ ID NO: 5. Wildtype human UBE3A long isoform 3
Kozak sequence (start codon in underline).
CACCGA<u>AUG</u>G SEQ ID NO: 6. Modified human UBE3A first Kozak
sequence (start codon in underline) with reduced
initiation activity.
UUUUUU<u>AUG</u>G In some embodiments, the mammalian UBE3A open reading frame comprises a second Kozak sequence comprising, consisting essentially of, or consisting of the nucleotide sequence of SEQ ID NO:8 or a sequence at least about 50% identical thereto, e.g., at least about 50, 55, 60, 65, 70, 75, 80, 85, 90, 91, 92, 93, 94, 95, 96, 97, 98, or 99% identical thereto. In some embodiments, the second Kozak sequence (e.g., SEQ ID NO: 8) is operably linked to short isoform 1 such as by replacing or modifying the WT human UBE3A isoform 1 Kozak sequences (SEQ ID NO: 7).

SEQ ID NO: 7. Wildtype human UBE3A short isoform
(isoform 1) Kozak sequence (start codon in
underline).
AGCCG<u>AAUG</u>A SEQ ID NO: 8. Modified human UBE3A second Kozak
sequence (start codon in underline) with enhanced
initiation activity.
AGCAGG<u>AUG</u>A In some embodiments, the only codon optimized nucleotide sequences of the mammalian UBE3A open reading frame is to one or both Kozak sequences, such as is shown in FIG. 14 for human UBE3A. In some embodiments, additional (in addition to the Kozak sequences) codon optimized nucleotide sequences are within the mammalian UBE3A open reading frame, to influence expression in mammalian cells. The term "mammal" as used herein includes, but is not limited to, humans, primates, non-human primates (e.g., monkeys and baboons), cattle, sheep, goats, pigs, horses, cats, dogs, rabbits, rodents (e.g., rats, mice, hamsters, and the like), etc. Codon optimization is a technique well known in the art and optimal codons for expression in different species are known. The use of a codon-optimized UBE3A sequence allows one to distinguish expression of the transduced sequence from expression of the endogenous UBE3A sequence in a subject. In some embodiments, a polynucleotide comprising a human UBE3A open reading frame of the present invention may be codon-optimized for expression in human cells.

In some embodiments, a codon-optimized UBE3A open reading frame comprises, consists essentially of, or consists of the nucleotide sequence of SEQ ID NO:9, SEQ ID NO: 26 or SEQ ID NO: 27, or a sequence at least about 70% identical thereto, e.g., at least about 70, 75, 76, 77, 80, 85, 90, 91, 92, 93, 94, 95, 96, 97, 98, or 99% identical thereto. In some embodiments, one or both of the Kozak sequences in SEQ ID NO:27 (FIG. 14) are not further modified, while the other nucleotide sequences are further codon optimized to generate a UBE3A open reading frame that is at least about 70% identical to the respective sequences in SEQ ID NO: 27 (FIG. 14), e.g., at least about 70, 75, 76, 77, 80, 85, 90, 91, 92, 93, 94, 95, 96, 97, 98, or 99% identical, when omitting the Kozak sequences from the comparison, thereby preserving the Kozak sequence (SEQ ID NO: 8) operably linked to short isoform 1 and/or the Kozak sequence (SEQ ID NO: 6) is operably linked to isoform 3 or isoform 2.

SEQ ID NO: 9. Human codon-optimized UBE3A isoform 1 and isoform 3 open
reading frame (hUBE3A1>>3)
ATGGCCACAGCTTGTAAAAGATCAGGAGAACCTCAGTCTGACGACATTGAAGCTAGCAGGATGAAGAGAGCCGCC

GCAAAGCACCTGATCGAACGCTACTACCATCAGCTCACCGAGGGTTGCGGCAACGAAGCGTGTACCAACGAGTTC

TGTGCCTCCTGCCCCACGTTCCTGCGGATGGATAACAATGCCGCCGCAATCAAGGCGCTTGAACTGTATAAGATC

AACGCCAAGCTGTGCGATCCCCACCCTTCCAAGAAGGGAGCCAGCTCAGCCTACCTGGAAAACTCCAAGGGCGCC

CCTAACAACTCATGCTCCGAGATCAAGATGAATAAGAAGGGCGCCCGGATTGACTTCAAGGATGTGACCTACCTG

ACCGAGGAGAAGGTGTACGAGATCCTGGAACTCTGCCGAGAACGGGAGGACTACTCCCCTCTGATCCGCGTGATC

GGAAGAGTGTTCAGCTCCGCTGAAGCGCTCGTGCAGTCGTTCAGAAAGGTCAAGCAGCACACTAAGGAAGAACTC

AAGTCCCTGCAGGCCAAAGATGAGGATAAGGACGAAGATGAAAAAGAAAAGGCCGCCTGCTCAGCTGCCGCGATG

GAAGAAGATTCAGAGGCCTCCAGCAGCAGGATTGGCGACAGCTCCCAGGGGGACAACAACCTCCAGAAGCTGGGT

CCAGACGATGTGTCGGTGGACATCGACGCCATTCGGAGAGTGTACACCCGACTGCTCTCGAACGAAAAGATCGAG

ACTGCATTCCTGAACGCCCTTGTCTACCTGAGCCCGAACGTGGAATGCGACCTTACTTACCATAACGTCTACTCC

CGGGACCCAAACTACCTGAACCTGTTCATCATCGTGATGGAAAACCGGAACCTCCATTCCCCCGAGTACCTGGAA

ATGGCCCTGCCCCTGTTCTGCAAGGCCATGTCAAAGCTTCCGCTGGCCGCACAAGGAAAGCTGATCCGCTTGTGG

TCCAAGTACAACGCGGACCAGATCAGACGCATGATGGAAACGTTCCAGCAACTGATTACTTACAAGGTCATCTCC

AATGAGTTCAACTCCCGGAATCTTGTGAACGACGATGATGCCATTGTGGCCGCCTCCAAATGCCTGAAGATGGTC

TACTATGCGAACGTCGTGGGCGGGGAAGTCGATACCAACCACAACGAGGAGGACGACGAGGAACCTATCCCTGAG

TCATCAGAACTGACTCTGCAAGAACTGCTGGGCGAAGAACGCCGGAACAAGAAGGGCCCAAGAGTCGACCCGTTG

GAAACCGAACTGGGAGTCAAAACCCTGGACTGCAGAAAGCCTCTGATCCCGTTCGAAGAGTTCATCAACGAACCC

```
CTGAACGAGGTGCTGGAAATGGACAAGGACTACACCTTCTTCAAGGTCGAAACCGAGAACAAGTTCTCTTTCATG

ACTTGCCCGTTCATTCTGAACGCAGTGACCAAGAACCTGGGCCTCTACTACGACAACCGCATCCGCATGTACAGC

GAACGCCGCATCACCGTGCTGTACTCCCTGGTGCAAGGCCAACAGCTGAACCCCTACCTTCGCCTGAAAGTCCGC

CGCGACCATATCATTGATGACGCTCTCGTGCGCCTTGAGATGATCGCGATGGAGAACCCCGCAGATCTGAAGAAG

CAGCTCTACGTCGAGTTCGAAGGAGAACAGGGGGTGGACGAAGGAGGAGTGTCCAAGGAGTTCTTTCAGCTCGTG

GTGGAGGAAATCTTTAACCCTGACATCGGAATGTTCACCTATGACGAATCCACAAAGCTGTTTTGGTTTAACCCG

TCCTCGTTCGAAACTGAGGGTCAATTCACCCTCATCGGCATTGTGCTGGGACTCGCCATCTACAACAATTGCATC

CTCGACGTGCACTTCCCGATGGTGGTGTACCGCAAACTGATGGGCAAAAAGGGAACCTTCAGAGATCTGGGAGAC

TCACACCCGGTGCTGTACCAGTCGCTCAAGGACTTGTTGGAATACGAAGGGAACGTGGAAGATGATATGATGATT

ACCTTCCAAATCTCGCAGACTGACTTGTTTGGAAACCCTATGATGTACGACCTGAAGGAGAATGGAGACAAGATC

CCGATCACGAACGAAAACCGCAAGGAGTTCGTCAACCTGTACTCCGACTATATTCTGAACAAGAGCGTGGAGAAG

CAGTTTAAGGCTTTCCGCCGGGGATTCCACATGGTCACCAACGAAAGCCCGCTCAAGTACCTCTTTCGGCCCGAA

GAGATTGAACTGCTGATCTGCGGGTCGAGGAATCTGGACTTCCAGGCCCTTGAAGAGACTACTGAGTACGACGGA

GGCTATACCCGGGACTCCGTGCTGATAAGAGAGTTCTGGGAGATCGTGCACTCCTTCACCGATGAGCAGAAGCGG

CTGTTCCTCCAATTCACCACCGGCACTGACAGAGCGCCAGTCGGAGGACTGGGGAAGCTGAAGATGATCATTGCG

AAGAACGGTCCCGACACTGAGAGGTTGCCCACTTCCCACACTTGTTTCAACGTGCTGCTGCTCCCGGAGTACTCC

TCCAAGGAGAAGCTGAAGGAACGGCTCCTGAAGGCCATTACATACGCCAAAGGTTTCGGCATGCTTTAATGA
```

Another aspect of the invention relates to an expression cassette comprising a polynucleotide comprising a mammalian (e.g., human) UBE3A open reading frame of the present invention. In certain embodiments, the polynucleotide is a human codon-optimized sequence, e.g., a polynucleotide comprising the nucleotide sequence of SEQ ID NO:9, or a sequence at least about 70% identical thereto, e.g., at least about 70, 75, 80, 85, 90, 91, 92, 93, 94, 95, 96, 97, 98, or 99% identical thereto. In various embodiments of the invention described herein, the UBE3A nucleotide sequence of SEQ ID NO: 9 further comprises additional 5' base pair sequences (e.g., 6 thymines to result in the Modified Kozak sequence of SEQ ID NO: 6) to include a first Kozak sequence.

The UBE3A open reading frame in the expression cassette may be operably linked to one or more expression elements that may modify (i.e., enhance, or reduce, or limit) expression of UBE3A and/or E6AP, such as promoters, enhancers, polyadenylation signals, localization signals, and/or other expression elements known in the art.

In some embodiments, the polynucleotide is operably linked to a promoter, e.g., a neuron-specific promoter, e.g., human synapsin (hSYN), neuron-specific enolase (NSE), tubulin alpha 1 (Ta1), MeCP2 (MeP).

In some embodiments, the polynucleotide is operably linked to a human synapsin promoter, e.g., a promoter comprising, consisting essentially of, or consisting of the nucleotide sequence of SEQ ID NO:10 or a sequence at least about 70% identical thereto, e.g., at least about 70, 75, 80, 85, 90, 91, 92, 93, 94, 95, 96, 97, 98, or 99% identical thereto.

```
SEQ ID NO: 10. Human synapsin (hSYN) promoter
GGTACCAGGGCCCTGCGTATGAGTGCAAGTGGGTTTTAGGACCAGGATGAG

GCGGGGTGGGGGTGCCTACCTGACGACCGACCCCGACCCACTGGACAAGCA
```

```
CCCAACCCCCATTCCCCAAATTGCGCATCCCCTATCAGAGAGGGGAGGGG

AAACAGGATGCGGCGAGGCGCGTGCGCACTGCCAGCTTCAGCACCGCGGAC

AGTGCCTTCGCCCCCGCCTGGCGGCGCGCGCCACCGCCGCCTCAGCACTGA

AGGCGCGCTGACGTCACTCGCCGGTCCCCCGCAAACTCCCCTTCCCGGCCA

CCTTGGTCGCGTCCGCGCCGCCGCCGGCCCAGCCGGACCGCACCACGCGAG

GCGCGAGATAGGGGGGCACGGGCGCGACCATCTGCGCTGCGGCGCCGGCGA

CTCAGCGCTGCCTCAGTCTGCGGTGGGCAGCGGAGGAGTCGTGTCGTGCCT

GAGAGCGCAGTC
```

In some embodiments, the UBE3A open reading frame is operably linked to a polyadenylation signal, e.g., a bovine growth hormone (bGH) polyadenylation signal (bGHpA), e.g., a polyadenylation signal comprising, consisting essentially of, or consisting of the nucleotide sequence of SEQ ID NO:11 or a sequence at least about 70% identical thereto, e.g., at least about 70, 75, 80, 85, 90, 91, 92, 93, 94, 95, 96, 97, 98, or 99% identical thereto.

```
SEQ ID NO: 11. Bovine growth hormone polyadeny-
lation signal (bGHpA)
CTCGACTGTGCCTTCTAGTTGCCAGCCATCTGTTGTTTGCCCCTCCCCCGT

GCCTTCCTTGACCCTGGAAGGTGCCACTCCCACTGTCCTTTCCTAATAAAA

TGAGGAAATTGCATCGCATTGTCTGAGTAGGTGTCATTCTATTCTGGGGGG

TGGGGTGGGGCAGGACAGCAAGGGGGAGGATTGGGAAGACAACAGCAGGCA

TGCTGGGGATGCGGTGGGCTCTATGGCTTCTGAGGCGGAAAGAACCAGCT
```

In some embodiments, the UBE3A open reading frame is operably linked to a polyadenylation signal, e.g., a synthetic polyA (SpA), e.g., a polyadenylation signal comprising, consisting essentially of, or consisting of the nucleotide sequence of SEQ ID NO:12 or a sequence at least about 70% identical thereto, e.g., at least about 70, 75, 80, 85, 90, 91, 92, 93, 94, 95, 96, 97, 98, or 99% identical thereto.

SEQ ID NO: 12. Synthetic polyadenylation signal (SpA)
AATAAAGAGCTCAGATGCATCGATCAGAGTGTGTTGGTTTTTTGTGTG In some embodiments, the UBE3A open reading frame is operably linked to a polyadenylation signal, e.g., a simian virus 40 (SV40) polyadenylation signal (SV40pA), e.g., a polyadenylation signal comprising, consisting essentially of, or consisting of the nucleotide sequence of SEQ ID NO:13 or a sequence at least about 70% identical thereto, e.g., at least about 70, 75, 80, 85, 90, 91, 92, 93, 94, 95, 96, 97, 98, or 99% identical thereto.

SEQ ID NO: 13. SV40 polyadenylation signal (SV40pA)
AGACATGATAAGATACATTGATGAGTTTGGACAAACCACAACTAGAATGCA

GTGAAAAAAATGCTTTATTTGTGAAATTTGTGATGCTATTGCTTTATTTGT

AACCATTATAAGCTGCAATAAACAAGTTAACAACAACAATT

Those skilled in the art will further appreciate that a variety of promoter/enhancer elements may be used depending on the level and tissue-specific expression desired. The promoter/enhancer may be constitutive or inducible, depending on the pattern of expression desired. The promoter/enhancer may be native or foreign and can be a natural or a synthetic sequence. By foreign, it is intended that the transcriptional initiation region is not found in the wildtype host into which the transcriptional initiation region is introduced.

Promoter/enhancer elements can be native to the target cell or subject to be treated and/or native to the heterologous nucleic acid sequence. The promoter/enhancer element is generally chosen so that it will function in the target cell(s) of interest. In representative embodiments, the promoter/enhancer element is a mammalian promoter/enhancer element. The promoter/enhance element may be constitutive or inducible.

Inducible expression control elements are generally used in those applications in which it is desirable to provide regulation over expression of the heterologous nucleic acid sequence(s). Inducible promoters/enhancer elements for gene delivery can be tissue-specific or tissue-preferred promoter/enhancer elements, and include muscle specific or preferred (including cardiac, skeletal and/or smooth muscle), neural tissue specific or preferred (including brain-specific), eye (including retina-specific and cornea-specific), liver specific or preferred, bone marrow specific or preferred, pancreatic specific or preferred, spleen specific or preferred, and lung specific or preferred promoter/enhancer elements. Other inducible promoter/enhancer elements include hormone-inducible and metal-inducible elements. Exemplary inducible promoters/enhancer elements include, but are not limited to, a Tet on/off element, a RU486-inducible promoter, an ecdysone-inducible promoter, a rapamycin-inducible promoter, and a metallothionein promoter.

In embodiments wherein the UBE3A open reading frame is transcribed and then translated in the target cells, specific initiation signals are generally employed for efficient translation of inserted protein coding sequences. These exogenous translational control sequences, which may include the ATG initiation codon (i.e., translation start site) and adjacent sequences, can be of a variety of origins, both natural and synthetic. Non-limiting examples of these additional exogenous translational control sequences include Kozak sequences (e.g., additional Kozak consensus sequences).

In certain embodiments, the expression cassette further comprises at least one adeno-associated virus (AAV) inverted terminal repeat (ITR), e.g., two AAV ITRs. The two ITRs may have the same nucleotide sequence or different nucleotide sequences. The AAV ITRs may be from any AAV serotype or isolate (e.g., AAV type 1, AAV type 2, AAV type 3 (including types 3A and 3B), AAV type 4, AAV type 5, AAV type 6, AAV type 7, AAV type 8, AAV type 9, AAV type 10, AAV type 11, AAV type 12, AAV type 13, or any shown in Table 1). In some embodiments, the ITR(s) is/are from AAV2. Each ITR independently may be the wildtype sequence or a modified sequence. In some embodiments, a modified ITR may have a D-element deletion (WO 01/92551). A D-element deletion is defined as the removal of that portion of the ITR known as the D-element. The D-element can be alternatively referred to or known as a D region, or D sequence, and/or the nucleotides of the ITR that do not form palindromic hairpin structures. In some embodiments, the expression cassette is an AAV single-stranded vector. In some embodiments, the expression cassette is an AAV genome, e.g., a self-complementary AAV genome.

In certain embodiments, the expression cassette comprises a promoter, a mammalian UBE3A open reading frame, and a polyadenylation site, optionally in the recited order. In certain embodiments, the expression cassette comprises a promoter, a human UBE3A open reading frame, and a polyadenylation site, optionally in the recited order. In certain embodiments, the expression cassette comprises an AAV ITR, a promoter, a human UBE3A open reading frame, a polyadenylation site, and an AAV ITR, optionally in the recited order. In certain embodiments, the expression cassette comprises a human synapsin promoter, a human UBE3A open reading frame, and a bGH polyadenylation site, optionally in the recited order. In certain embodiments, the expression cassette comprises an AAV ITR, a human synapsin promoter, a human UBE3A open reading frame, a bGH polyadenylation site, and an AAV ITR, optionally in the recited order. In certain embodiments, the expression cassette comprises an AAV2 ITR, a promoter, a human UBE3A open reading frame, a bGH polyadenylation site, and an AA2V ITR, optionally in the recited order. In certain embodiments, the expression cassette comprises an AAV2 ITR, a human synapsin promoter, a human UBE3A open reading frame comprising human UBE3A short isoform and long isoform, a bGH polyadenylation site, and an AA2V ITR, optionally in the recited order. In certain embodiments, the expression cassette comprises an AAV2 ITR, a human synapsin promoter, a human UBE3A open reading frame comprising human UBE3A short isoform (i.e., isoform 1) and long isoform 3, a bGH polyadenylation site, and an AA2V ITR, optionally in the recited order. In certain embodiments, the expression cassette comprises an AAV2 ITR, a human synapsin promoter, a human UBE3A open reading frame comprising human UBE3A short isoform and long isoform 2, a bGH polyadenylation site, and an AAV2 ITR, optionally in the recited order. The aforementioned components are in operable linkage. In certain embodiments, the expression cassette comprises an AAV2 ITR, a human synapsin promoter, a human UBE3A open reading frame comprising human UBE3A short isoform and a human long isoform (i.e., either isoform 2 or 3) and further comprising one or more Kozak sequences comprising, consisting essentially of, or consisting of SEQ ID NO:6 and/or SEQ ID NO:8 or a sequence at least about 50% identical thereto, e.g., at least about 50, 55, 60, 65, 70, 75, 80, 85, 90, 91, 92, 93, 94, 95, 96, 97, 98, or 99% identical thereto, a bGH polyadenylation site, and an AA2V ITR, optionally in the recited order. The aforementioned components are in operable linkage.

In some embodiments, the expression cassette comprises, consists essentially of, or consists of the nucleotide sequence of SEQ ID NO:14 or a sequence at least about 70% identical thereto, e.g., at least about 70, 75, 80, 85, 90, 91, 92, 93, 94, 95, 96, 97, 98, or 99% identical thereto.

```
SEQ ID NO: 14. Human UBE3A expression cassette excluding ITRs
GAATTCGGTACCAGGGCCCTGCGTATGAGTGCAAGTGGGTTTTAGGACCAGGATGAGGCGGGGTGGGGGTGCCTA
CCTGACGACCGACCCCGACCCACTGGACAAGCACCCAACCCCCATTCCCCAAATTGCGCATCCCCTATCAGAGAG
GGGGAGGGGAAACAGGATGCGGCGAGGCGCGTGCGCACTGCCAGCTTCAGCACCGCGGACAGTGCCTTCGCCCCC
GCCTGGCGGCGCGCGCCACCGCCGCCTCAGCACTGAAGGCGCGCTGACGTCACTCGCCGGTCCCCCGCAAACTCC
CCTTCCCGGCCACCTTGGTCGCGTCCGCGCCGCCGCCGGCCCAGCCGGACCGCACCACGCGAGGCGCGAGATAGG
GGGGCACGGGCGCGACCATCTGCGCTGCGGCGCCGGCGACTCAGCGCTGCCTCAGTCTGCGGTGGGCAGCGGAGG
AGTCGTGTCGTGCCTGAGAGCGCAGTCTCTCCGATTTTTTATGGCCACAGCTTGTAAAAGATCAGGAGAACCTCA
GTCTGACGACATTGAAGCTAGCAGGATGAAGAGAGCCGCCGCAAAGCACCTGATCGAACGCTACTACCATCAGCT
CACCGAGGGTTGCGGCAACGAAGCGTGTACCAACGAGTTCTGTGCCTCCTGCCCCACGTTCCTGCGGATGGATAA
CAATGCCGCCGCAATCAAGGCGCTTGAACTGTATAAGATCAACGCCAAGCTGTGCGATCCCCACCCTTCCAAGAA
GGGAGCCAGCTCAGCCTACCTGGAAAACTCCAAGGGCGCCCCTAACAACTCATGCTCCGAGATCAAGATGAATAA
GAAGGGCGCCCGGATTGACTTCAAGGATGTGACCTACCTGACCGAGGAGAAGGTGTACGAGATCCTGGAACTCTG
CCGAGAACGGGAGGACTACTCCCCTCTGATCCGCGTGATCGGAAGAGTGTTCAGCTCCGCTGAAGCGCTCGTGCA
GTCGTTCAGAAAGGTCAAGCAGCACACTAAGGAAGAACTCAAGTCCCTGCAGGCCAAAGATGAGGATAAGGACGA
AGATGAAAAGAAAAGGCCGCCTGCTCAGCTGCCGCGATGGAAGAAGATTCAGAGGCCTCCAGCAGCAGGATTGG
CGACAGCTCCCAGGGGGACAACAACCTCCAGAAGCTGGGTCCAGACGATGTGTCGGTGGACATCGACGCCATTCG
GAGAGTGTACACCCGACTGCTCTCGAACGAAAAGATCGAGACTGCATTCCTGAACGCCCTTGTCTACCTGAGCCC
GAACGTGGAATGCGACCTTACTTACCATAACGTCTACTCCCGGGACCCAAACTACCTGAACCTGTTCATCATCGT
GATGGAAAACCGGAACCTCCATTCCCCCGAGTACCTGGAAATGGCCCTGCCCCTGTTCTGCAAGGCCATGTCAAA
GCTTCCGCTGGCCGCACAAGGAAAGCTGATCCGCTTGTGGTCCAAGTACAACGCGGACCAGATCAGACGCATGAT
GGAAACGTTCCAGCAACTGATTACTTACAAGGTCATCTCCAATGAGTTCAACTCCCGGAATCTTGTGAACGACGA
TGATGCCATTGTGGCCGCCTCCAAATGCCTGAAGATGGTCTACTATGCGAACGTCGTGGGCGGGAAGTCGATAC
CAACCACAACGAGGAGGACGACGAGGAACCTATCCCTGAGTCATCAGAACTGACTCTGCAAGAACTGCTGGGCGA
AGAACGCCGGAACAAGAAGGGCCCAAGAGTCGACCCGTTGGAAACCGAACTGGGAGTCAAAACCCTGGACTGCAG
AAAGCCTCTGATCCCGTTCGAAGAGTTCATCAACGAACCCCTGAACGAGGTGCTGGAAATGGACAAGGACTACAC
CTTCTTCAAGGTCGAAACCGAGAACAAGTTCTCTTTCATGACTTGCCCGTTCATTCTGAACGCAGTGACCAAGAA
CCTGGGCCTCTACTACGACAACCGCATCCGCATGTACAGCGAACGCCGCATCACCGTGCTGTACTCCCTGGTGCA
AGGCCAACAGCTGAACCCCTACCTTCGCCTGAAAGTCCGCCGCGACCATATCATTGATGACGCTCTCGTGCGCCT
TGAGATGATCGCGATGGAGAACCCCGCAGATCTGAAGAAGCAGCTCTACGTCGAGTTCGAAGGAGAACAGGGGGT
GGACGAAGGAGGAGTGTCCAAGGAGTTCTTTCAGCTCGTGGTGGAGGAAATCTTTAACCCTGACATCGGAATGTT
CACCTATGACGAATCCACAAAGCTGTTTTGGTTTAACCCGTCCTCGTTCGAAACTGAGGGTCAATTCACCCTCAT
CGGCATTGTGCTGGGACTCGCCATCTACAACAATTGCATCCTCGACGTGCACTTCCCGATGGTGGTGTACCGCAA
ACTGATGGGCAAAAAGGGAACCTTCAGAGATCTGGGAGACTCACACCCGGTGCTGTACCAGTCGCTCAAGGACTT
GTTGGAATACGAAGGGAACGTGGAAGATGATATGATGATTACCTTCCAAATCTCGCAGACTGACTTGTTTGGAAA
CCCTATGATGTACGACCTGAAGGAGAATGGAGACAAGATCCCGATCACGAACGAAACCGCAAGGAGTTCGTCAA
CCTGTACTCCGACTATATTCTGAACAAGAGCGTGGAGAAGCAGTTTAAGGCTTTCCGCCGGGGATTCCACATGGT
```

```
-continued
CACCAACGAAAGCCCGCTCAAGTACCTCTTTCGGCCCGAAGAGATTGAACTGCTGATCTGCGGGTCGAGGAATCT

GGACTTCCAGGCCCTTGAAGAGACTACTGAGTACGACGGAGGCTATACCCGGGACTCCGTGCTGATAAGAGAGTT

CTGGGAGATCGTGCACTCCTTCACCGATGAGCAGAAGCGGCTGTTCCTCCAATTCACCACCGGCACTGACAGAGC

GCCAGTCGGAGGACTGGGGAAGCTGAAGATGATCATTGCGAAGAACGGTCCCGACACTGAGAGGTTGCCCACTTC

CCACACTTGTTTCAACGTGCTGCTGCTCCCGGAGTACTCCTCCAAGGAGAAGCTGAAGGAACGGCTCCTGAAGGC

CATTACATACGCCAAAGGTTTCGGCATGCTTTAATGACTCGAGCGGCCGCGGGATCCCTCGAGACTGTGCCTTCT

AGTTGCCAGCCATCTGTTGTTTGCCCCTCCCCCGTGCCTTCCTTGACCCTGGAAGGTGCCACTCCCACTGTCCTT

TCCTAATAAAATGAGGAAATTGCATCGCATTGTCTGAGTAGGTGTCATTCTATTCTGGGGGGTGGGGTGGGGCAG

GACAGCAAGGGGAGGATTGGGAAGACAACAGCAGGCATGCTGGGGATGCGGTGGGCTCTATGGCTTCTGAGGCG

GAAAGAACCAGCTGACCGCGT
```

A further aspect of the invention relates to a vector comprising the polynucleotide or the expression cassette described herein. Suitable vectors include, but are not limited to, a plasmid, phage, viral vector (e.g., an AAV vector, a lentiviral vector, an adenovirus vector, a herpesvirus vector, an alphavirus vector, or a baculovirus vector), bacterial artificial chromosome (BAC), or yeast artificial chromosome (YAC). For example, the nucleic acid can comprise, consist of, or consist essentially of an AAV vector comprising a 5' and/or 3' terminal repeat (e.g., 5' and/or 3' AAV terminal repeat). In some embodiments, the vector is a delivery vehicle such as a particle (e.g., a microparticle or nanoparticle) or a liposome to which the expression cassette is attached or in which the expression cassette is embedded. The vector may be any delivery vehicle suitable to carry the expression cassette into a cell. In some embodiments, the vector may be a neuro-tropic vector.

In some embodiments, the vector is a viral vector, e.g., a lentiviral vector and/or an AAV vector. In some embodiments the vector is an AAV vector. The AAV vector may be any AAV serotype or isolate (e.g., AAV type 1, AAV type 2, AAV type 3 (including types 3A and 3B), AAV type 4, AAV type 5, AAV type 6, AAV type 7, AAV type 8, AAV type 9, AAV type 10, AAV type 11, AAV type 12, AAV type 13, or any shown in Table 1). In some embodiments the AAV vector is an AAV9 vector. In some embodiments, the AAV vector may be AAV9 and/or an AAV9-derived variant, such as, but not limited to PHP.B, PHP.eB, or AAV9.HR. In some embodiments, the AAV vector may be a synthetic AAV vector, e.g., Anc80. In some embodiments, the AAV vector may comprise wildtype capsid proteins. In other embodiments, the AAV vector may comprise a modified capsid protein with altered tropism compared to a wildtype capsid protein, e.g., a modified capsid protein is liver-detargeted or has enhanced tropism for particular cells.

In some embodiments, the vector is a single-stranded AAV (ssAAV) vector. In some embodiments, the vector is a self-complementary or duplexed AAV (scAAV) vector. scAAV vectors are described in international patent publication WO 01/92551 (the disclosure of which is incorporated herein by reference in its entirety). Use of scAAV to express the UBE3A ORF may provide an increase in the number of cells transduced, the copy number per transduced cell, or both.

An additional aspect of the invention relates to a transformed cell comprising the polynucleotide, expression cassette, and/or vector of the invention. In some embodiments, the polynucleotide, expression cassette, and/or vector is stably incorporated into the cell genome. The cell may be an in vitro, ex vivo, or in vivo cell.

Another aspect of the invention relates to a transgenic animal comprising the polynucleotide, expression cassette, vector, and/or the transformed cell of the invention. In some embodiments, the animal is a laboratory animal, e.g., a mouse, rat, rabbit, dog, monkey, or non-human primate.

A further aspect of the invention relates to a pharmaceutical formulation comprising the polynucleotide, expression cassette, vector, and/or transformed cell of the invention in a pharmaceutically acceptable carrier.

In a specific embodiment, the polynucleotide, expression cassette, vector, and/or transformed cell of the invention is isolated.

In another specific embodiment, the polynucleotide, expression cassette, vector, and/or transformed cell of the invention is purified.

Methods of Producing Virus Vectors

The present invention further provides methods of producing virus vectors. In one particular embodiment, the present invention provides a method of producing a recombinant AAV particle, comprising providing to a cell permissive for AAV replication: (a) a recombinant AAV template comprising (i) the polynucleotide or expression cassette of the invention, and (ii) an ITR; (b) a polynucleotide comprising Rep coding sequences and Cap coding sequences; under conditions sufficient for the replication and packaging of the recombinant AAV template; whereby recombinant AAV particles are produced in the cell. Conditions sufficient for the replication and packaging of the recombinant AAV template can be, e.g., the presence of AAV sequences sufficient for replication of the AAV template and encapsidation into AAV capsids (e.g., AAV rep sequences and AAV cap sequences) and helper sequences from adenovirus and/or herpesvirus. In particular embodiments, the AAV template comprises two AAV ITR sequences, which are located 5' and 3' to the polynucleotide of the invention, although they need not be directly contiguous thereto.

In some embodiments, the recombinant AAV template comprises an ITR that is not resolved by Rep to make duplexed AAV vectors as described in international patent publication WO 01/92551.

The AAV template and AAV rep and cap sequences are provided under conditions such that virus vector comprising the AAV template packaged within the AAV capsid is produced in the cell. The method can further comprise the step of collecting the virus vector from the cell. The virus vector can be collected from the medium and/or by lysing the cells.

The cell can be a cell that is permissive for AAV viral replication. Any suitable cell known in the art may be employed. In particular embodiments, the cell is a mammalian cell (e.g., a primate or human cell). As another option, the cell can be a trans-complementing packaging cell line that provides functions deleted from a replication-defective helper virus, e.g., 293 cells or other Ela trans-complementing cells.

The AAV replication and capsid sequences may be provided by any method known in the art. Current protocols typically express the AAV rep/cap genes on a single plasmid. The AAV replication and packaging sequences need not be provided together, although it may be convenient to do so. The AAV rep and/or cap sequences may be provided by any viral or non-viral vector. For example, the rep/cap sequences may be provided by a hybrid adenovirus or herpesvirus vector (e.g., inserted into the Ela or E3 regions of a deleted adenovirus vector). EBV vectors may also be employed to express the AAV cap and rep genes. One advantage of this method is that EBV vectors are episomal, yet will maintain a high copy number throughout successive cell divisions (i.e., are stably integrated into the cell as extra-chromosomal elements, designated as an "EBV based nuclear episome," see Margolski, (1992) Curr. Top. Microbiol. Immun. 158: 67).

As a further alternative, the rep/cap sequences may be stably incorporated into a cell.

Typically the AAV rep/cap sequences will not be flanked by the TRs, to prevent rescue and/or packaging of these sequences.

The AAV template can be provided to the cell using any method known in the art. For example, the template can be supplied by a non-viral (e.g., plasmid) or viral vector. In particular embodiments, the AAV template is supplied by a herpesvirus or adenovirus vector (e.g., inserted into the Ela or E3 regions of a deleted adenovirus). As another illustration, Palombo et al., (1998) J. Virology 72:5025, describes a baculovirus vector carrying a reporter gene flanked by the AAV TRs. EBV vectors may also be employed to deliver the template, as described above with respect to the rep/cap genes.

In another representative embodiment, the AAV template is provided by a replicating rAAV virus. In still other embodiments, an AAV provirus comprising the AAV template is stably integrated into the chromosome of the cell.

To enhance virus titers, helper virus functions (e.g., adenovirus or herpesvirus) that promote a productive AAV infection can be provided to the cell. Helper virus sequences necessary for AAV replication are known in the art. Typically, these sequences will be provided by a helper adenovirus or herpesvirus vector. Alternatively, the adenovirus or herpesvirus sequences can be provided by another non-viral or viral vector, e.g., as a non-infectious adenovirus miniplasmid that carries all of the helper genes that promote efficient AAV production as described by Ferrari et al., (1997) Nature Med. 3:1295, and U.S. Pat. Nos. 6,040,183 and 6,093,570.

Further, the helper virus functions may be provided by a packaging cell with the helper sequences embedded in the chromosome or maintained as a stable extrachromosomal element. Generally, the helper virus sequences cannot be packaged into AAV virions, e.g., are not flanked by ITRs.

Those skilled in the art will appreciate that it may be advantageous to provide the AAV replication and capsid sequences and the helper virus sequences (e.g., adenovirus sequences) on a single helper construct. This helper construct may be a non-viral or viral construct. As one nonlimiting illustration, the helper construct can be a hybrid adenovirus or hybrid herpesvirus comprising the AAV rep/cap genes.

In one particular embodiment, the AAV rep/cap sequences and the adenovirus helper sequences are supplied by a single adenovirus helper vector. This vector can further comprise the AAV template. The AAV rep/cap sequences and/or the AAV template can be inserted into a deleted region (e.g., the Ela or E3 regions) of the adenovirus.

In a further embodiment, the AAV rep/cap sequences and the adenovirus helper sequences are supplied by a single adenovirus helper vector. According to this embodiment, the AAV template can be provided as a plasmid template.

In another illustrative embodiment, the AAV rep/cap sequences and adenovirus helper sequences are provided by a single adenovirus helper vector, and the AAV template is integrated into the cell as a provirus. Alternatively, the AAV template is provided by an EBV vector that is maintained within the cell as an extrachromosomal element (e.g., as an EBV based nuclear episome).

In a further exemplary embodiment, the AAV rep/cap sequences and adenovirus helper sequences are provided by a single adenovirus helper. The AAV template can be provided as a separate replicating viral vector. For example, the AAV template can be provided by an AAV particle or a second recombinant adenovirus particle.

According to the foregoing methods, the hybrid adenovirus vector typically comprises the adenovirus 5' and 3' cis sequences sufficient for adenovirus replication and packaging (i.e., the adenovirus terminal repeats and PAC sequence). The AAV rep/cap sequences and, if present, the AAV template are embedded in the adenovirus backbone and are flanked by the 5' and 3' cis sequences, so that these sequences may be packaged into adenovirus capsids. As described above, the adenovirus helper sequences and the AAV rep/cap sequences are generally not flanked by ITRs so that these sequences are not packaged into the AAV virions.

Zhang et al., ((2001) Gene Ther. 18:704-12) describe a chimeric helper comprising both adenovirus and the AAV rep and cap genes.

Herpesvirus may also be used as a helper virus in AAV packaging methods. Hybrid herpesviruses encoding the AAV Rep protein(s) may advantageously facilitate scalable AAV vector production schemes. A hybrid herpes simplex virus type I (HSV-1) vector expressing the AAV-2 rep and cap genes has been described (Conway et al., (1999) Gene Ther. 6:986 and WO 00/17377).

As a further alternative, the virus vectors of the invention can be produced in insect cells using baculovirus vectors to deliver the rep/cap genes and AAV template as described, for example, by Urabe et al., (2002) Human Gene Ther. 13:1935-43.

AAV vector stocks free of contaminating helper virus may be obtained by any method known in the art. For example, AAV and helper virus may be readily differentiated based on size. AAV may also be separated away from helper virus based on affinity for a heparin substrate (Zolotukhin et al. (1999) Gene Therapy 6:973). Deleted replication-defective helper viruses can be used so that any contaminating helper virus is not replication competent. As a further alternative, an adenovirus helper lacking late gene expression may be employed, as only adenovirus early gene expression is required to mediate packaging of AAV. Adenovirus mutants defective for late gene expression are known in the art (e.g., is 100K and ts149 adenovirus mutants).

Methods of Using UBE3A Vectors

The present invention also relates to methods for delivering a UBE3A open reading frame to a cell or a subject to increase production of UBE3A and/or E6AP, e.g., for therapeutic or research purposes in vitro, ex vivo, and/or in vivo. Thus, one aspect of the invention relates to a method of expressing a UBE3A open reading frame in a cell, comprising contacting the cell with the polynucleotide, expression cassette, and/or the vector of the invention, thereby expressing the UBE3A open reading frame in the cell. In some embodiments, the cell is an in vitro cell, an ex vivo cell, and/or an in vivo cell. Expression of the present invention in vitro may be beneficial for research purposes, e.g., to express a recombinant protein, to study the effect of the protein on the cell, to evaluate efficacy and/or safety prior to expression in vivo, and/or the development of research and healthcare diagnostic and/or screening methods.

Another aspect of the invention relates to a method of expressing a UBE3A open reading frame in a subject, comprising delivering to the subject the polynucleotide, expression cassette, vector, and/or transformed cell of the invention, thereby expressing the UBE3A open reading frame in the subject. In some embodiments, the subject is an animal model of a disorder associated with aberrant UBE3A gene expression.

A further aspect of the invention relates to a method of treating a disorder associated with aberrant expression of a UBE3A gene or aberrant activity of a UBE3A gene product (e.g., E6AP) in a subject in need thereof, comprising delivering to the subject a therapeutically effective amount of the polynucleotide, expression cassette, vector, and/or transformed cell of the invention, thereby treating the disorder associated with aberrant expression of the UBE3A gene or aberrant activity of a UBE3A gene product in the subject. The invention provides a method of treating a disorder associated with aberrant expression of a UBE3A gene or aberrant activity of a UBE3A gene product (e.g., E6AP) in a subject in need thereof, comprising administering to the subject a therapeutically effective amount of the polynucleotide, the expression cassette, vector, and/or transformed cell of the invention, such that the UBE3A open reading frame is expressed in the subject. In some embodiments, the disorder associated with aberrant expression of the UBE3A gene or gene product may be Angelman Syndrome.

The invention further provides a method of treating Angelman Syndrome in a subject in need thereof, comprising administering to the subject a therapeutically effective amount of the polynucleotide, the expression cassette, vector, and/or transformed cell of the invention, such that the UBE3A open reading frame is expressed in the subject.

In certain embodiments, the polynucleotide, expression cassette, vector, and/or transformed cell is delivered to the subject, e.g., systemically (e.g., intravenously) or directly to the central nervous system (e.g., to the cerebrospinal fluid by intrathecal or intraventricular or intra-cisterna magna injection) of the subject. In some embodiments, the polynucleotide, expression cassette, vector, and/or transformed cell is delivered intravenously. In some embodiments, the polynucleotide, expression cassette, vector, and/or transformed cell is delivered intracerebroventricularly.

Recombinant virus vectors according to the present invention find use in both veterinary and medical applications. Suitable subjects include avians, reptiles, amphibians, fish, and mammals. The term "mammal" as used herein includes, but is not limited to, humans, primates, non-human primates (e.g., monkeys and baboons), cattle, sheep, goats, pigs, horses, cats, dogs, rabbits, rodents (e.g., rats, mice, hamsters, and the like), etc. Human subjects include embryos, fetuses, neonates, infants, juveniles, and adults. Optionally, the subject is "in need of" the methods of the present invention, e.g., because the subject has or is believed at risk for a disorder including those described herein or that would benefit from the delivery of a polynucleotide including those described herein. As a further option, the subject can be a laboratory animal and/or an animal model of disease. Preferably, the subject is a human.

In certain embodiments, the polynucleotide of the invention is administered to a subject in need thereof as early as possible in the life of the subject, e.g., as soon as the subject is diagnosed with aberrant UBE3A and/or E6AP expression or activity or any of the above-mentioned diseases or disorders. In some embodiments, the polynucleotide is administered to a newborn subject, e.g., after newborn screening has identified aberrant UBE3A and/or E6AP expression or activity. In some embodiments, the polynucleotide is administered to a subject prior to the age of 10 years, e.g., prior to 1, 2, 3, 4, 5, 6, 7, 8, 9, or 10 years of age. In some embodiments, the polynucleotide is administered to juvenile or adult subjects after the age of 10 years. In some embodiments, the polynucleotide is administered to a fetus in utero, e.g., after prenatal screening has identified aberrant UBE3A and/or E6AP expression or activity or the presence of one of the above-mentioned diseases or disorders. In some embodiments, the polynucleotide is administered to a subject as soon as the subject develops symptoms associated with aberrant UBE3A and/or E6AP expression or activity or is suspected or diagnosed as having aberrant UBE3A and/or E6AP expression or activity or one of the above-mentioned diseases or disorders. In some embodiments, the polynucleotide is administered to a subject before the subject develops symptoms associated with aberrant UBE3A and/or E6AP expression or activity or disease/disorder, e.g., a subject that is suspected or diagnosed as having aberrant UBE3A and/or E6AP expression or activity or one of the above-mentioned diseases or disorders but has not started to exhibit symptoms.

In particular embodiments, the present invention provides a pharmaceutical composition comprising a polynucleotide, expression cassette, vector, and/or transformed cell of the invention in a pharmaceutically acceptable carrier and, optionally, other medicinal agents, pharmaceutical agents, stabilizing agents, buffers, carriers, adjuvants, diluents, etc. For injection, the carrier will typically be a liquid. For other methods of administration, the carrier may be either solid or liquid. For inhalation administration, the carrier will be respirable, and will preferably be in solid or liquid particulate form. In some embodiments, a pharmaceutical carrier may comprise D-sorbitol (e.g., PBS 5% w/v D-sorbitol).

By "pharmaceutically acceptable" it is meant a material that is not toxic or otherwise undesirable, i.e., the material may be administered to a subject without causing any undesirable biological effects.

One aspect of the present invention is a method of transferring a UBE3A open reading frame to a cell in vitro. The polynucleotide, expression cassette, and/or vector of the invention may be introduced to the cells in the appropriate amount. The virus vector may be introduced to the cells at the appropriate multiplicity of infection according to standard transduction methods appropriate for the particular target cells. Titers of the virus vector or capsid to administer can vary, depending upon the target cell type and number, and the particular virus vector or capsid, and can be determined by those of skill in the art without undue experimentation. In particular embodiments, at least about $10^3$ infectious units, more preferably at least about $10^5$ infectious units are introduced to the cell.

The cell(s) into which the polynucleotide, expression cassette, and/or vector of the invention, e.g., virus vector, can be introduced may be of any type, including but not limited to neural cells (including cells of the peripheral and central nervous systems, in particular, brain cells such as neurons, oligodendrocytes, glial cells, astrocytes), lung cells, cells of the eye (including retinal cells, retinal pigment epithelium, and corneal cells), epithelial cells (e.g., gut and respiratory epithelial cells), skeletal muscle cells (including myoblasts, myotubes and myofibers), diaphragm muscle cells, dendritic cells, pancreatic cells (including islet cells), hepatic cells, a cell of the gastrointestinal tract (including smooth muscle cells, epithelial cells), heart cells (including cardiomyocytes), bone cells (e.g., bone marrow stem cells), hematopoietic stem cells, spleen cells, keratinocytes, fibroblasts, endothelial cells, prostate cells, joint cells (including, e.g., cartilage, meniscus, synovium and bone marrow), germ cells, and the like. Alternatively, the cell may be any progenitor cell. As a further alternative, the cell can be a stem cell (e.g., neural stem cell, liver stem cell). As still a further alternative, the cell may be a cancer or tumor cell. Moreover, the cells can be from any species of origin, as indicated above.

The polynucleotide, expression cassette, and/or vector of the invention, e.g., virus vector, may be introduced to cells in vitro for the purpose of administering the modified cell to a subject. In particular embodiments, the cells have been removed from a subject, the polynucleotide, expression cassette, and/or vector of the invention, e.g., virus vector, is introduced therein, and the cells are then replaced back into the subject. Methods of removing cells from subject for treatment ex vivo, followed by introduction back into the subject are known in the art (see, e.g., U.S. Pat. No. 5,399,346). Alternatively, the polynucleotide, expression cassette, and/or vector of the invention, e.g., virus vector, is introduced into cells from another subject, into cultured cells, or into cells from any other suitable source, and the cells are administered to a subject in need thereof.

Suitable cells for ex vivo gene therapy are as described above. Dosages of the cells to administer to a subject will vary upon the age, condition and species of the subject, the type of cell, the nucleic acid being expressed by the cell, the mode of administration, and the like. Typically, at least about $10^2$ to about $10^8$ or about $10^3$ to about $10^6$ cells will be administered per dose in a pharmaceutically acceptable carrier. In particular embodiments, the cells transduced with the virus vector ex vivo are administered to the subject in an effective amount in combination with a pharmaceutical carrier.

A further aspect of the invention is a method of administering the polynucleotide, expression cassette, and/or vector of the invention, e.g., virus vector, to a subject. In particular embodiments, the method comprises a method of delivering a UBE3A open reading frame to an animal subject, the method comprising: administering an effective amount of a virus vector according to the invention to an animal subject. Administration of the virus vectors of the present invention to a human subject or an animal in need thereof can be by any means known in the art. Optionally, the virus vector is delivered in an effective dose in a pharmaceutically acceptable carrier.

Dosages of the virus vectors to be administered to a subject will depend upon the mode of administration, the disease or condition to be treated, the individual subject's condition, the particular virus vector, and the nucleic acid to be delivered, and can be determined in a routine manner. Exemplary doses for achieving therapeutic effects are virus titers of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, $10^{15}$, $10^{16}$ transducing units (TU) or more, e.g., about $10^7$, $10^8$, $10^9$, $10^{10}$, $10^{11}$, $10^{12}$, $10^{13}$, $10^{14}$, or $10^{15}$ TU, yet more preferably, from about $10^8$-$10^{14}$ TU is used for the dose, or about $10^{10}$, $10^{11}$, $10^{12}$, $10^{13}$, $10^{14}$, or $10^{15}$ TU. Doses and virus titer transducing units may be calculated as vector or viral genomes (vg), and/or vg/kg of the subject. In some embodiments, the dose is at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, $10^{15}$, $10^{16}$ vg/kg of the subject, e.g., about $10^7$, $10^8$, $10^9$, $10^{10}$, $10^{11}$, $10^{12}$, $10^{13}$, $10^{14}$, or $10^{15}$ vg/kg of the subject, or from about $10^8$-$10^{14}$ vg/kg subject, in some embodiments about $10^{10}$, $10^{11}$, $10^{12}$, $10^{13}$, $10^{14}$, or $10^{15}$ vg/kg of the subject.

In some embodiments, a method of the present invention may comprise expressing and/or administering a UBE3A open reading frame at a dose (e.g., viral titer) such that a UBE3A short isoform is expressed at a ratio of about 1:1 to about 15:1 as compared to expression of a long isoform, e.g., a ratio of about 1:1, 2:1, 3:1, 4:1, 5:1, 6:1, 7:1, 8:1, 9:1, 10:1, 11:1, 12:1, 13:1, 14:1, or 15:1 or any value or range therein. For example, in some embodiments, the mammalian (e.g., human) UBE3A open reading frame may be administered such that a short isoform is expressed at a ratio of about 2:1 to about 4.5:1, about 1:1 to about 10:1, about 3:1 to about 8.5:1, or about 3:1 to about 4:1 as compared to expression of a long isoform. In some embodiments, the mammalian (e.g., human) UBE3A open reading frame may be administered such that a short isoform is expressed at a ratio of about 2.5:1, about 3:1, about 4:1, about 6.5:1, about 8:1, or about 10:1 as compared to expression of a long isoform.

In particular embodiments, more than one administration (e.g., two, three, four or more administrations) may be employed to achieve the desired level of gene expression over a period of various intervals, e.g., daily, weekly, monthly, yearly, etc.

Exemplary modes of administration include oral, rectal, transmucosal, topical, intranasal, inhalation (e.g., via an aerosol), buccal (e.g., sublingual), vaginal, intrathecal, intraocular, transdermal, in utero (or in ovo), parenteral (e.g., intravenous, subcutaneous, intradermal, intramuscular [including administration to skeletal, diaphragm and/or cardiac muscle], intradermal, intrapleural, intracerebral, and intraarticular), topical (e.g., to both skin and mucosal surfaces, including airway surfaces, and transdermal administration), intro-lymphatic, and the like, as well as direct tissue or organ injection (e.g., to liver, skeletal muscle, cardiac muscle, diaphragm muscle or brain). Administration can also be to a tumor (e.g., in or a near a tumor or a lymph node). The most suitable route in any given case will depend on the nature and severity of the condition being treated and on the nature of the particular vector that is being used. In some embodiments, more than one mode and/or route of administration may be utilized, for example, e.g., intraparenchymal administration and intracerebroventricular administration.

In some embodiments, the vector comprising the expression cassette (e.g., viral vector, AAV vector) is administered to the CNS, the peripheral nervous system, or both. In some embodiments, the viral vector is administered directly to the CNS, e.g., the brain or the spinal cord. Direct administration can result in high specificity of transduction of CNS cells, e.g., wherein at least 80%, 85%, 90%, 95% or more of the transduced cells are CNS cells. Any method known in the art to administer vectors directly to the CNS can be used. The vector may be introduced into the spinal cord, brainstem (medulla oblongata, pons), midbrain (hypothalamus, thalamus, epithalamus, pituitary gland, substantia nigra, pineal gland), cerebellum, telencephalon (corpus striatum, cerebrum including the occipital, temporal, parietal and frontal lobes, cortex, basal ganglia, hippocampus and amygdala), limbic system, neocortex, corpus striatum, cerebrum, and inferior colliculus. The vector may also be administered to different regions of the eye such as the retina, cornea or optic nerve. The vector may be delivered into the cerebrospinal fluid (e.g., by lumbar puncture) for more disperse administration of the vector.

The vector comprising the expression cassette (e.g., viral vector, AAV vector) may be administered to the desired region(s) of the CNS by any route known in the art, including but not limited to, intrathecal, intracerebral, intraventricular, intra-cisterna magna, intraparenchymal, intranasal, intra-aural, intra-ocular (e.g., intra-vitreous, sub-retinal, anterior chamber) and peri-ocular (e.g., sub-Tenon's region) delivery or any combination thereof.

The vector may be administered in a manner that produces a more widespread, diffuse transduction of tissues, including the CNS, the peripheral nervous system, and/or other tissues.

Typically, the vector comprising the expression cassette (e.g., viral vector, AAV vector) will be administered in a liquid formulation by direct injection (e.g., stereotactic injection) to the desired region or compartment in the CNS and/or other tissues. In some embodiments, the vector can be delivered via a reservoir and/or pump. In other embodiments, the vector may be provided by topical application to the desired region or by intra-nasal administration of an aerosol formulation. Administration to the eye or into the ear, may be by topical application of liquid droplets. As a further alternative, the vector may be administered as a solid, slow-release formulation. Controlled release of parvovirus and AAV vectors is described by international patent publication WO 01/91803.

Injectables can be prepared in conventional forms, either as liquid solutions or suspensions, solid forms suitable for solution or suspension in liquid prior to injection, or as emulsions. Alternatively, one may administer the virus vector in a local rather than systemic manner, for example, in a depot or sustained-release formulation. Further, the virus vector can be delivered dried to a surgically implantable matrix such as a bone graft substitute, a suture, a stent, and the like (e.g., as described in U.S. Pat. No. 7,201,898).

Pharmaceutical compositions suitable for oral administration can be presented in discrete units, such as capsules, cachets, lozenges, or tablets, each containing a predetermined amount of the composition of this invention; as a powder or granules; as a solution or a suspension in an aqueous or non-aqueous liquid; or as an oil-in-water or water-in-oil emulsion. Oral delivery can be performed by complexing a virus vector of the present invention to a carrier capable of withstanding degradation by digestive enzymes in the gut of an animal. Examples of such carriers include plastic capsules or tablets, as known in the art. Such formulations are prepared by any suitable method of pharmacy, which includes the step of bringing into association the composition and a suitable carrier (which may contain one or more accessory ingredients as noted above). In general, the pharmaceutical composition according to embodiments of the present invention are prepared by uniformly and intimately admixing the composition with a liquid or finely divided solid carrier, or both, and then, if necessary, shaping the resulting mixture. For example, a tablet can be prepared by compressing or molding a powder or granules containing the composition, optionally with one or more accessory ingredients. Compressed tablets are prepared by compressing, in a suitable machine, the composition in a free-flowing form, such as a powder or granules optionally mixed with a binder, lubricant, inert diluent, and/or surface active/dispersing agent(s). Molded tablets are made by molding, in a suitable machine, the powdered compound moistened with an inert liquid binder.

Pharmaceutical compositions suitable for buccal (sub-lingual) administration include lozenges comprising the composition of this invention in a flavored base, usually sucrose and acacia or tragacanth; and pastilles comprising the composition in an inert base such as gelatin and glycerin or sucrose and acacia.

Pharmaceutical compositions suitable for parenteral administration can comprise sterile aqueous and non-aqueous injection solutions of the composition of this invention, which preparations are optionally isotonic with the blood of the intended recipient. These preparations can contain antioxidants, buffers, bacteriostats and solutes, which render the composition isotonic with the blood of the intended recipient. Aqueous and non-aqueous sterile suspensions, solutions and emulsions can include suspending agents and thickening agents. Examples of non-aqueous solvents are propylene glycol, polyethylene glycol, vegetable oils such as olive oil, and injectable organic esters such as ethyl oleate. Aqueous carriers include water, alcoholic/aqueous solutions, emulsions or suspensions, including saline and buffered media. Parenteral vehicles include sodium chloride solution, Ringer's dextrose, dextrose and sodium chloride, lactated Ringer's, or fixed oils. Intravenous vehicles include fluid and nutrient replenishers, electrolyte replenishers (such as those based on Ringer's dextrose), and the like. Preservatives and other additives may also be present such as, for example, antimicrobials, anti-oxidants, chelating agents, and inert gases and the like.

The compositions can be presented in unit/dose or multi-dose containers, for example, in sealed ampoules and vials, and can be stored in a freeze-dried (lyophilized) condition requiring only the addition of the sterile liquid carrier, for example, saline or water-for-injection immediately prior to use.

Extemporaneous injection solutions and suspensions can be prepared from sterile powders, granules and tablets of the kind previously described. For example, an injectable, stable, sterile composition of this invention in a unit dosage form in a sealed container can be provided. The composition can be provided in the form of a lyophilizate, which can be reconstituted with a suitable pharmaceutically acceptable carrier to form a liquid composition suitable for injection into a subject. The unit dosage form can be from about 1 µg to about 10 grams of the composition of this invention. When the composition is substantially water-insoluble, a sufficient amount of emulsifying agent, which is physiologically acceptable, can be included in sufficient quantity to emulsify the composition in an aqueous carrier. One such useful emulsifying agent is phosphatidyl choline.

Pharmaceutical compositions suitable for rectal administration can be presented as unit dose suppositories. These can be prepared by admixing the composition with one or more conventional solid carriers, such as for example, cocoa butter and then shaping the resulting mixture.

Pharmaceutical compositions of this invention suitable for topical application to the skin can take the form of an ointment, cream, lotion, paste, gel, spray, aerosol, or oil. Carriers that can be used include, but are not limited to, petroleum jelly, lanoline, polyethylene glycols, alcohols, transdermal enhancers, and combinations of two or more thereof. In some embodiments, for example, topical delivery can be performed by mixing a pharmaceutical composition of the present invention with a lipophilic reagent (e.g., DMSO) that is capable of passing into the skin.

Pharmaceutical compositions suitable for transdermal administration can be in the form of discrete patches adapted to remain in intimate contact with the epidermis of the subject for a prolonged period of time. Compositions suitable for transdermal administration can also be delivered by iontophoresis (see, for example, *Pharm. Res.* 3:318 (1986)) and typically take the form of an optionally buffered aqueous solution of the composition of this invention. Suitable formulations can comprise citrate or bis\tris buffer (pH 6) or ethanol/water and can contain from 0.1 to 0.2M active ingredient.

The virus vectors disclosed herein may be administered to the lungs of a subject by any suitable means, for example, by administering an aerosol suspension of respirable particles comprised of the virus vectors, which the subject inhales. The respirable particles may be liquid or solid. Aerosols of liquid particles comprising the virus vectors may be produced by any suitable means, such as with a pressure-driven aerosol nebulizer or an ultrasonic nebulizer, as is known to those of skill in the art. See, e.g., U.S. Pat. No. 4,501,729. Aerosols of solid particles comprising the virus vectors may likewise be produced with any solid particulate medicament aerosol generator, by techniques known in the pharmaceutical art.

The present invention may be as defined in any one of the following numbered paragraphs.

1. A polynucleotide comprising a human UBE3A open reading frame, wherein the human UBE3A open reading frame encodes human UBE3A short isoform and long isoform.
2. The polynucleotide of paragraph 1, wherein the human UBE3A open reading frame encodes human UBE3A short isoform (i.e., isoform 1) and long isoform 2.
3. The polypeptide of paragraph 1, wherein the human UBE3A open reading frame encodes human UBE3A short isoform (i.e., isoform 1) and long isoform 3.
4. The polynucleotide of any one of paragraphs 1-3, which comprises the human UBE3A open reading frame comprises one or more nucleotide modifications to reduce expression of the long isoform as compared to expression of native ORF which lacks the one or more nucleotide modifications to reduce expression.
5. The polynucleotide of paragraph 4, wherein the expression of the long isoform is reduced by at least 10%, 20%, 30%, 40%, 50%, 60%, 70%, 80%, 90%, or 95% as compared to native ORF not comprising nucleotide modifications to reduce expression.
6. The polynucleotide of any one of paragraphs 1-5, wherein the human UBE3A open reading frame comprises one or more nucleotide modifications to enhance expression of the short isoform (e.g., enhance expression by 10%, 20%, 30%, 40%, 50%, 60%, 70%, 80%, 90%, 95% or more) as compared to native ORF not comprising nucleotide modifications to enhance expression.
7. The polynucleotide of paragraph 6, wherein the expression of the short isoform is enhanced by at least 10%, 20%, 30%, 40%, 50%, 60%, 70%, 80%, 90%, or 95% as compared to native ORF not comprising nucleotide modifications to enhance expression.
8. The polynucleotide of any one of paragraphs 1-7, wherein the human UBE3A open reading frame comprises one or more nucleotide modifications to encode expression of the short isoform at a ratio of about 1:1 to about 15:1, as compared to expression of the long isoform.
9. The polynucleotide of any one of paragraphs 1-8, which comprises a first Kozak sequence comprising SEQ ID NO:6 operably linked to coding sequences for the long isoform.
10. The polynucleotide of any one of paragraphs 1-9, which comprises a second Kozak sequence comprising SEQ ID NO:8 operably linked to coding sequence for the short isoform.
11. The polynucleotide of any one of paragraphs 1-10, wherein the human UBE3A open reading frame is codon-optimized for expression in a human cell.
12. The polynucleotide of paragraph 12, wherein the human UBE3A open reading frame is codon-optimized for intracellular or non-secretory expression in a human cell.
13. The polynucleotide of any one of paragraphs 1-12, wherein the human UBE3A open reading frame comprises the nucleotide sequence of SEQ ID NO:9, SEQ ID NO: 25, or SEQ ID NO: 26, or a nucleotide sequence having at least about 70%, 75%, 76%, 77%, 80%, 85%, or 90% identity thereto.
14. An expression cassette comprising the polynucleotide of any one of paragraphs 1-13.
15. The expression cassette of paragraph 14, wherein the human UBE3A open reading frame is operably linked to a promoter.
16. The expression cassette of paragraph 15, wherein the promoter is a neuron-specific promoter.
17. The expression cassette of paragraph 15 or 16, wherein the promoter is a human synapsin promoter.
18. The expression cassette of any one of paragraphs 14-17, wherein the human UBE3A open reading frame is operably linked to a polyadenylation signal.
19. The expression cassette of paragraph 18, wherein the polyadenylation signal is a bovine growth hormone (bGH) polyadenylation signal (bGHpA).
20. The expression cassette of any one of paragraphs 14-19, further comprising at least one adeno-associated virus (AAV) inverted terminal repeat (ITR).
21. The expression cassette of paragraph 20, wherein the expression cassette comprises two AAV ITRs.
22. The expression cassette of paragraph 21, wherein the AAV ITRs are selected from the group consisting of AAV1, AAV2, AAV3, AAV4, AAV5, AAV6, AAV7, AAV8, AAV9, AAV10, AAV11, AAV12 and AAV13 ITRs.
23. The expression cassette of paragraph 22, wherein the AAV ITRs are AAV2 ITRs.
24. The expression cassette of any one of paragraphs 14-23, wherein the expression cassette is a single stranded AAV genome.
25. The expression cassette of any one of paragraphs 14-24, wherein the expression cassette comprises a promoter, the human UBE3A open reading frame, and a polyadenylation site.
26. The expression cassette of any one of paragraphs 14-25, wherein the expression cassette comprises an AAV ITR, a promoter, the human UBE3A open reading frame, a polyadenylation site, and an AAV ITR.
27. The expression cassette of any one of paragraphs 14-26, wherein the expression cassette comprises an AAV2 ITR, a human synapsin promoter, the human UBE3A open reading frame comprising human UBE3A short isoform and long isoform 2, a bGHpA, and an AAV2 ITR.
28. The expression cassette of any one of paragraphs 14-26, wherein the expression cassette comprises an AAV2 ITR, a human synapsin promoter, the human UBE3A open reading frame comprising human UBE3A short isoform and long isoform 3, a bGHpA, and an AAV2 ITR.

29. The expression cassette of any one of paragraphs 14-28, wherein the expression cassette comprises an AAV2 ITR; a human synapsin promoter; the human UBE3A open reading frame comprising human UBE3A short isoform and long isoform 2 further comprising one or more Kozak sequences comprising, consisting essentially of, or consisting of SEQ ID NO:6 and/or SEQ ID NO:8; a bGHpA; and an AAV2 ITR.

30. The expression cassette of any one of paragraphs 14-28, wherein the expression cassette comprises an AAV2 ITR; a human synapsin promoter; the human UBE3A open reading frame comprising human UBE3A short isoform and long isoform 3 further comprising one or more Kozak sequences comprising, consisting essentially of, or consisting of SEQ ID NO:6 and/or SEQ ID NO:8; a bGHpA; and an AAV2 ITR.

31. The expression cassette of paragraph 30, comprising the nucleotide sequence of SEQ ID NO:14 or a sequence at least about 90% identical thereto.

32. A vector comprising the polynucleotide of any one of paragraphs 1-13 or the expression cassette of any one of paragraphs 14-31.

33. The vector of paragraph 32, wherein the vector is a neuro-tropic vector.

34. The vector of paragraph 32 or 33, wherein the vector is a viral vector.

35. The vector of paragraph 34, wherein the vector is an AAV vector.

36. The vector of paragraph 34, wherein the AAV vector is selected from the group consisting of AAV1, AAV2, AAV3, AAV4, AAV5, AAV6, AAV7, AAV8, AAV9, AAV10, AAV11, AAV12 AAV13, and combinations thereof.

37. The vector of paragraph 35, wherein the AAV vector is an AAV9 or AAV9-derived vector.

38. The vector of paragraph 37, wherein the AAV9-derived vector is PHP.B, PHP.eB, or AAV9.HR).

39. A transformed cell comprising the polynucleotide of any one of paragraphs 1-13, the expression cassette of any one of paragraphs 14-31, and/or the vector of any one of paragraphs 32-38.

40. The transformed cell of paragraph 39, wherein the polynucleotide, expression cassette, and/or vector is stably incorporated into the cell genome.

41. A transgenic animal comprising the polynucleotide of any one of paragraphs 1-13, the expression cassette of any one of paragraphs 14-31, the vector of any one of paragraphs 32-38, and/or the transformed cell of paragraph 39 or 40.

42. A pharmaceutical composition comprising the polynucleotide of any one of paragraphs 1-13, the expression cassette of any one of paragraphs 14-31, the vector of any one of paragraphs 32-38, and/or the transformed cell of paragraph 39 or 40 in a pharmaceutically acceptable carrier.

43. A method of expressing a UBE3A open reading frame in a cell, comprising contacting the cell with the polynucleotide of any one of paragraphs 1-13, the expression cassette of any one of paragraphs 14-31, and/or the vector of any one of paragraphs 32-38, thereby expressing the UBE3A open reading frame in the cell.

44. A method of expressing a UBE3A open reading frame in a subject, comprising delivering to the subject the polynucleotide of any one of paragraphs 1-13, the expression cassette of any one of paragraphs 14-31, the vector of any one of paragraphs 32-38, and/or the transformed cell of paragraph 39 or 40, thereby expressing the UBE3A open reading frame in the subject.

45. A method of treating a disorder associated with aberrant expression of a UBE3A gene or aberrant activity of a UBE3A gene product in a subject in need thereof, comprising administering to the subject a therapeutically effective amount of the polynucleotide of any one of paragraphs 1-13, the expression cassette of any one of paragraphs 14-31, the vector of any one of paragraphs 32-38, and/or the transformed cell of paragraph 39 or 40, such that the UBE3A open reading frame is expressed in the subject.

46. The method of paragraph 45, wherein the disorder associated with expression of the UBE3A gene is Angelman Syndrome.

47. A method of treating Angelman Syndrome in a subject in need thereof, comprising administering to the subject a therapeutically effective amount of the polynucleotide of any one of paragraphs 1-13, the expression cassette of any one of paragraphs 14-31, the vector of any one of paragraphs 32-38, and/or the transformed cell of paragraph 39 or 40, such that the UBE3A open reading frame is expressed in the subject.

48. The method of any one of paragraphs 43-47, wherein the human UBE3A short isoform is expressed at a ratio of about 1:1 to about 15:1 as compared to expression of the long isoform.

49. The method of any one of paragraphs 44-48, wherein the subject exhibits symptoms of the disease prior to delivery of the polynucleotide, expression cassette, vector, and/or transformed cell.

50. The method of any one of paragraphs 44-49, wherein the polynucleotide, expression cassette, vector, and/or transformed cell is delivered in utero.

51. The method of any one of paragraphs 44-50, wherein the subject is a human.

52. The method of any one of paragraphs 44-51, wherein the polynucleotide, expression cassette, vector, and/or transformed cell is delivered to the nervous system of the subject.

53. The method of any one of paragraphs 44-52, wherein the AAV vector is administered to the subject at a dose of at least about $10^2$, $10^3$, $10^4$, $10^5$, $10^6$, $10^7$, $10^8$, $10^9$, $10^{10}$, $10^{11}$, $10^{12}$, $10^{13}$, $10^{14}$, $10^{15}$ or $10^{16}$ viral genomes/kilogram, optionally from $10^8$-$10^{14}$ viral genomes/kilogram.

54. The method of paragraph 52, wherein the polynucleotide, expression cassette, vector, and/or transformed cell is delivered intravenously.

55. The method of paragraph 52, wherein the polynucleotide, expression cassette, vector, and/or transformed cell is delivered by intrathecal, intracerebral, intra-cisterna magna, intraparenchymal, intracerebroventricular, intranasal, intra-aural, intra-ocular, or peri-ocular delivery, or any combination thereof.

56. The method of paragraph 55, wherein the polynucleotide, expression cassette, vector, and/or transformed cell is delivered intrathecally.

57. The method of paragraph 55, wherein the polynucleotide, expression cassette, vector, and/or transformed cell is delivered intracerebroventricularly.

Having described the present invention, the same will be explained in greater detail in the following examples, which are included herein for illustration purposes only, and which are not intended to be limiting to the invention.

EXAMPLES

Example 1: Generation of Human UBE3A Codon-Optimized Construct for Intracellular Expression A novel Angelman Syndrome therapy was designed that enables co-delivery of both short and long UBE3A isoforms (e.g., human isoforms 1 (also known as "short") and 3 (also known as "long")) at the appropriate ratio of expression, referred to herein as PHP.B/SYN-UBE3A incorporating the open reading frame (ORF) hUBE3A_Isoform1>>3. This is a significant technical advantage, as viral vector packaging limits normally allow for the expression of only one isoform. This construct overcomes the two main challenges: (1) delivery of UBE3A widely throughout the brain; and (2) avoidance of UBE3A overexpression, which may be linked to a syndromic form of autism (Dup15q syndrome). AAV9-derived capsids, when delivered during early life, can widely transduce neurons throughout the brain. While there are other AAV capsids that might enable even more widespread gene transfer in the brains of non-human primates and humans, AAV9-derived capsids were selected to be mindful of limiting UBE3A overexpression.

In addition, this construct was generated to express intracellular (e.g., cytoplasmic and/or nuclear) UBE3A and differs from some work performed in other labs in that it does not comprise an exogenously added secretory signal, thereby preventing extracellular expression and generation of a secreted form of UBE3A. While not wishing to be bound to theory, it is believed that such engineering of the UBE3A to result in secreted UBE3A would remove the ability to regulate appropriate levels of expression of UBE3A, which may lead to hazardous overexpression. Overexpression of UBE3A may be linked to Dup15q syndrome, a syndromic form of autism. Secreted UBE3A may also lose regulation of cell-type specificity or biodistribution of UBE3A expression, as well as have altered post-translational modifications and/or altered and/or expanded substrate interaction for its ligase activity. In this respect, the UBE3A product generated from the constructs described herein is thought to generate superior results than have been previously reported.

FIG. 3B shows a schematic of the 5' vector DNA sequence of Kozak-optimized (SEQ ID NO:20) (top) and protein (SEQ ID NO:21) (bottom) codon-optimized hUBE3A1>>3 open reading frame for the vector design to achieve biased expression of the short human UBE3A (hUBE3A) isoform. Both long and short hUBE3A are encoded in the same reading frame. Kozak sequences of different strengths were engineered to bias translation initiation from the second start codon (AGCAGGATGA; SEQ ID NO:25) beginning the short isoform of hUBE3A (FIG. 3B and FIG. 3C).

Figure 4:
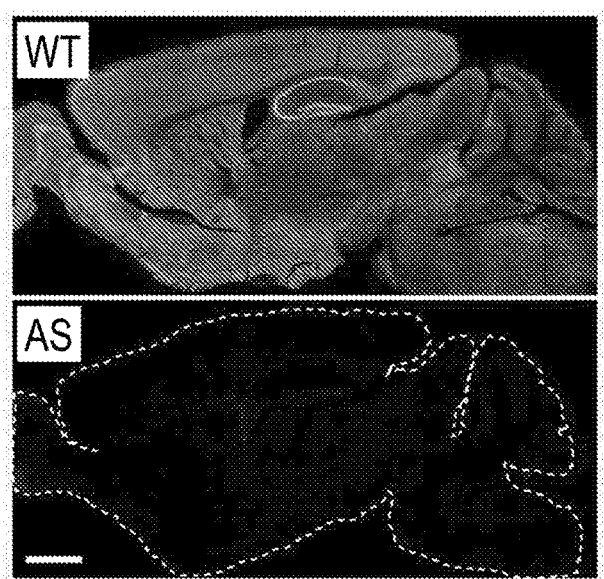
FIG. 4 shows UBE3A-stained sagittal sections harvested from WT and AS model mice (Ube3d$^{m-/p+}$), AS mice exhibit a near complete loss of neuronal UBE3A expression (Jiang et al, Neuron, 1998:21(4):799-811).
Figure 5:
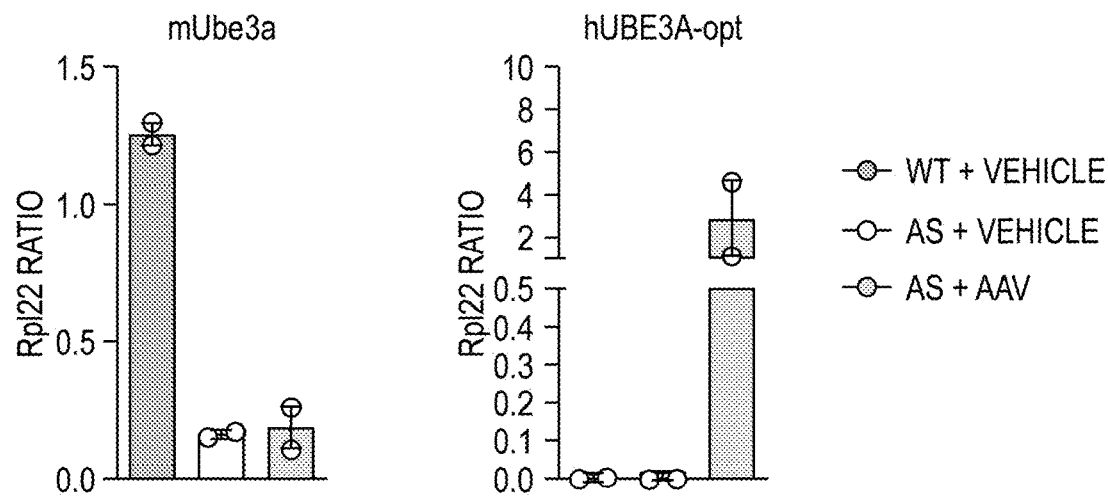
FIG. 5 shows the results of droplet digital PCR experiments to detect either endogenous mouse Ube3a transcripts (mUbe3a, left panel) or codon-optimized human UBE3A transcripts (hUBE3A-opt, right panel) reverse transcribed from mouse hippocampal mRNAs. Hippocampi were harvested from adult WT and AS mice following ICV injection of vehicle or AS gene therapy virus (PHP.B/hUBE3A) at P1. Note the selective detection of hUBE3A-opt in the gene therapy-treated AS+AAV group.
Figure 6:
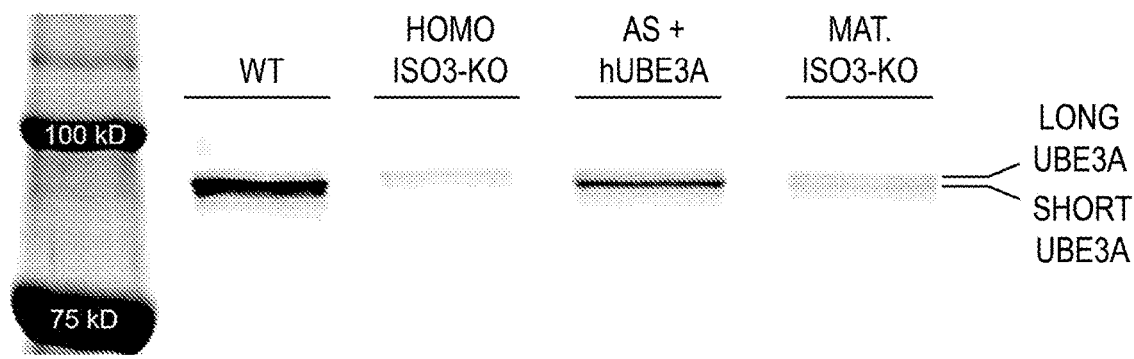
FIG. 6 shows western blotting of P9 mouse whole-brain lysates using a UBE3A antibody that binds both mouse and human UBE3A equally, irrespective of isoform. In a WT sample (far left), a major band representing the short UBE3A isoform is juxtaposed with a minor band immediately upfield that corresponds to long UBE3A (long to short ratio, ~5:1). In a sample from maternal ISO3-KO mice (far right), which lack neuronal expression of short UBE3A, the long:short UBE3A ratio is drastically reduced, enabling very clear resolution of two discrete UBE3A isoform bands. Samples from homozygous ISO3-KO mice (second from left) yield only the long isoform band. Samples from PHP.B/hUBE3A-treated AS mice (second from right) express both short and long hUBE3A isoforms in a ratio of approximately 3:1, thus demonstrating the feasibility of the dual isoform approach.

Expression properties of the construct were examined in an AS mouse model (Ube3d$^{m-/p+}$), wherein mice show a complete loss of all UBE3A isoforms in neurons (FIG. 4; Jiang et al, Neuron, 1998:21(4):799-811). Neonatal mice were intracerebroventricularly (ICV) injected with about 1×10$^{11}$ viral genomes (vg) of AAV9-derived variant virus vector PHP.B/SYN-hUBE3A on postnatal day P1 and harvested at various time points for complementary analyses of mRNA and protein expression. FIG. 5 shows that hUBE3A transcripts expressed from the construct can be selectively detected among endogenous mRNAs in a treated subject, due to the presence unique nucleotide sequences introduced through codon-optimization. This aspect of the construct design can be leveraged to faithfully trace PHP.B/SYN-hUBE3A biodistribution, and thereby facilitate the optimization of biodelivery strategies in mice, nonhuman primates, and eventually humans. hUBE3A transcripts encoded by the design proved capable of expressing both short and long hUBE3A protein isoforms as shown by the western blotting experiment in FIG. 6. Importantly, the ratio of short to long hUBE3A was 3:1, approximating the 4:1 ratio previously observed for endogenous mouse UBE3A isoforms (Avagliano et al., Nat Neurosci, 2019:22(8):1235-1247), and demonstrative of the feasibility of the construct design to achieve desired hUBE3A isoform ratios through the manipulation of Kozak sequence strengths.

Figure 7A:
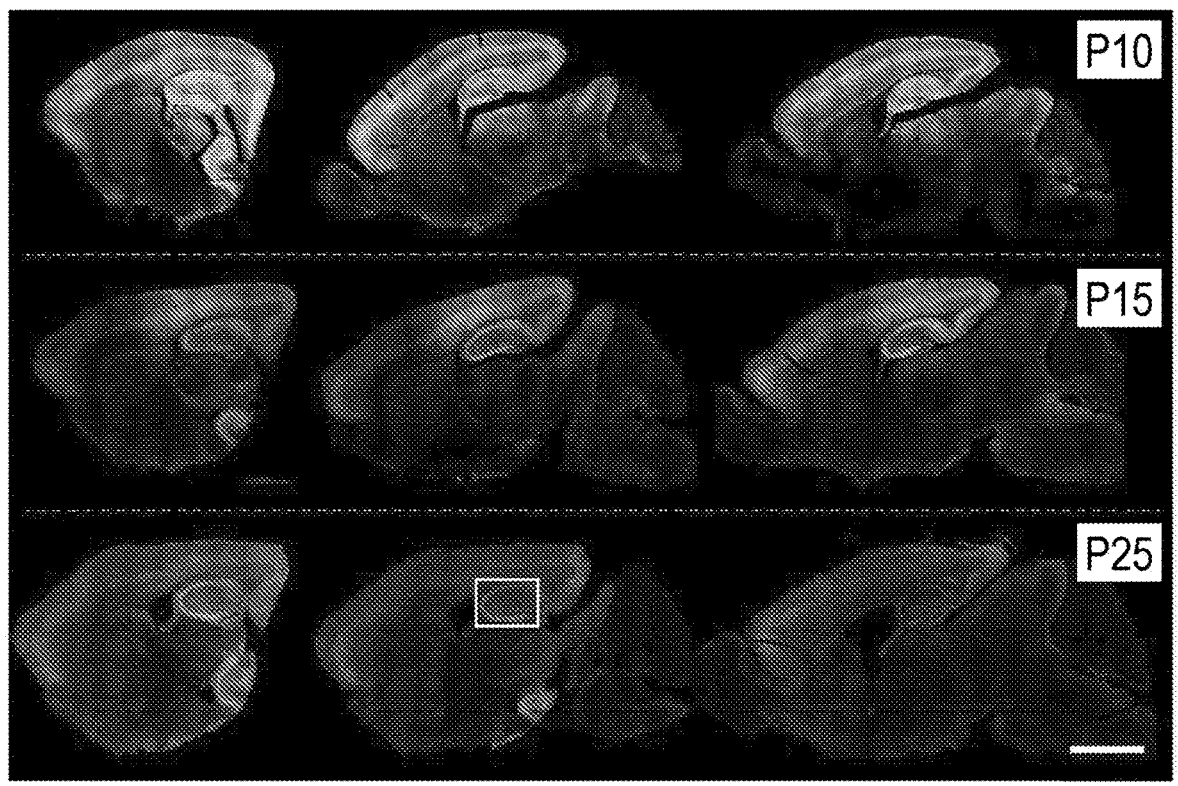
FIGS. 7A-7B show immunohistochemistry of WT and AS model mice.
Figure 7B:
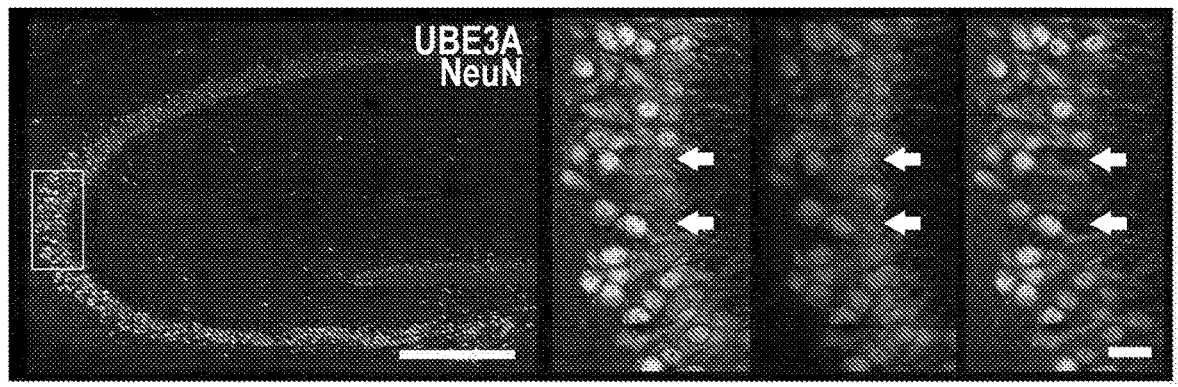

FIG. 7A demonstrates successful delivery of the hUBE3A_Isoform1>>3 products to neonatal AS model mice, as evidenced by UBE3A immunohistochemistry (IHC) performed on postnatal days P10, P15, and P25. Examining the brain structures more closely, costaining of UBE3A and the neuronal marker NeuN showed near-complete co-localization, indicating highly efficient transduction of neurons with PHP.B/SYN-UBE3A (FIG. 7B). UBE3A protein showed pronounced nuclear localization, consistent with dominant expression of the short hUBE3A isoform. Arrows indicate rare hippocampal neurons in which UBE3A was not re-expressed, indicating that most neurons in the cortex and hippocampus express hUBE3A_Isoform1>>3 products.

Figure 8:
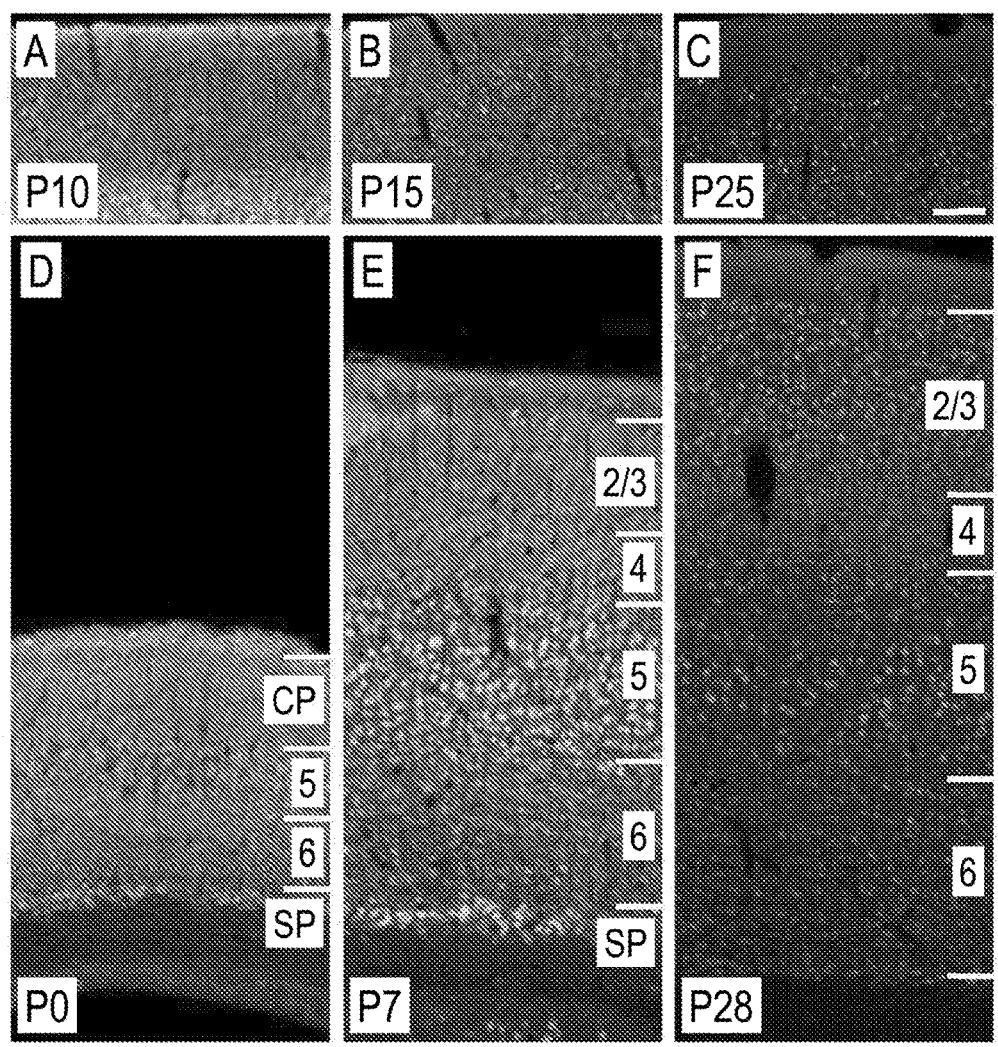
FIG. 8 shows a cytoplasmic-to-nuclear shift in subcellular localization subsequent to hUBE3A gene transfer. Panels A-C show UBE3A-stained layer 2/3 neocortex from AS model mice at P10 (Panel A), P15 (Panel B), and P20 (Panel C) following ICV injection of PHP.B/hUBE3A virus at P1. A gradual accumulation of virally transduced hUBE3A in the nucleus is seen over development, faithfully recapitulating spatiotemporal patterns of endogenous UBE3A expression, as shown in Panels D-F from Judson et al., J Comparative Neurology, 2014:522(8):1874-1896.

Qualitative assessments showed effective re-introduction of UBE3A isoforms to the developing brain (FIG. 8 panels A-F), at the appropriate levels and in accordance with endogenous patterns of subcellular localization, wherein hUBE3A exhibits a cytoplasmic-to-nuclear shift in subcellular localization subsequent to gene transfer. FIG. 8 Panels A-C show UBE3A-stained layer 2/3 neocortex from AS model mice at P10 (Panel A), P15 (Panel B), and P25 (Panel C) following ICV injection of PHP.B/hUBE3A virus at P1. A gradual accumulation of virally transduced hUBE3A in the nucleus was seen over development, a faithful recapitulation of spatiotemporal patterns of endogenous UBE3A expression, as shown in Panels D-F from Judson et al., J Comparative Neurology, 2014:522(8):1874-1896.

Figure 9:
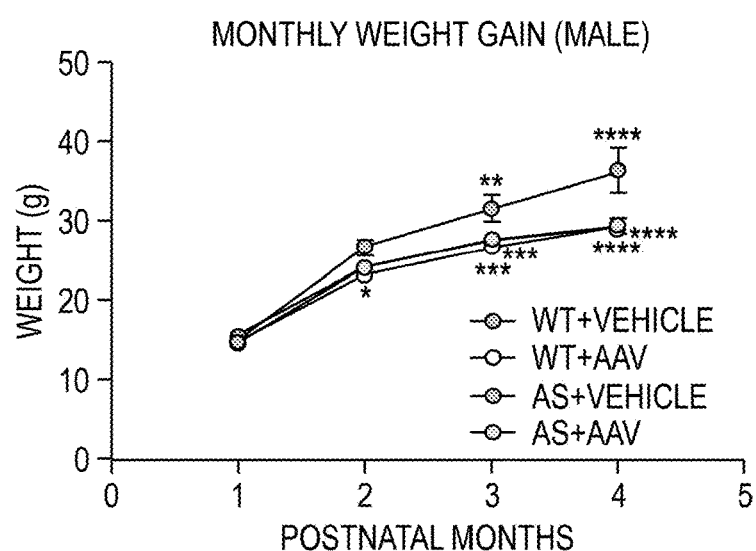
FIG. 9 shows the monthly gross weight gain of male WT and AS model mice injected ICV at postnatal days 0-2 with either vehicle or AS gene therapy virus (PHP.B/hUBE3A). Body weights were statistically similar across the experimental groups at one month of age—WT+Vehicle, WT+AAV, AS+Vehicle, AS+AAV—demonstrating good tolerance of hUBE3A gene transfer and a lack of overt toxicity. By two months, and persisting into adulthood, AS+vehicle mice exhibited a statistically significant increase in weight gain. This phenotype was completely rescued in AS+AAV mice.

Example 2: Human UBE3A Codon-Optimized Construct Treatment for Recovery of Anatomical and Behavioral Phenotypes in AS Model Mice FIG. 9 shows that PHP.B/hUBE3A was generally well-tolerated in both WT and AS model mice, as demonstrated by body weights that were equivalent in the gene therapy-treated groups (WT+AAV and AS+AAV) and vehicle-treated WT controls (WT+Vehicle) at one month of age. Vehicle-treated AS mice gained weight excessively into adulthood, consistent both with previous reports (Judson et al., J Neurosci, 2017:37(31):7347-7361), and with clinical observations of adult-onset obesity in AS individuals (Bindels-de Heus et al., Am J Med Genet A, 2020:182(1):53-63). This phenotype was completely rescued by PHP.B/hUBE3A treatment in the AS+AAV group.

Figure 10:
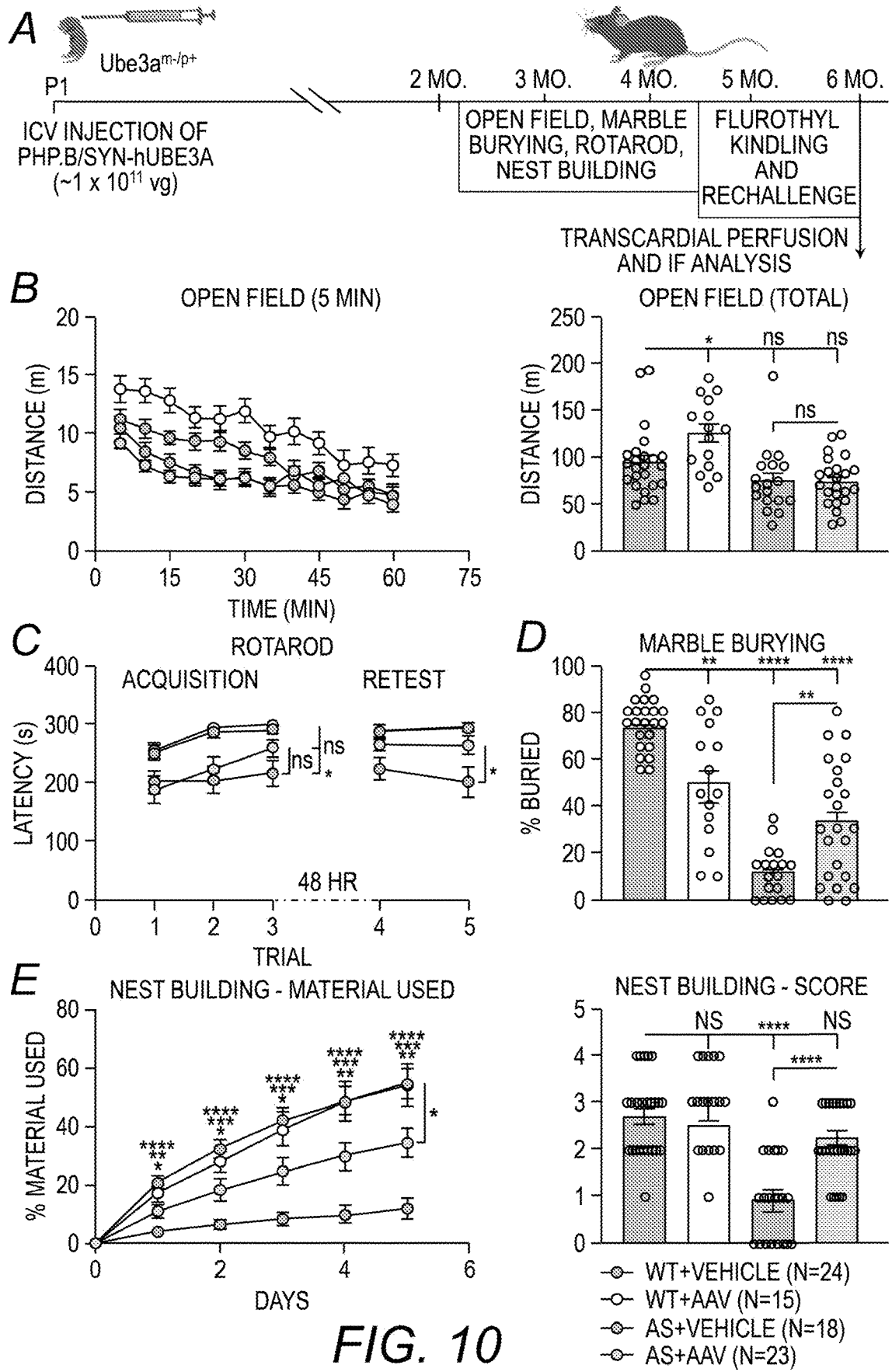
FIG. 10 shows the results of behavioral testing in adult WT and AS model mice ICV injected with either vehicle (WT+Vehicle, AS+Vehicle) or PHP.B/hUBE3A AS gene therapy virus (WT+AAV, AS+AAV) at postnatal days 0-2. Panel A shows a schematic of the experimental timeline. Panel B summarizes open field experiments testing locomotor activity. Data are displayed both in 5-minute bins (left panel) and as the sum total of activity in a 1-hour recording session (right panel). There was no statistically significant decrease between AS+Vehicle and WT+Vehicle mice as previously reported, though a trend was evident, which did not appear to be rescued in AS+AAV mice. Notably, WT+AAV mice exhibit modest hyperactivity, a potential side effect of UBE3A overexpression. Panel C depicts results from the rotarod motor performance assay, which was conducted on two separate days: day 1, consisting of three acquisition trials; day 2, occurring 48 hours later, consisting of 2 retest trials. All trials were of 5 minutes duration. Unlike AS+Vehicle mice, AS+AAV mice significantly overcame their motor deficiencies during acquisition, approaching WT+Vehicle control group levels of performance, which were sustained during retest. Panel D shows results for marble burying, an assay that measures spontaneous digging and burrowing behavior. AS+Vehicle mice typically buried very few marbles during a 30-minute session, indicating they have a severe deficit in this ethologically relevant behavior. This phenotype was partially, if not fully, rescued in most AS+AAV mice. Panel E demonstrates that PHP.B/hUBE3A treatment significantly improved nest building—another innate behavior severely lacking in AS mice—in the AS+AAV group. PHP.B/hUBE3A-treated AS mice incorporated more of the available nesting material into their nests (left panel) and made nests of higher quality than their vehicle-treated counterparts.

Further testing of the capacity for neonatal ICV PHP.B/hUBE3A treatment to rescue highly penetrant and reproducible AS mouse model deficits was pursued (FIG. 10, panel A; Rotaru et al., Neuroscience, 2020:Epub ahead of print). FIG. 10, panel B shows a trend toward hypolocomotion in AS+Vehicle mice that was not affected by gene therapy treatment. AS+Vehicle and AS+AAV exhibited similarly poor performance in the first trial of the rotarod task, suggesting that a certain level of motor dysfunction in AS may be impervious to neonatal ICV PHP.B/hUBE3A treatment. However, repeated rotarod testing revealed a restored capacity for motor learning and plasticity in AS+AAV mice that raised motor performance over successive acquisition trials and sustained it near control levels over time (FIG. 10, panel C).

Innate behaviors including digging and nest building are also known to be severely deficient in AS mice (Rotaru et al., Neuroscience, 2020:Epub ahead of print). FIG. 10, panels D and E show that these phenotypes are recapitulated in AS+Vehicle mice, as evidenced by their poor performance relative to WT+Vehicle controls on well-established marble burying and nest building assays. The penetrance of these phenotypes was greatly reduced in the AS+AAV group, with many individual subjects performing the tasks at control levels. Nevertheless, there was a small subset of poor AS+AAV responders, which were especially noticeable in the spread of the marble burying data. These results warrant careful post hoc analysis of hUBE3A biodistribution to ensure that the true efficacy of the treatment is not underestimated due to technical errors—poor injection targeting or spread—that confound measurements of behavioral rescue.

Figure 11:
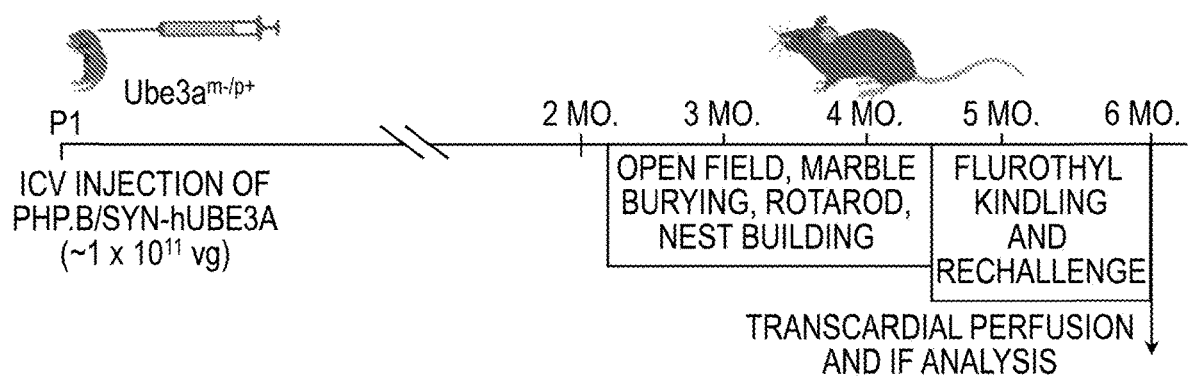
FIG. 11 shows the results of flurothyl kindling and rechallenge testing in adult WT and AS model mice ICV injected with either vehicle (WT+Vehicle, AS+Vehicle) or PHP.B/hUBE3A AS gene therapy virus (WT+AAV, AS+AAV) at postnatal days 0-2. Panel A shows a schematic of the experimental timeline. Panel B summarizes mean group latencies to myoclonic (left panel) and generalized seizure (right panel) over the 8-day flurothyl kindling period and subsequent flurothyl rechallenge on day 36. AS+Vehicle mice trended strongly toward having decreased myoclonic seizure thresholds (MST) and generalized seizure thresholds (GST) upon rechallenge. Seizure thresholds were normalized in the AS+AAV group, demonstrating the potential for AS gene therapy to protect against exaggerated epileptogenesis.
Figure 11:
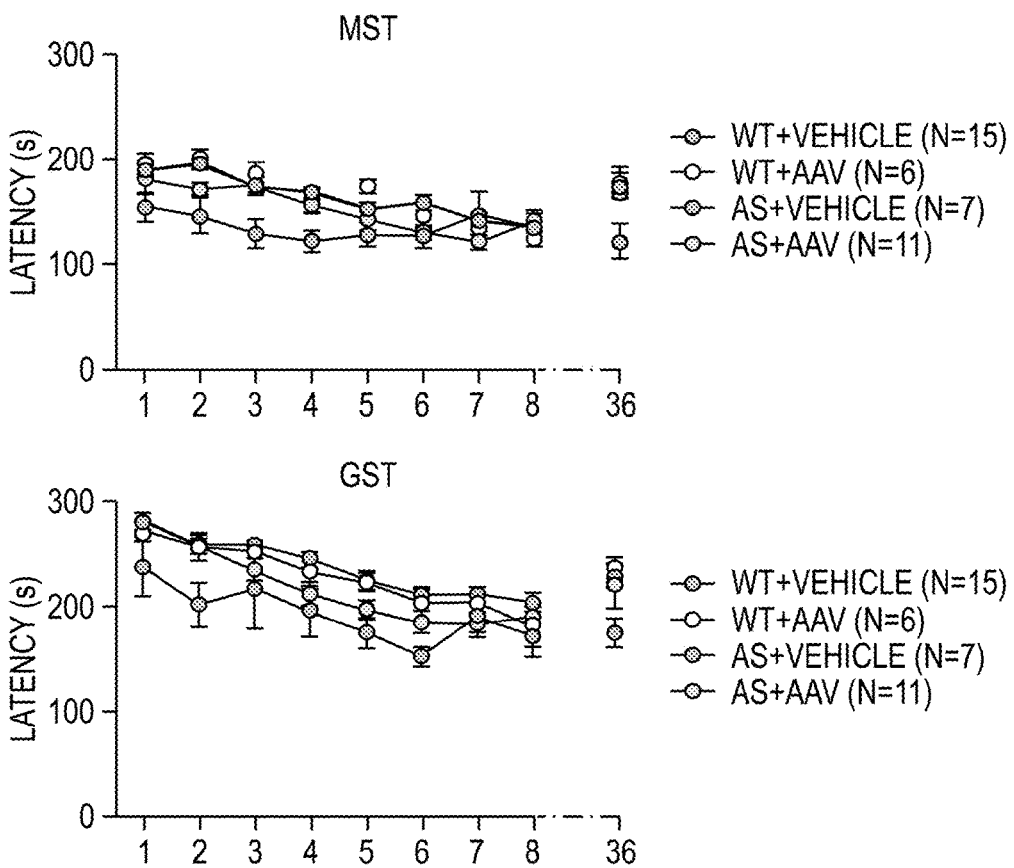

FIG. 11 shows evidence of severe epileptogenesis in AS+Vehicle mice that was revealed through flurothyl seizure kindling and rechallenge. This result was consistent with the findings of a previous study (Gu et al., J Clin Invest, 2018:129(1):163-168), in which AS mice exhibited a similarly heightened sensitivity to flurothyl re-exposure a month after kindling. Moreover, exaggerated epileptogenesis in AS mice was amenable to rescue by tamoxifen-inducible reinstatement of UBE3A during postnatal development, and accordingly, neonatal ICV PHP.B/hUBE3A treatment rendered AS+AAV mice resilient to flurothyl rechallenge (FIG. 11, panel B).

Figure 12:
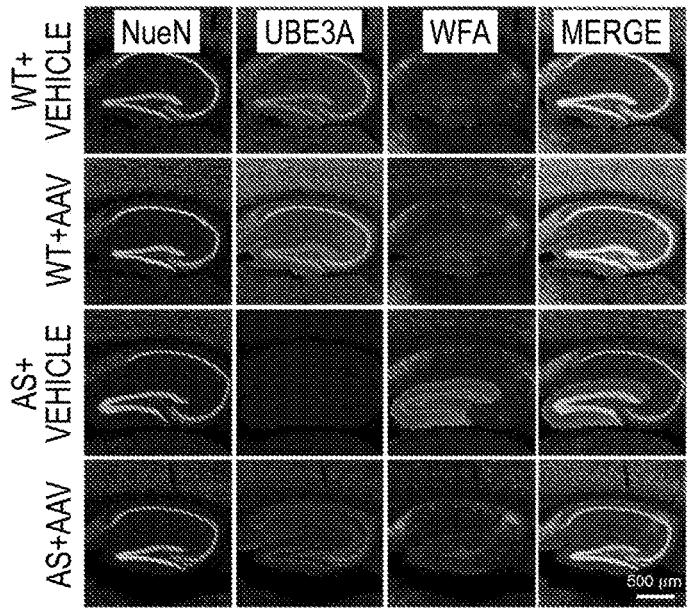
FIG. 12 shows anatomical correlates of enhanced seizure susceptibility following flurothyl seizure kindling. Panel A shows WFA staining of perineuronal nets (magenta) in sagittal sections of the dorsal hippocampus. Quantification of mean WFA fluorescence in the dentate gyrus confirmed that enhanced perineuronal net deposition in this structure was unique to AS+Vehicle mice. Panel B shows GFAP staining of astrocytes in sagittal sections spanning the hippocampus and cortex. Intensely stained astrocytes in the hippocampus are indicative of reactive astrogliosis—a hallmark of temporal lobe epilepsy—and were only observed in the AS+Vehicle group, as demonstrated by quantification of mean hippocampal GFAP fluorescence.
Figure 12:
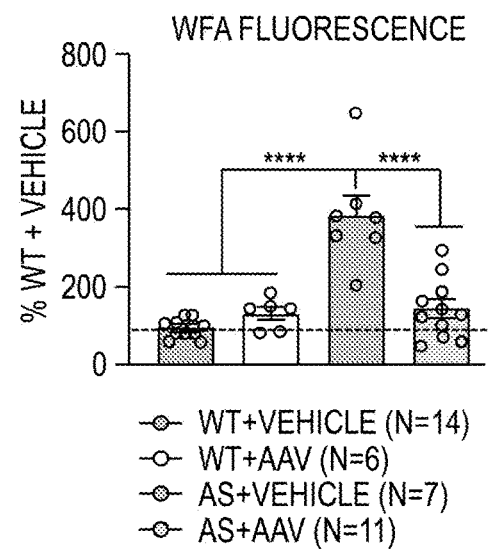
Figure 12:
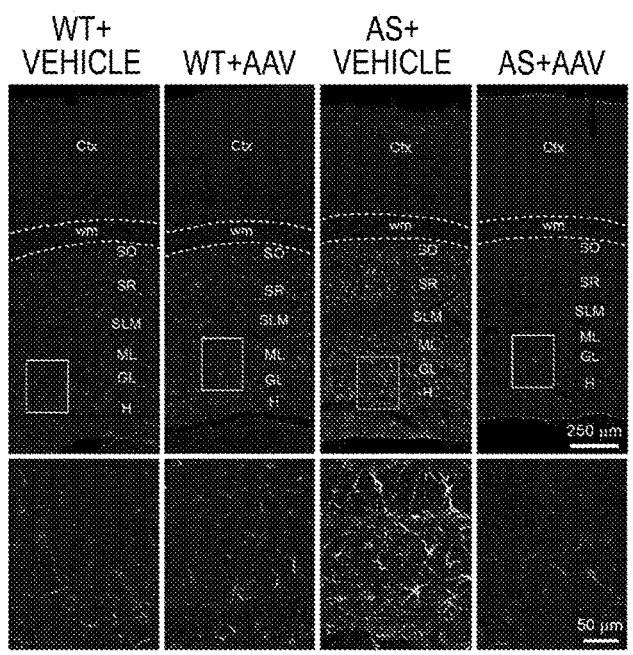
Figure 12:
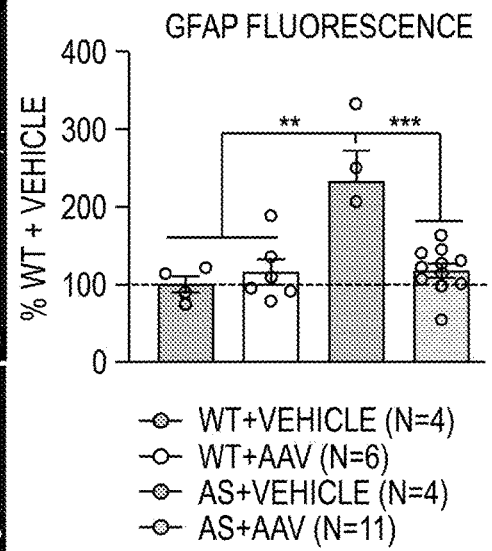

Anatomical and physiological changes to brain circuits define epileptogenesis. Flurothyl-kindled AS mice show an enhanced deposition of perineuronal nets (PNNs) in the hippocampus, specifically in the molecular layer of the dentate gyrus (Gu et al., J Clin Invest, 2018:129(1):163-168). FIG. 12, panel A shows that this aberrant PNN phenotype was also penetrant in AS+Vehicle mice, but fully rescued in AS+AAV mice. Reactive astrogliosis is another hallmark of epileptogenic foci. FIG. 12, panel B shows that there was a dramatic increase in intensely GFAP-stained astrocytes in the hippocampi of AS+Vehicle mice, which proved to be completely normalized in the AS+AAV group. Collectively, these studies provide corroborating evidence that neonatal ICV PHP.B/hUBE3A treatment could be highly effective in improving seizure outcomes in AS.

WT+AAV mice served as a de facto test of the tolerance of UBE3A overexpression in these studies. In most cases WT+AAV and WT+Vehicle group performance was similar, suggesting that UBE3A overexpression resulting from PHP.B/hUBE3A treatment is relatively well-tolerated. However, WT+AAV mice did prove to be moderately hyperlocomotive (FIG. 10, panel B), and they somewhat underperformed on the marble burying task (FIG. 10, panel D). Thus, certain behaviors and underlying neural circuits may potentially be more vulnerable than others to UBE3A overexpression.

Example 3: Construct Treatment in Human-Derived Cells In Vitro and In Vivo

The construct described in Example 1 will be delivered in vitro to patient-derived iPSCs which have been differentiated into neurons and which exhibit AS cellular phenotypes. The recipient cells will then be observed for reversal of characteristic AS cellular phenotypes, as compared to an appropriate control cell which has not received the construct.

AS iPSC lines can be generated from patient peripheral skin or blood cells to which pluripotency is conferred by retroviral or lentiviral vectors expressing key transcription factors OCT4, SOX2, KLF4, MYC, and LIN28 (Takahashi et al., Cell, 2007: 131: 861-872; Sommer et al., Stem Cells, 2008: 27: 543-549). In some preparations, CRISPR/Cas9 editing can be used to introduce AS-causing UBE3A deletions to iPSCs derived from neurotypical patients, thus yielding novel AS iPSC lines with accompanying isogenic controls. AS iPSCs can be differentiated into neurons with neural induction media containing supplements and neural growth factors according to established protocols (Chamberlain et al., Proc. Natl. Acad. Sci., 2010: 107: 17668-17673).

Patient-derived AS neurons have been shown to exhibit characteristically delayed maturation of electrophysiological properties including hyperpolarization of the resting membrane potential and action potential firing, which is amenable to rescue by paternal UBE3A unsilencing by pharmacological agents (Fink et al., Nat. Comm., 2017: April 24; 8:15038). Similarly, the construct will be delivered to patient-derived AS neurons (in vitro and in vivo) in order to restore expression of hUBE3A and correct delays in electrophysiological maturation. For proof-of-concept treatment in non-human primates and humans, the construct will be delivered at early intervention stages (e.g., less than 2 years of age) in 1 to 3 patients, with dose escalation as needed based on safety and efficacy studies. Clinical benefit and safety will be assessed (e.g., as compared to appropriate controls).

The foregoing examples are illustrative of the present invention, and are not to be construed as limiting thereof. Although the invention has been described in detail with reference to preferred embodiments, variations and modifications exist within the scope and spirit of the invention as described and defined in the following claims.

What is claimed is:

1. A polynucleotide comprising a human UBE3A open reading frame, wherein the human UBE3A open reading frame encodes human UBE3A short isoform and long isoform, wherein the human UBE3A long isoform is human UBE3A long isoform 2 or human UBE3A long isoform 3,
    wherein the polynucleotide comprises a first Kozak sequence comprising SEQ ID NO:6 operably linked to coding sequences for the long isoform and a second Kozak sequence comprising SEQ ID NO:8 operably linked to coding sequences for the short isoform; and
    wherein the polynucleotide is devoid of a sequence encoding an exogenously added secretory signal.

2. The polynucleotide of claim 1, wherein the human UBE3A open reading frame comprises one or more nucleotide modifications to reduce expression of the long isoform as compared to expression of native ORF which lacks the one or more nucleotide modifications to reduce expression.

3. The polynucleotide of claim 1, wherein the human UBE3A open reading frame comprises one or more nucleotide modifications to enhance expression of the short isoform as compared to native ORF not comprising nucleotide modifications to enhance expression.

4. The polynucleotide of claim 1, wherein the human UBE3A open reading frame comprises one or more nucleotide modifications to encode expression of the short isoform at a ratio of about 1:1 to about 15:1, as compared to expression of the long isoform.

5. The polynucleotide of claim 1, wherein the human UBE3A open reading frame comprises the nucleotide sequence of SEQ ID NO:9, SEQ ID NO:26, or SEQ ID NO:27, or a nucleotide sequence having at least about 95% identity thereto.

6. An expression cassette comprising the polynucleotide of claim 1.

7. The expression cassette of claim 6, wherein the human UBE3A open reading frame is operably linked to a promoter, a polyadenylation signal, and/or at least one adeno-associated virus (AAV) inverted terminal repeat (ITR).

8. The expression cassette of claim 6, wherein the expression cassette is a single stranded AAV genome.

9. The expression cassette of claim 6, wherein the expression cassette comprises an AAV2 ITR, a human synapsin promoter, the human UBE3A open reading frame comprising human UBE3A short isoform and long isoform 2, a bGHpA, and an AAV2 ITR.

10. The expression cassette of claim 6, wherein the expression cassette comprises an AAV2 ITR, a human synapsin promoter, the human UBE3A open reading frame comprising human UBE3A short isoform and long isoform 3, a bGHpA, and an AAV2 ITR.

11. The expression cassette of claim 9, wherein the expression cassette comprises an AAV2 ITR; a human synapsin promoter; the human UBE3A open reading frame comprising human UBE3A short isoform and long isoform 2 further comprising one or more Kozak sequences comprising SEQ ID NO:6 and SEQ ID NO:8; a bGHpA; and an AAV2 ITR.

12. The expression cassette of claim 10, wherein the expression cassette comprises an AAV2 ITR; a human synapsin promoter; the human UBE3A open reading frame comprising human UBE3A short isoform and long isoform 3 further comprising one or more Kozak sequences comprising SEQ ID NO:6 and SEQ ID NO:8; a bGHpA; and an AAV2 ITR.

13. The expression cassette of claim 12, comprising the nucleotide sequence of SEQ ID NO:14 or a sequence at least about 90% identical thereto.

14. A vector comprising the polynucleotide of claim 1.

15. The vector of claim 14, wherein the vector is an AAV vector.

16. A pharmaceutical composition comprising the polynucleotide of claim 1 in a pharmaceutically acceptable carrier.

\* \* \* \* \*